(12) United States Patent
Okuda et al.

(10) Patent No.: US 10,005,393 B2
(45) Date of Patent: Jun. 26, 2018

(54) VEHICLE DISPLAY CONTROL APPARATUS

(71) Applicant: TOYOTA JIDOSHA KABUSHIKI KAISHA, Toyota-shi, Aichi (JP)

(72) Inventors: Masato Okuda, Okazaki (JP); Yuka Sobue, Nagoya (JP); Hironobu Ishijima, Toyota (JP); Issei Matsunaga, Nissin (JP); Daisuke Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/453,128

(22) Filed: Mar. 8, 2017

(65) Prior Publication Data

US 2017/0341580 A1 Nov. 30, 2017

(30) Foreign Application Priority Data

May 27, 2016 (JP) .................................. 2016-106719

(51) Int. Cl.
- *B60Q 1/00* (2006.01)
- *B60Q 9/00* (2006.01)
- *B60R 1/00* (2006.01)
- *G06K 9/00* (2006.01)

(52) U.S. Cl.
CPC ............... *B60Q 9/008* (2013.01); *B60R 1/00* (2013.01); *B60R 2300/301* (2013.01); *B60R 2300/8033* (2013.01); *B60R 2300/8066* (2013.01); *B60R 2300/8093* (2013.01); *G06K 9/00791* (2013.01)

(58) Field of Classification Search
CPC ... B60Q 9/008; B60R 1/00; B60R 2300/8093; B60R 2300/301; B60R 2300/8033; B60R 2300/8066; G06K 9/00791
USPC ............... 340/435, 436, 439, 441, 903, 904; 348/36, 148
See application file for complete search history.

(56) References Cited

U.S. PATENT DOCUMENTS

| | | | |
|---|---|---|---|
| 8,451,108 B2* | 5/2013 | Kohno | B60K 35/00 340/435 |
| 2008/0151048 A1* | 6/2008 | Watanabe | B60R 1/00 348/143 |
| 2010/0066516 A1* | 3/2010 | Matsukawa | B60R 1/00 340/435 |

FOREIGN PATENT DOCUMENTS

| | | |
|---|---|---|
| JP | S53-033096 A | 3/1978 |
| JP | 2630604 B2 | 7/1997 |
| JP | H11-213254 A | 8/1999 |
| JP | 2006-018077 A | 1/2006 |
| JP | 2008-056135 A | 3/2008 |
| JP | 2011-238161 A | 11/2011 |

* cited by examiner

*Primary Examiner* — Dhaval Patel
(74) *Attorney, Agent, or Firm* — Oliff PLC

(57) ABSTRACT

When a first object is first detected during a second display process executed when a second object is detected, a vehicle display control apparatus of the invention starts a first display at a first detection of the first object, stop the first display at a termination of the second display process and start the first display process at a start of the next second display process.

3 Claims, 33 Drawing Sheets

US 10,005,393 B2

VEHICLE DISPLAY CONTROL APPARATUS

BACKGROUND OF THE INVENTION

Field of the Invention

The present invention relates to a vehicle display control apparatus for informing a driver of a vehicle of a fact that a target object to be informed to the driver exists near the vehicle.

Description of the Related Art

There is known a vehicle display control apparatus for lighting at least one of two lamps provided near a driver's seat of a vehicle for informing a driver of the vehicle of a fact that the vehicle approaches at least one obstacle (for example, see Japanese Patent No. 2630604).

One of the lamps of the aforementioned vehicle display control apparatus is lighted for informing the driver of a fact that a right front end portion of the vehicle approaches the obstacle. The other lamp is lighted for informing the driver of a fact that a left front end portion of the vehicle approaches the obstacle.

If each of the lamps is turned on and off at a predetermined time interval repeatedly when a target object such as the obstacle to be informed to the driver exists near the vehicle and times of turning on and off one of the lamps and times of turning on and off the other lamp are different from each other, the driver may feel troublesome. In addition, the driver may overlook the target object to be known by the driver.

The present invention has been made for solving the aforementioned problems. An object of the present invention is to provide a vehicle display control apparatus which can decrease a possibility that the driver feels troublesome as well as a possibility that the driver overlooks the target object to be known by the driver even when a time of a start of a lighting of one of display parts such as the lamps of a display device and a time of a start of a lighting of the other display part are different from each other.

SUMMARY OF THE INVENTION

The vehicle display control apparatus according to the present invention is applied to a vehicle (10*a*) comprising:
  a first detection device (11, 41) for detecting a first target object (10*h*) which exists within a range of a first distance (Dhth) from the vehicle (10*a*);
  a second detection device (12*r*, 12*l*, 42) for detecting a second target object (10*b*, 10*c*) which is different from the first target object (10*h*) and exists within a range of a second distance (Dvth) from the vehicle (10*a*);
  a first display device (20, 60) for performing a first display for informing a driver of the vehicle (10*a*) of a fact that the first target object (10*h*) is detected; and
  a second display device (23, 24, 60) for performing a second display for informing the driver of a fact that the second target object (10*b*, 10*c*) is detected.

The vehicle display control apparatus comprises control means (50, 60) configured to execute a first control for executing a first display process a predetermined first number of times (Hn) at a predetermined interval (Titv) (see a process of a step 220 in FIG. 29) when the first target object (10*h*) is detected by the first detection device (11, 41) (see a determination "Yes" at each of steps 205 to 215 in FIG. 29), the first display process being a process for causing the first display device (20, 60) to perform the first display for a predetermined display time (Ttt).

Further, the control means (50, 60) is configured to execute a second control for executing a second display process a predetermined second number of times (Nr) at the predetermined interval (Titv) (see a process of a step 420 in FIG. 31) when the second target object (10*b*, 10*c*) is detected by the second detection device (12*r*, 12*l*, 42) (see a determination "Yes" at each of steps 405 to 415 in FIG. 31), the second display process being a process for causing the second display device (23, 24, 60) to perform the second display for the predetermined display time (Ttt).

In addition, the control means (50, 60) is further configured to, when the first target object (10*h*) is first detected during an execution of the second display process (see a determination "Yes" at each of steps 205 and 210 in FIG. 29, a determination "No" at a step 215 in FIG. 29 and a determination "Yes" at a step 310 in FIG. 30):
  start a performance of the first display (see processes of steps 330 and 340) at a time of a first detection of the first target object (10*h*);
  stop the performance of the first display at a time of a termination of the second display process after the first target object (10*h*) is first detected; and
  start the first control at a time of a start of the second display process next to a stop of the performance of the first display.

Thereby, the performance of the first display is started at the same time as the start of the performance of the second display and the performance of the first display is stopped at the same time as the termination of the performance of the second display when the first target object is first detected during the performance of the second display. Thus, when the first and second displays are both performed, a possibility that the driver feels troublesome can be decreased and a possibility that the driver overlooks the existence of the first target object and/or the second target object can be decreased.

The control means (50, 60) may be configured to acquire a remaining execution time at the time of the first detection of the first target object (10*h*) during the execution of the second display process, the remaining execution time being a time of the execution of the second display process remaining at the time of the first detection of the first target object (10*h*) (see a determination "Yes" at each of steps 205 and 210 in FIG. 29, a determination "No" at a step 215 in FIG. 29 and a determination "Yes" at a step 310 in FIG. 30). In this case, the control means (50, 60) may be configured to, when the remaining execution time is equal to or larger than a threshold time (see a determination "Yes" at a step 320 in FIG. 30):
  start the performance of the first display at the time of the first detection of the first target object (10*h*);
  stop the performance of the first display at the time of the termination of the second display process; and
  start the first control at the time of the start of the second display process next to the stop of the performance of the first display (see a process of a step 330 in FIG. 30).

In addition, the control means (50, 60) may be configured to, when the remaining execution time is smaller than the threshold time (see the determination "No" at the step 320 in FIG. 30):
  start the performance of the first display at the time of the first detection of the first target object (10*h*),
  stop the performance of the first display at the time of the termination of the second display process which is started next to the second display process which is being executed at the time of the first detection of the first target object (10h); and start the first control at the time of the start of the second display process next to the stop of the performance of the first display (see the process of the step 340 in FIG. 30).

When the remaining execution time of the second display process, which is being executed at the time of the first detection of the first target object, is short and the performance of the first display is terminated at the time of the termination of the second display process, which is being executed at the time of the first detection of the first target object, a time of the performance of the first display is short. As a result, the driver may overlook the first display and thus, a timing of the driver realizing the fact that the first target object is detected, may delay. On the other hand, according to the vehicle display control apparatus of the present invention, when the remaining execution time of the second display process, which is being executed at the time of the first detection of the first target object, is short, the first display continues to be performed until the second display process, which is started next to the second display process which is being executed at the time of the first detection of the first target object, is terminated. Thus, a possibility that the timing of the driver realizing the fact that the first target object is detected delays can be decreased.

In addition, if the vehicle (10a) comprises a buzzer (30) for generating an alerting sound, the control means (50, 60, 70) may be configured to, when the first target object (10h) is detected (see the determination "Yes" at each of the steps 205 and 215 in FIG. 29):

start an alerting process for causing the buzzer (30) to generate the alerting sound at the time of the start of the first control during the execution of the first display process; and execute the alerting process a predetermined third number of times at the predetermined interval (Titv) (see the process of the step 220 in FIG. 29).

Further, the control means (50, 60) may be configured to, when the second target object (10b, 10c) is detected (see a determination "Yes" at each of steps 405 and 415 in FIG. 31);

start the alerting process at the time of the start of the second control during the execution of the second display process; and execute the alerting process a predetermined fourth number of times at the predetermined interval (Titv) (see a process of a step 420 in FIG. 31).

In this case, the control means (50, 60) may be configured to execute the alerting process the predetermined third number of times including the alerting process which is being executed (see the process of the step 330 in FIG. 30) at the time of the first detection of the first target object (10h) when the first target object (10h) is first detected during the execution of the second display process (see the determination "Yes" at each of the steps 205 and 210 in FIG. 29, the determination "No" at the step 215 in FIG. 29 and the determination "Yes" at the step 310 in FIG. 30), the remaining execution time is equal to or larger than the threshold time and the alerting process is executed (see the determination "Yes" at the step 320 in FIG. 30).

Further, the control means (50, 60) may be configured to execute the alerting process the predetermined third number of times without including the alerting process which is being executed at the time of the first detection of the first target object (10h) (see the process of the step 340 in FIG. 30) when the first target object (10h) is first detected during the execution of the second display process (see the determination "Yes" at each of the steps 205 and 210 in FIG. 29, the determination "No" at the step 215 in FIG. 29 and the determination "No" at the step 310 in FIG. 30), the remaining execution time is smaller than the threshold time and the alerting process is executed (see the determination "No" at the step 320 in FIG. 30).

Thereby, when the remaining execution time of the second display process which is being executed at the time of the first detection of the first target object is short, the number of the execution of the alerting process for informing of the fact that the first target object is detected becomes large, compared with the case that the alerting process is executed the third number of times including the alerting process which is being executed at the time of the first detection of the first target object. Thus, the driver is likely to surely know that the first target object is detected.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

BRIEF DESCRIPTION OF THE DRAWINGS

FIG. 7 is a view used for describing the lighting pattern of the center lighting display part and (A) shows a situation that the center right display part is off and (B) shows a situation that the center right display part is on.

FIG. 10 is a view used for describing the lighting pattern of the right display part and (A) shows a situation that first to third display portions of the right display part are off, (B) shows a situation that the first display portion of the right display part is on, (C) shows a situation that the first and second lighting display portions of the right display part are on and (D) shows a situation that the first to third display portions of the right display part are on.

DESCRIPTION OF THE PREFERRED EMBODIMENTS

Figure 1:
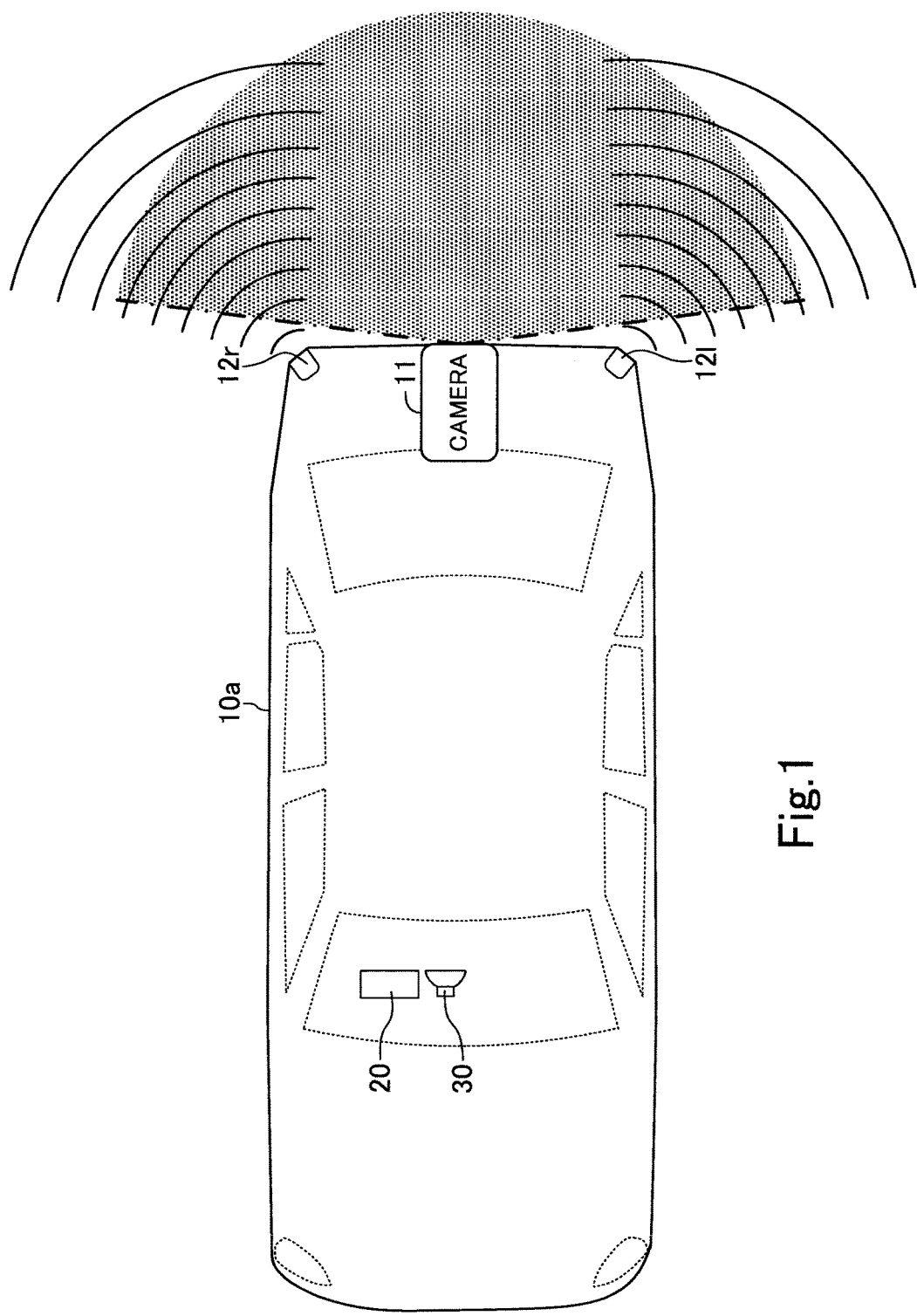
FIG. 1 is a view for showing a vehicle, to which a vehicle display control apparatus according to an embodiment of the present invention is applied (hereinafter, this vehicle display control apparatus will be referred to as "the embodiment control apparatus").

Below, a vehicle display control apparatus according to an embodiment of the present invention will be described with reference to the drawings. Hereinafter, the vehicle display control apparatus will be referred to as "the embodiment control apparatus". The embodiment control apparatus is applied to a vehicle 10a shown in FIG. 1. Hereinafter, the vehicle 10a will be referred to as "the own vehicle 10a". The own vehicle 10a has a camera 11, a right rear radar sensor 12r, a left rear radar sensor 12l, a display device 20 and a buzzer 30. As shown in FIG. 2, the embodiment control apparatus includes a camera ECU 41, a radar sensor ECU 42, a driving assist ECU 50, a meter ECU 60 and a buzzer ECU 70.

Figure 2:
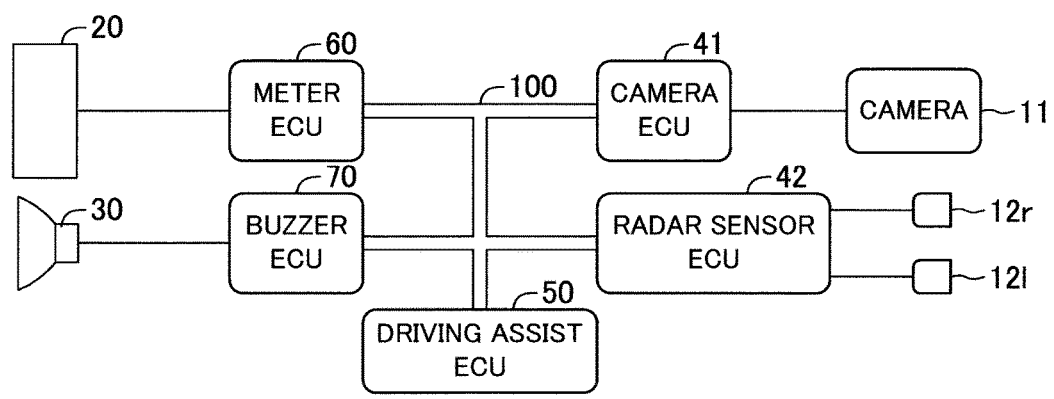
FIG. 2 is a view for showing a configuration of the embodiment control apparatus.

As shown in FIG. 1, the camera 11 is mounted on a center portion of a rear end of the own vehicle 10a. As shown in FIG. 2, the camera 11 is electrically connected to the camera ECU 41. The camera 11 is a known CCD camera. The camera 11 takes an image of a landscape behind the own vehicle 10a. The camera ECU 41 acquires the image or data of image of the landscape taken by the camera 11.

The camera ECU 41 detects a person walking at a rear side of the own vehicle 10a and calculates a distance Dh from the center rear end of the own vehicle 10a to the person on the basis of the acquired images. When the camera ECU 41 determines that the person exists in a range within a predetermined distance Dhth from the center rear end of the own vehicle 10a on the basis of the calculated distance Dh, the camera ECU 41 detects the person as a rear side walking person 10h which is a walking person to be informed to a driver of the own vehicle 10a. When the camera ECU 41 detects the walking person 10h, the camera ECU 41 sends a rear side walking person detection signal SHkc to the driving assist ECU 50.

As shown in FIG. 1, the right rear radar sensor 12r is mounted on a right rear end of the own vehicle 10a. As shown in FIG. 2, the right rear radar sensor 12r is electrically connected to the radar sensor ECU 42. The right rear radar sensor 12r is a known millimeter wave radar sensor. The right rear radar sensor 12r outputs a millimeter wave. The millimeter wave is reflected by the other vehicle existing near the own vehicle 10a. The right rear radar sensor 12r receives the reflected millimeter wave.

The radar sensor ECU 42 detects the other vehicle existing at the right rear side of the own vehicle 10a and calculates a distance Dr from the right rear end of the own vehicle 10a to the other vehicle on the basis of the reflected millimeter wave received by the right rear radar sensor 12r. When the radar sensor ECU 42 determines that the other vehicle exists in the range within the predetermined distance Dvth from the right rear end of the own vehicle 10a on the basis of the calculated distance Dr, the radar sensor ECU 42 detects the other vehicle as a right rear side vehicle 10b to be informed to the driver of the own vehicle 10a. When the radar sensor ECU 42 detects the right rear side vehicle 10b, the radar sensor ECU 42 sends a right rear side vehicle detection signal SRkc to the driving assist ECU 50.

As shown in FIG. 1, the left rear radar sensor 12l is mounted on a left rear end of the own vehicle 10a. As shown in FIG. 2, the left rear radar sensor 12l is electrically connected to the radar sensor ECU 42. Similar to the right rear radar sensor 12r, the left rear radar sensor 12l is a known millimeter wave radar sensor. The left rear radar sensor 12l outputs a millimeter wave. The millimeter wave is reflected by the other vehicle existing near the own vehicle 10a. The left rear radar sensor 12l receives the reflected millimeter wave.

The radar sensor ECU 42 detects the other vehicle existing at the left rear side of the own vehicle 10a and calculates a distance DI from the left rear end of the own vehicle 10a to the other vehicle on the basis of the reflected millimeter wave received by the left rear radar sensor 12l. When the radar sensor ECU 42 determines that the other vehicle exists in the range within the predetermined distance Dvth from the left rear end of the own vehicle 10a on the basis of the calculated distance DI, the radar sensor ECU 42 detects the other vehicle as a left rear side vehicle 10c to be informed to the driver of the own vehicle 10a. When the radar sensor ECU 42 detects the left rear side vehicle 10c, the radar sensor ECU 42 sends a left rear side vehicle detection signal SLkc to the driving assist ECU 50.

Figure 3:
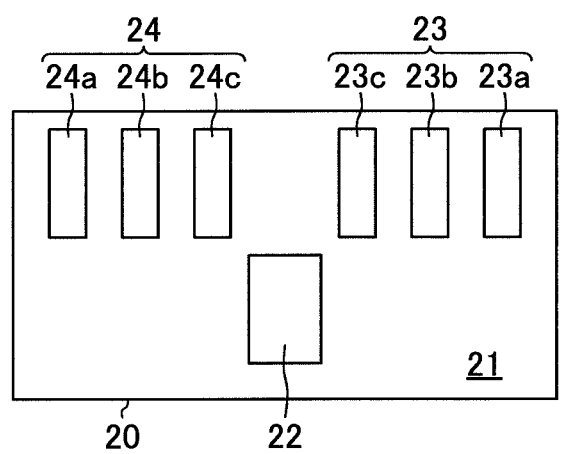
FIG. 3 is a view for showing a display device shown in FIG. 1.

As shown in FIG. 3, the display device 20 includes a display 21. An icon 22 is provided at a lower center area of the display 21. An icon 23 is provided at an upper right area of the display 21. An icon 24 is provided at an upper left area of the display 21.

The icon 22 provided at the lower center area (hereinafter, the icon 22 will be referred to as "the center lighting display part 22") is turned on as described later for displaying that the walking person 10h exists in a rearward direction in the range within the predetermined distance Dhth from the center rear end of the own vehicle 10a.

The icon 23 provided at the upper right area (hereinafter, the icon 23 will be referred to as "the right lighting display part 23") includes an icon portion 23a provided at an outermost area (hereinafter, the icon portion 23a will be referred to as "the first lighting display portion 23a"), an icon portion 23b provided at a center area (hereinafter, the icon portion 23b will be referred to as "the second lighting display portion 23b") and an icon portion 23c provided at an innermost area (hereinafter, the icon portion 23c will be referred to as "the third lighting display portion 23c"). The right lighting display part 23 is turned on as described later for displaying that the right rear side vehicle 10b exists.

The icon 24 provided at the upper left area (hereinafter, the icon 24 will be referred to as "the left lighting display part 24") includes an icon portion 24a provided at an outermost area (hereinafter, the icon portion 24a will be referred to as "the first display portion 24a"), an icon portion 24b provided at a center area (hereinafter, the icon portion 24b will be referred to as "the second lighting display portion 24b") and an icon portion 24c provided at an innermost area (hereinafter, the icon portion 24c will be referred to as "the third lighting display portion 24c"). The left lighting display part 24 is turned on as described later for displaying that the left rear side vehicle 10c exists.

The display device 20 is provided at a position which the driver sitting on a driver's seat of the own vehicle 10a can see the display device 20 (for example, at a meter cluster panel). As shown in FIG. 2, the display device 20 is electrically connected to the meter ECU 60. The meter ECU 60 controls lightings of the center, right and left display parts 22, 23 and 24.

The buzzer 30 generates an alerting sound to the driver of the own vehicle 10a. The buzzer 30 is provided near the driver's seat of the own vehicle 10a. The buzzer 30 is electrically connected to the buzzer ECU 70. The buzzer ECU 70 controls an activation of the buzzer 30.

The camera ECU 41, the radar sensor ECU 42, the driving assist ECU 50, the meter ECU 60 and the buzzer ECU 70 are electrically connected to each other via a communication/sensor CAN (i.e., a communication/sensor Controller Area Network) 100 such that these ECUs can send and receive data therebetween, that is, communicate with each other.

The term "ECU" means an electronic control unit. Each of the ECUs is an electronic control circuit having, as a main component, a macro computer including a CPU, a ROM, a RAM, an interface and the like. The CPU realizes various functions described later by executing instructions or routines stored in a memory (i.e., the ROM). The ECUs 41, 42, 50, 60 and 70 may be integrated into a single ECU.

<Summary of Operation of Embodiment Control Apparatus>

Figure 4B:
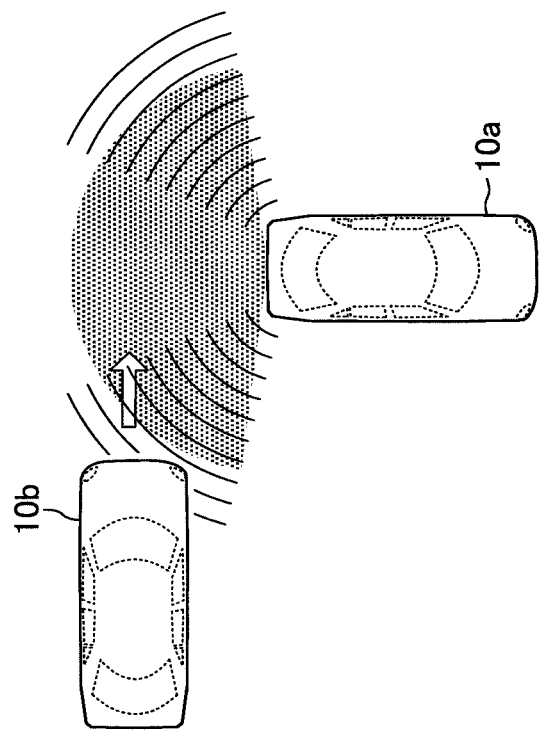
FIG. 4B is a view for showing a situation that a person walks at a right rear side of the vehicle.
Figure 4A:
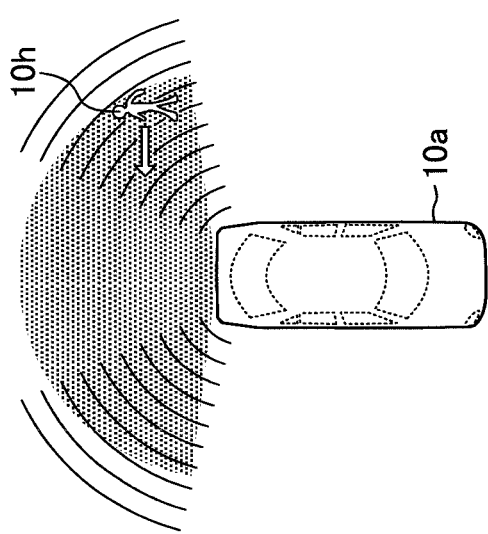
FIG. 4A is a view for showing a situation that a person walks at a left rear side of the vehicle.

Next, a summary of an operation of the embodiment control apparatus will be described. As shown in FIG. 4A, when the camera ECU 41 detects that the walking person 10h exists in the rearward direction in the range within the predetermined distance Dhth from the center rear end of the own vehicle 10a on the basis of the images or the image data acquired by the camera 11, the camera ECU 41 sends, to the driving assist ECU 50, a rear side walking person detection signal SHkc for informing the driving assist ECU 50 of the detection of the walking person 10h.

When the driving assist ECU 50 receives the rear side walking person detection signal SHkc, the driving assist ECU 50 send, to the meter ECU 60, a start command signal SHstart for starting a center lighting control for controlling the lighting of the center lighting display part 22 and send, to the buzzer ECU 70, a start command signal SBstart for starting a buzzer control for controlling the activation of the buzzer 30.

(Center Lighting Control A0)

When receiving the start command signal SHstart, the meter ECU 60 executes a center lighting control A0. The center lighting control A0 is a control for executing a short center lighting process a predetermined number of times Nh (in this embodiment, twice) and a continuous center lighting process sequentially at a predetermined time Titv (hereinafter, this predetermined time Titv will be referred to as "the predetermined interval Titv"). The short center lighting process is a process for lighting the center lighting display part 22 and the continuous center lighting process is also a process for lighting the center lighting display part 22.

Figure 5:
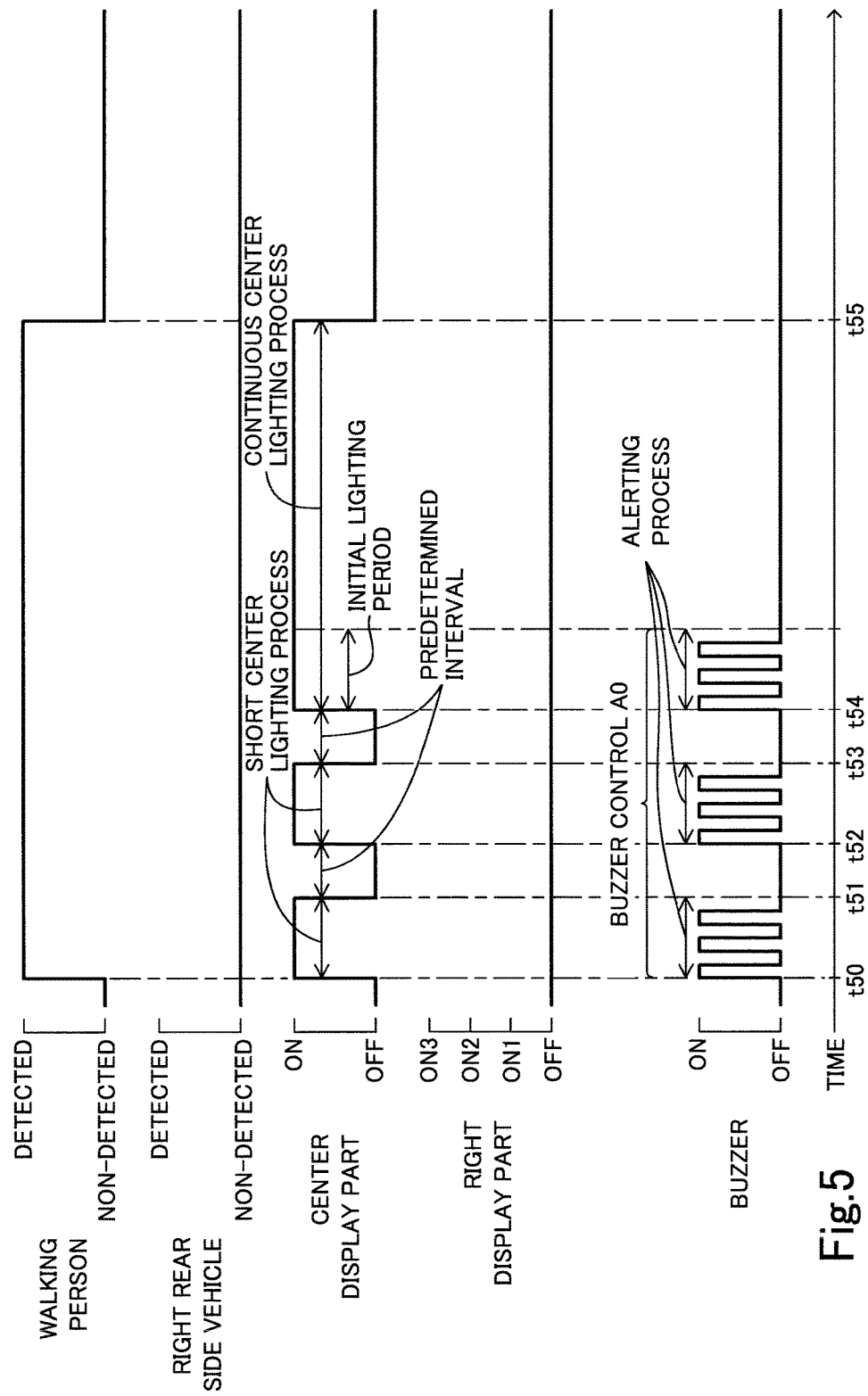
FIG. 5 is a view for showing a time chart illustrating an example of a lighting pattern of a center lighting display part when a person walking at the rear side of the vehicle is detected.

In particular, as shown in FIG. 5, when receiving the start command signal SHstart at a time t50, the meter ECU 60 starts the short center lighting process for a predetermined lighting time Ttt.

The short center lighting process is a process for turning on the center lighting display part 22 (see "ON" at the time t50 in FIG. 5) and then, turning off the center lighting display part 22 (see "OFF" at a time t51 in FIG. 5) when the predetermined lighting time Ttt elapses after turning on the center lighting display part 22.

Figure 7:
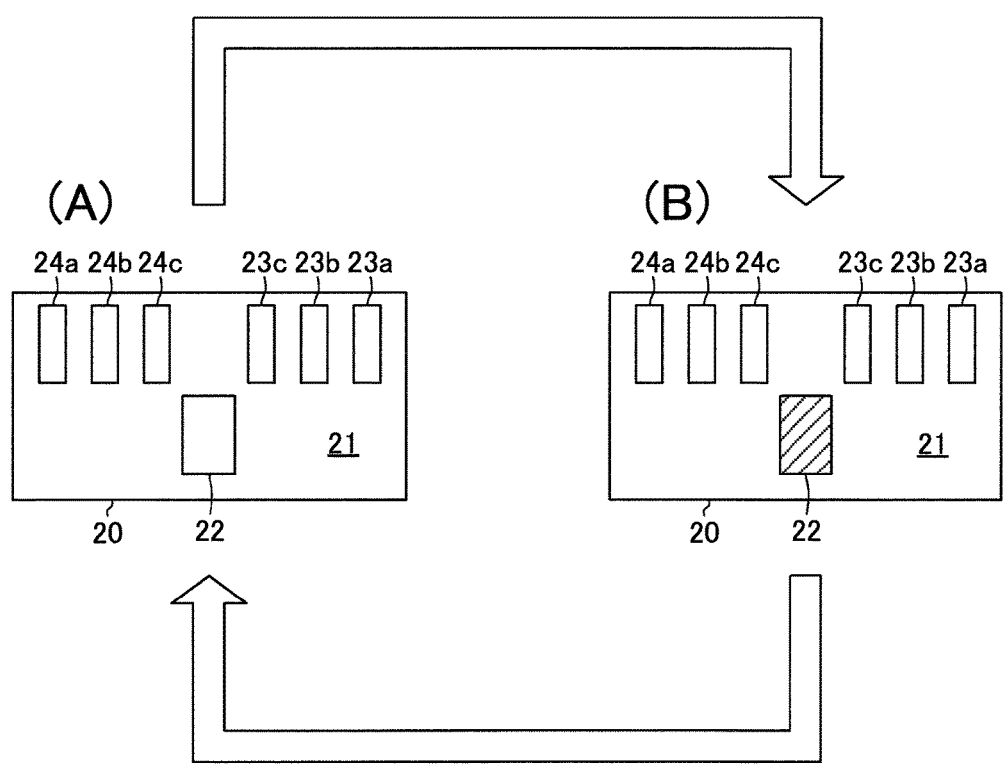

According to the short center lighting process, the center lighting display part 22 which is off as shown in (A) of FIG. 7 is lighted as shown in (B) of FIG. 7. Then, the center lighting display part 22 is turned off as shown in (A) of FIG. 7 when the predetermined lighting time Ttt elapses after the display part 22 is turned on.

Further, the meter ECU 60 starts the second short center lighting process for turning on the center lighting display part 22 at a time t52 of an elapse of a predetermined interval Titv after the time t51 of a completion of the first short center lighting process. Then, the meter ECU 60 turns off the center lighting display part 22 at a time t53 of an elapse of the predetermined lighting time Ttt after the time t52 of a start of the second short center lighting process. Thereby, the second short center lighting process is completed.

Then, at a time t54 of the elapse of the predetermined interval Titv from the time t53 of a completion of the second short center lighting process, the meter ECU 60 starts the continuous center lighting process for lighting the center lighting display part 22 while the walking person 10h is detected. Thereby, while the walking person 10h is detected, the center lighting display part 22 continues to be lighted.

As described above, when the walking person 10h is detected, the meter ECU 60 performs the lighting of the center lighting display part 22 for the predetermined lighting time Ttt twice and then, continues the lighting of the center lighting display part 22 while the walking person 10h is detected.

In this embodiment, the predetermined interval Titv is shorter than the predetermined lighting time Ttt. In this regard, the predetermined interval Titv may be longer than the predetermined lighting time Ttt or may be equal to the predetermined lighting time Ttt.

(Buzzer Control A0)

When receiving the start command signal SBstart, deriving from the detection of the walking person 10h, the buzzer ECU 70 executes a buzzer control A0. The buzzer control A0 is a control for executing an alerting process a predetermined number of times Nb (in this embodiment, three times) at the predetermined interval Titv. The alerting process is a process for causing the buzzer 30 to generate the alerting sound.

According to the buzzer control A0, when receiving the start command signal SBstart at the time t50, the buzzer ECU 70 starts the first alerting process. Thereby, the first alerting process starts at the same time as a start of the first short center lighting process of the center lighting control A0.

Figure 6:
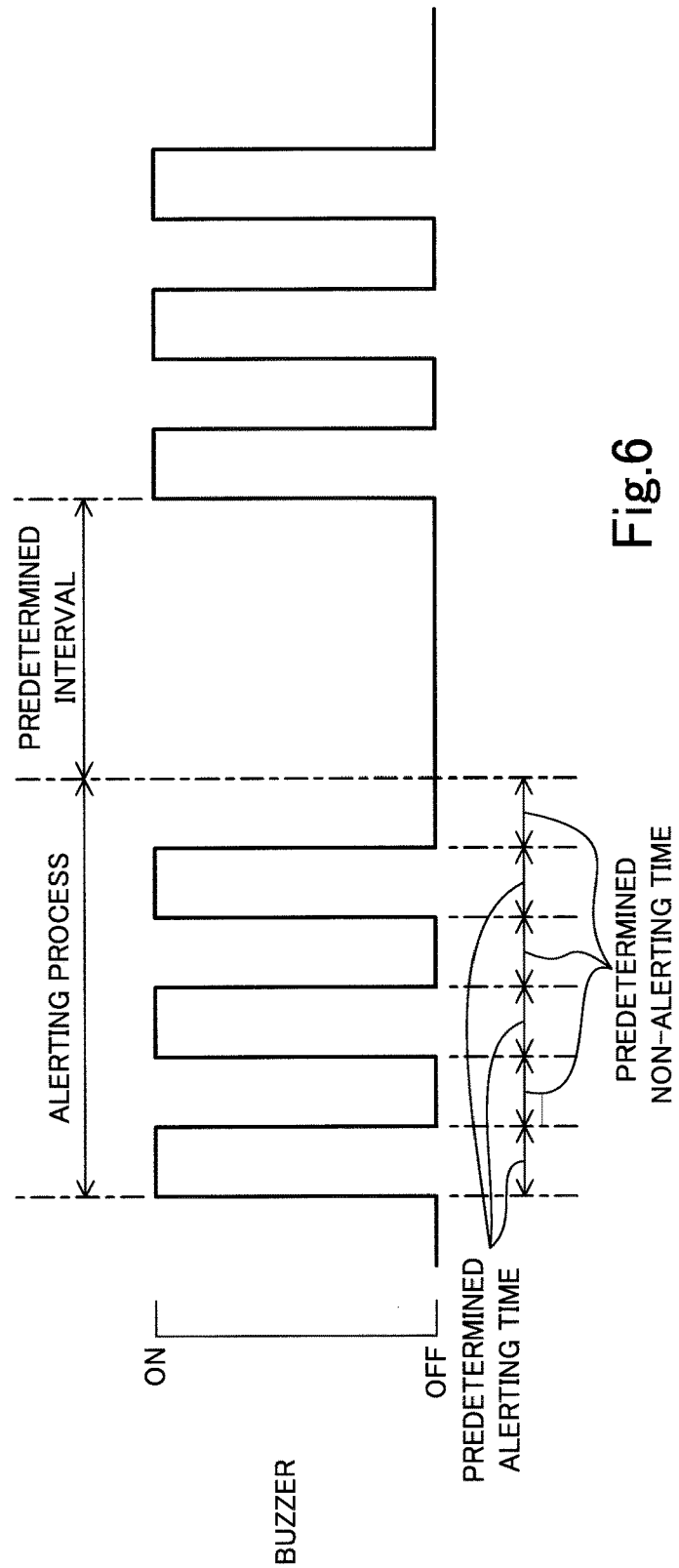
FIG. 6 is a view for showing a time chart illustrating an enlarged part of the lighting pattern shown in FIG. 5.

As shown in FIG. 6, according to the alerting process, a generation of the alerting sound by the buzzer 30 for a predetermined alerting time Tkh and a stop of the generation of the alerting sound by the buzzer 30 for a predetermined non-alerting time Thkh are alternately performed three times, respectively.

Therefore, when the buzzer ECU 70 starts the first alerting process, the buzzer ECU 70 causes the buzzer 30 to start a first generation of the alerting sound (see "ON" in FIG. 6). Then, the buzzer ECU 70 causes the buzzer 30 to stop the first generation of the alerting sound (see "OFF" in FIG. 6) when the predetermined alerting time Tkh elapses after the buzzer 30 starts the first generation of the alerting sound Then, the buzzer ECU 70 causes the buzzer 30 to start a second generation of the alerting sound when the predetermined non-alerting time Thkh elapses after the buzzer 30 stops the first generation of the alerting sound. Then, the buzzer ECU 70 causes the buzzer 30 to stop the second generation of the alerting sound when the predetermined alerting time Tkh elapses after the buzzer 30 starts the second generation of the alerting sound.

Then, the buzzer ECU 70 causes the buzzer 30 to start a third generation of the alerting sound when the predetermined non-alerting time Thkh elapses after the buzzer 30 stops the second generation of the alerting sound. Lastly, the buzzer ECU 70 causes the buzzer 30 to stop the third generation of the alerting sound when the predetermined alerting time Tkh elapses after the buzzer 30 starts the third generation of the alerting sound. The buzzer ECU 70 terminates the alerting process when the predetermined non-alerting time Thkh elapses after the buzzer 30 stops the third generation of the alerting sound. Thereby, the first alerting process is completed.

In this embodiment, each of the predetermined alerting time Tkh and the predetermined non-alerting time Thkh is set to one-sixth of the predetermined lighting time Ttt. Therefore, the predetermined alerting time Tkh and the predetermined non-alerting time Thkh are equal to each other and the execution time of the alerting process (=3× Tkh+3×Thkh) is equal to the predetermined lighting time Ttt.

As shown in FIG. 5, the buzzer ECU 70 executes the second alerting process at a time t52 of the elapse of the predetermined interval Titv from the time t51 of a completion of the first alerting process. In addition, the buzzer ECU 70 executes the third alerting process at a time t54 of the elapse of the predetermined interval Titv after a time of a completion of the second alerting process.

(Stop of Center Lighting Control A0)

When the walking person 10h becomes undetectable, the camera ECU 41 sends to the driving assist ECU 50 a rear side walking person non-detection signal SHhkc for informing the driving assist ECU 50 of a fact that the walking person 10h is not detected. When receiving the signal SHhkc, the driving assist ECU 50 sends to the meter ECU 60 a stop command signal SHstop for causing the meter ECU 60 to stop the center lighting control A0 and sends to the buzzer ECU 70 a stop command signal SBstop for causing the buzzer ECU 70 to stop the buzzer control A0.

As shown in FIG. 5, when an initial lighting period Tinitial equal to the predetermined lighting time Ttt elapses after the meter ECU 60 starts the continuous center lighting process, the meter ECU 60 stops the center lighting control A0 at a time t55 of a reception of the stop command signal SHstop. On the other hand, in an example shown in FIG. 5, the buzzer control A0 has been completed before the buzzer ECU 70 receives the stop command signal SBstop. Thus, the buzzer ECU 70 ignores the signal SBstop.

Alternatively, although not shown, when receiving the stop command signal SHstop in the predetermined interval Titv between the first and second short center lighting processes, the meter ECU 60 stops the center lighting control A0 at a time of a reception of the signal SHstop. In this case, the buzzer ECU 70 stops the buzzer control A0 at the reception of the stop command signal SBstop, that is, at a time of a stop of the center lighting control A0.

Similarly, when receiving the stop command signal SHstop in the predetermined interval Titv between the second short center lighting process and the continuous center lighting process, the meter ECU 60 stops the center lighting control A0 at the time of the reception of the signal SHstop. In this case, the buzzer ECU 70 stops the buzzer control A0 at the time of the reception of the stop command signal SBstop, that is, at the time of the stop of the center lighting control A0.

When receiving the stop command signal SHstop during the execution of the first or second short center lighting process of the center lighting control A0, the meter ECU 60 completes the short center lighting process of the center lighting control A0 which is being executed at the time of the reception of the signal SHstop. Then, at a time of a completion of the short center lighting process of the center lighting control A0, the meter ECU 60 stops the center lighting control A0. In this case, the buzzer ECU 70 completes the alerting process of the buzzer control A0 which is being executed at the time of the reception of the signal SBstop. Then, at a time of a completion of the alerting process of the buzzer control A0, the buzzer ECU 70 stops the buzzer control A0.

In addition, when the time of the reception of the stop command signal SHstop is before the initial lighting period Tinitial elapses after starting the continuous center lighting process, the meter ECU 60 stops the center lighting control A0 at a time of an elapse of the initial lighting period Tinitial. In this case, the buzzer ECU 70 stops the buzzer control A0 at the time of the elapse of the initial lighting period Tinitial, that is, at a time of a stop of the center lighting control A0.

The summary of the center lighting control A0 and the buzzer control A0 executed by the embodiment control apparatus when the walking person 10h is detected has been described. Thereby, the driver of the own vehicle 10a can know that the walking person 10h exists at the rear side of the own vehicle 10a by the lighting of the center lighting display part 22 and the generation of the alerting sound.

(Right Lighting Control B0)

When the radar sensor ECU 42 detects the right rear side vehicle 10b, the radar sensor ECU 42 sends to the driving assist ECU 50 a right rear side vehicle detection signal SRkc for informing the driving assist ECU 50 of a fact that the right rear side vehicle 10b is detected.

When receiving the right rear side vehicle detection signal SRkc, the driving assist ECU 50 sends to the meter ECU 60 a start command signal SRstart for causing the meter ECU 60 to start a right lighting control for controlling the lighting of the right lighting display part 23 and sends to the buzzer ECU 70 a start command signal SBstart for causing the buzzer ECU 70 to start the buzzer control for controlling the activation of the buzzer 30.

When receiving the start command signal SRstart, the meter ECU 60 executes a right lighting control B0 for executing a right lighting process a predetermined number of times Nr at the predetermined interval Titv. The right lighting process is a process for lighting the right lighting display part 23. In this embodiment, the predetermined number of times Nr is set to the maximum number of the right lighting process which can be executed while the right rear side vehicle 10b is detected and increases as a time elapsing until the right rear side vehicle 10b becomes undetectable after the time of the first detection of the right rear side vehicle 10b, increases.

Figure 8:
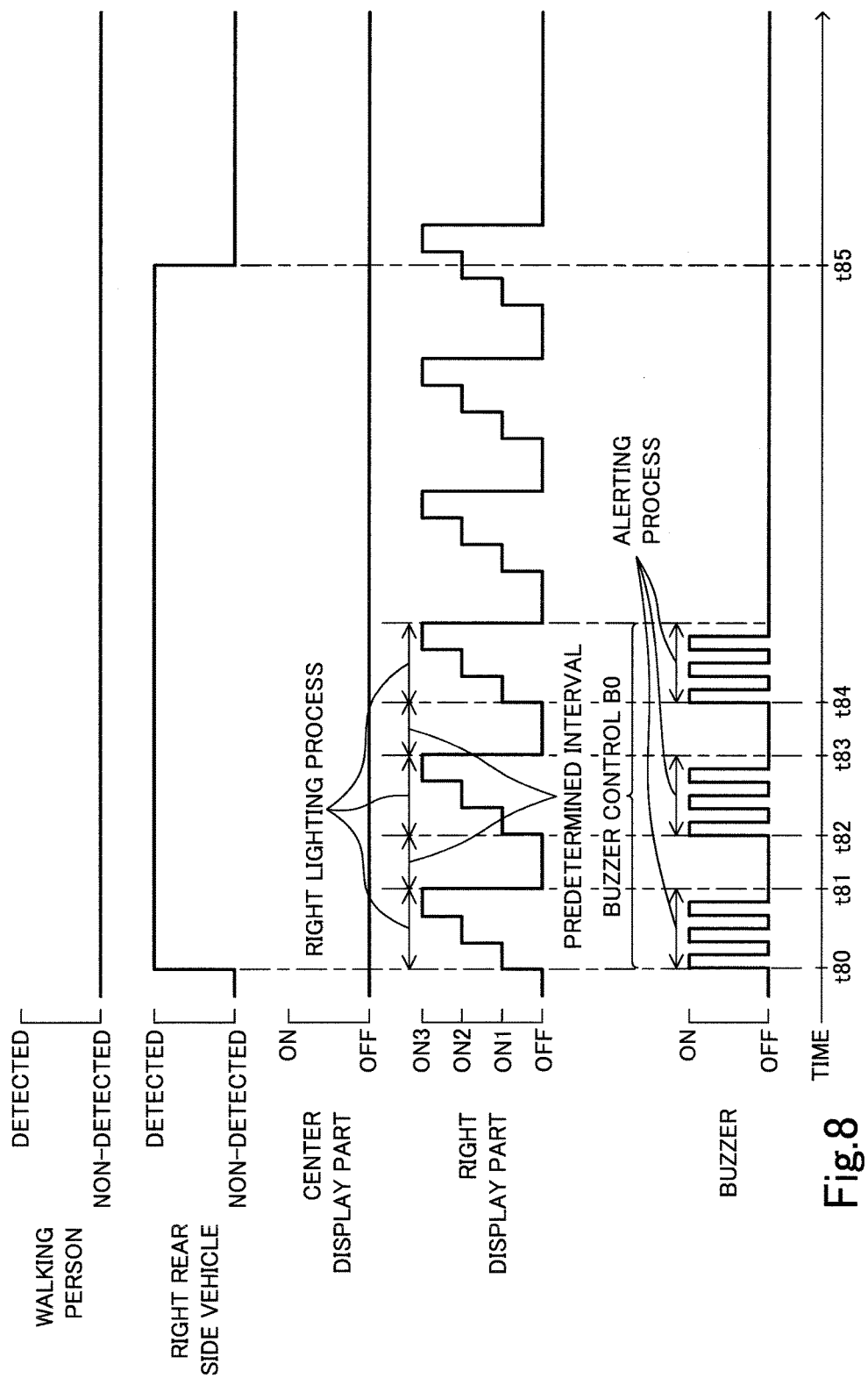
FIG. 8 is a view for showing a time chart illustrating an example of the lighting pattern of a right display part when a person walking at the right rear side of the vehicle is detected.

According to the right lighting control B0, as shown in FIG. 8, the meter ECU 60 starts the right lighting process at a time t80 of a reception of the start command signal SRstart.

Figure 9:
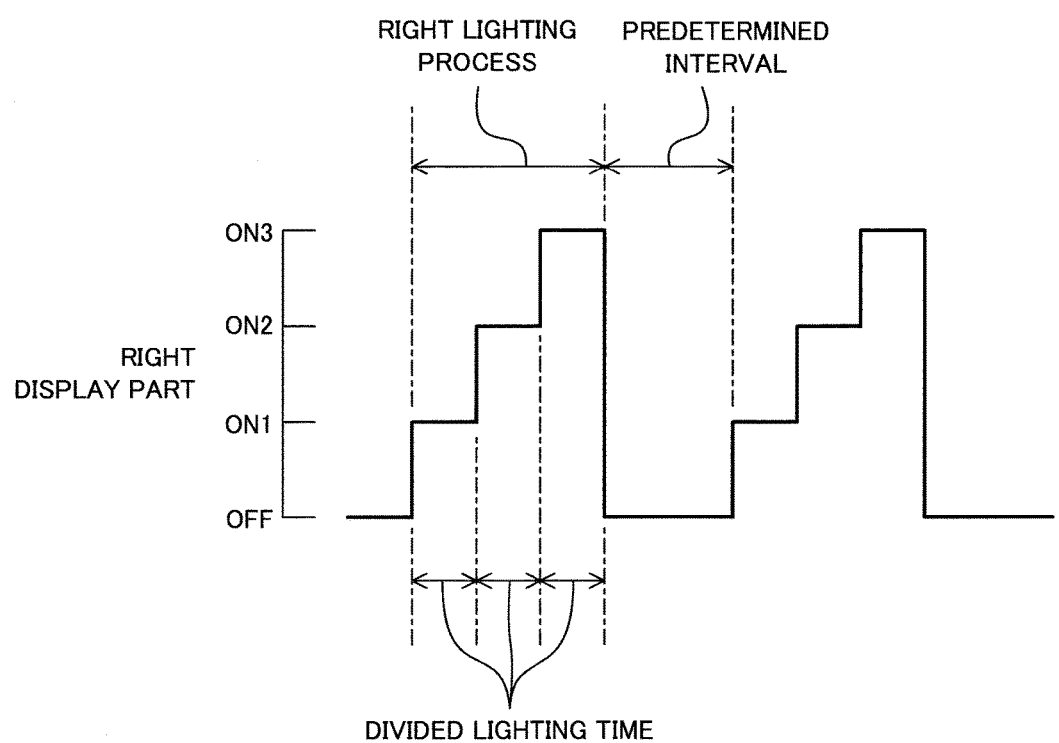
FIG. 9 is a view for showing a time chart illustrating an enlarged part of the lighting pattern shown in FIG. 8.

According to the right lighting process, first, the meter ECU 60 turns on the first lighting display portion 23a of the right lighting display part 23 (see "ON1" in FIG. 9). Then, at a time of an elapse of a predetermined divided lighting time Tbk after turning on the first lighting display portion 23a, the meter ECU 60 turns on the second lighting display portion 23b (see "ON2" in FIG. 9) with lighting the first lighting display portion 23a. Then, at a time of a reception of the divided lighting time Tbk after turning on the second lighting display portion 23b, the meter ECU 60 turns on the third lighting display portion 23c (see "ON3" in FIG. 9) with lighting the first and second lighting display portions 23a and 23b. Then, at a time of the elapse of the divided lighting time Tbk after turning on the third lighting display portion 23c, the meter ECU 60 turns off all of the lighting display portions 23a to 23c (see "OFF" in FIG. 9).

Figure 10:
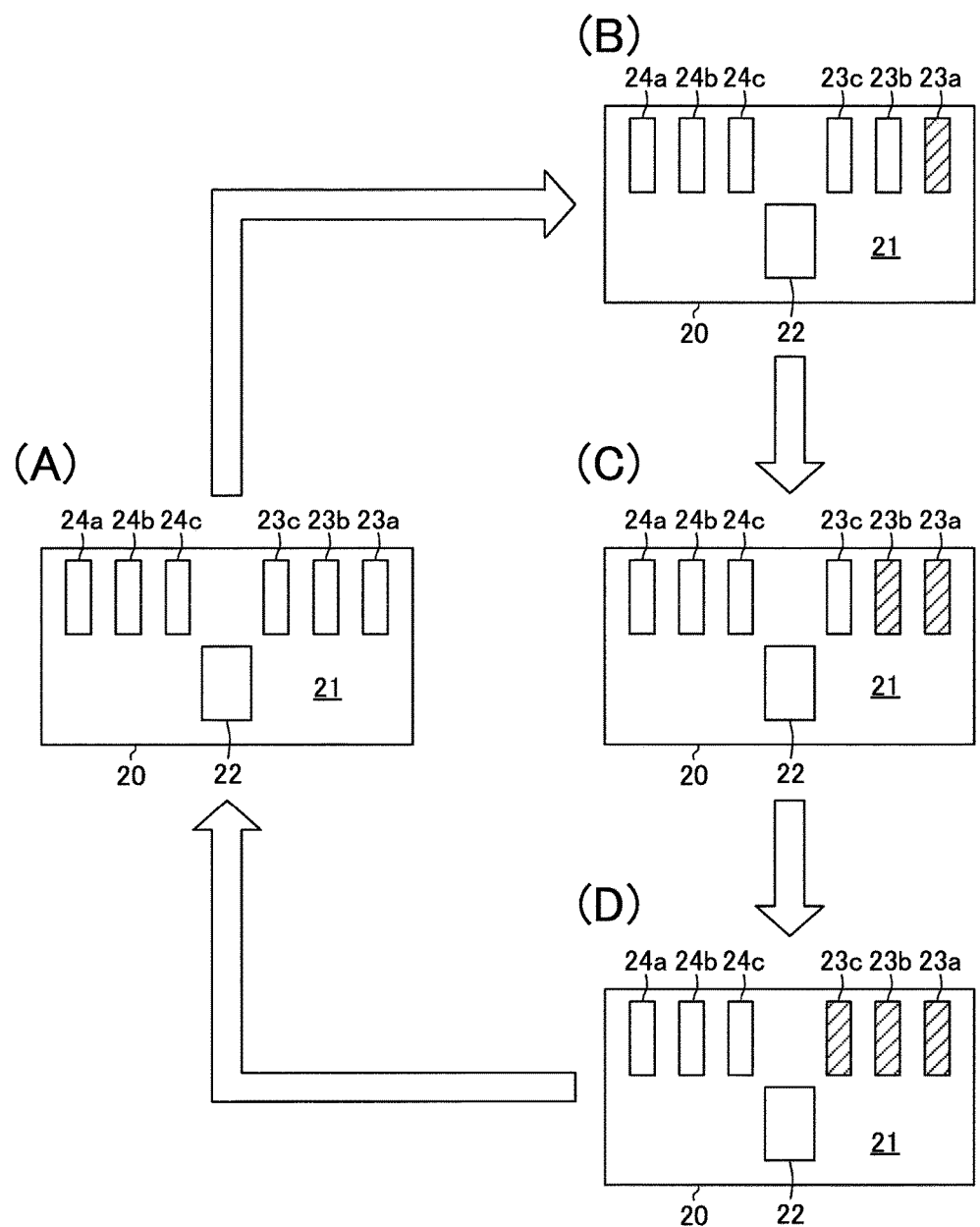

As described above, according to the right lighting process, first, the first lighting display portion 23a among the lighting display portions 23a to 23c which are off as shown in (A) of FIG. 10 is lighted as shown in (B) of FIG. 10. Next, as shown in (C) of FIG. 10, the first and second lighting display portions 23a and 23b are lighted. Next, as shown in (D) of FIG. 10, the first to third lighting display portions 23a to 23c are lighted. Next, all of the lighting display portions 23a to 23c are turned off as shown (A) of FIG. 10.

The divided lighting time Tbk is set to one-third of the predetermined lighting time Ttt (Tbk=Ttt/3).

(Buzzer Control B0)

When receiving the start command signal SBstart deriving from the detection of the right rear side vehicle 10b, the buzzer ECU 70 executes the same buzzer control B0 as the buzzer control A0. According to the buzzer control B0, as shown in FIG. 8, the buzzer ECU 70 starts the first alerting process at a time t80 of a reception of the start command signal SBstart. Then, at a time t82 of the elapse of the predetermined interval Titv from a time t81 of a completion of the first alerting process, the buzzer ECU 70 starts the second alerting process. Then, at a time t84 of the elapse of the predetermined interval Titv from a time t83 of a completion of the second alerting process, the buzzer ECU 70 starts the third alerting process.

In this case, each of the alerting processes is started at a time of a start of the right display process. In addition, in each of the alerting processes, a first generation of the alerting sound is started at a time of a start of the lighting of the first lighting display portion 23a, a second generation of the alerting sound is started at a time of a start of the lighting of the second lighting display portion 23b and a third generation of the alerting sound is started at a time of a start of the lighting of the third lighting display portion 23c.

(Stop of Right Lighting Control B0)

When the right rear side vehicle 10b becomes undetectable, the radar sensor ECU 42 sends to the driving assist ECU 50 a right rear side vehicle non-detection signal SRhkc for informing the driving assist ECU 50 of a fact that the vehicle 10b is not detected. When receiving the signal SRhkc, the driving assist ECU 50 sends to the meter ECU 60 the stop command signal SRstop for causing the meter ECU 60 to stop the right lighting control B0 and sends to the buzzer ECU 70 the stop command signal SBstop for causing the buzzer ECU 70 to stop the buzzer control B0.

As shown in FIG. 8, at a time t85 of a reception of the stop command signal SRstop, the meter ECU 60 has not completed the right lighting process. In this case, the meter ECU 60 stops the right lighting control B0 when completing the right lighting process which is being executed at the time t85. On the other hand, the buzzer ECU 70 has completed the buzzer control B0 before receiving the stop command signal SBstop. Thus, the buzzer ECU 70 ignores the signal SBstop. In this regard, when the buzzer ECU 70 executes the alerting process at the time of the reception of the signal SBstop, the buzzer ECU 70 completes the alerting process which is being executed at the time of the reception of the signal SBstop. Then, the buzzer ECU 70 stops the buzzer control B0 when completing the alerting process, that is, when the meter ECU 60 stops the right lighting control B0.

Although not shown, when receiving the stop command signal SRstop in the predetermined interval Titv during the execution of the right lighting control B0, the meter ECU 60 stops the right lighting control B0 at the time of the reception of the signal SRstop. In this case, the buzzer ECU 70 stops the buzzer control B0 at the time of the reception of the stop command signal SBstop, that is, at a time of a stop of the right lighting control B0. In this regards, when the buzzer ECU 70 has completed the buzzer control B0 when receiving the stop command signal SBstop, the buzzer ECU 70 ignores the signal SBstop.

The summary of the right lighting control B0 and the buzzer control B0 executed by the embodiment control apparatus has been described. Thereby, the driver of the own vehicle 10a can be informed of the fact that the right rear side vehicle 10b exists at the right rear side of the own vehicle 10a by the lighting of the right lighting display part 23 and the generation of the alerting sound.

(Left Lighting Control C0)

When the radar sensor ECU 42 detects the left rear side vehicle 10c, the radar sensor ECU 42 sends to the driving assist ECU 50 a left rear side vehicle detection signal SLkc for informing the driving assist ECU 50 of a fact that the left rear side vehicle 10c is detected.

When receiving the left rear side vehicle detection signal SLkc, the driving assist ECU 50 sends to the meter ECU 60 the start command signal SLstart for causing the meter ECU 60 to start a left lighting control for controlling the lighting of the left lighting display part 24 and sends to the buzzer ECU 70 the start command signal SBstart for causing the buzzer ECU 70 to start the buzzer control for controlling the activation of the buzzer 30.

When receiving the start command signal SLstart, the meter ECU 60 executes a left lighting control C0 for executing the left lighting process a predetermined number of times NI at the predetermined interval Titv. The left lighting process is a process for lighting the left lighting display part 24. In this embodiment, the predetermined number of times NI is set to the maximum number of the left lighting process which can be executed while the left rear side vehicle 10c is detected and increases as a time period of the detection of the vehicle 10c from a time of a first detection of the vehicle 10c increases.

According to the left lighting control C0, when receiving the start command signal SLstart, the meter ECU 60 starts a left lighting process.

According to the left lighting process, first, the meter ECU 60 turns on the first lighting display portion 24a of the left lighting display part 24. Then, at a time of the elapse of the divided lighting time Tbk after turning on the first lighting display portion 24a, the meter ECU 60 turns on the second lighting display portion 24b of the left lighting display part 24 with continuing the lighting of the first display portion 24a. Then, at a time of the elapse of the divided lighting time Tbk after turning on the second lighting display portion 24b, the meter ECU 60 turns on the third lighting display portion 24c of the left lighting display part 24 with continuing the lighting of the first and second lighting display portions 24a and 24b. Then, at a time of the elapse of the divided lighting time Tbk after turning on the third lighting display portion 24c, the meter ECU 60 turns off all of the lighting display portions 24a to 24c.

(Buzzer Control C0)

When receiving the start command signal SBstart deriving from the detection of the left rear side vehicle 10c, the buzzer ECU 70 executes the same buzzer control C0 as the buzzer control B0. According to the buzzer control C0, when receiving the start command signal SBstart, the buzzer ECU 70 starts the first alerting process. Then, at a time of the elapse of the predetermined interval Titv after completing the first alerting process, the buzzer ECU 70 starts the second alerting process. Then, at a time of the elapse of the predetermined interval Titv after completing the second alerting process, the buzzer ECU 70 starts the third alerting process.

In this case, each of the first to third alerting processes is started at the same time as the start of each of the first to third left display processes. Further, in each of the first to third alerting processes, the first generation of the alerting sound is started at the same time as the start of the lighting of the first display portion 24a, the second generation of the alerting sound is started at the same time as the start of the lighting of the second lighting display portion 24b and the third generation of the alerting sound is started at the same time as the start of the lighting of the third lighting display portion 24c.

(Stop of Left Lighting Control C0)

When the left rear side vehicle 10c becomes undetectable, the radar sensor ECU 42 sends to the driving assist ECU 50 a left rear side vehicle non-detection signal SLhkc for informing the driving assist ECU 50 of a fact that the vehicle 10c is not detected. When receiving the left rear side vehicle non-detection signal SLhkc, the driving assist ECU 50 sends to the meter ECU 60 the stop command signal SLstop for causing the meter ECU 60 to stop the left lighting control C0 and sends to the buzzer ECU 70 the stop command signal SBstop for causing the buzzer ECU 70 to stop the buzzer control C0.

When receiving the stop command signal SLstop in the predetermined interval Titv during the execution of the left lighting control C0, the meter ECU 60 stops the left lighting control C0 at a time of a reception of the signal SLstop. In this case, the buzzer ECU 70 stops the buzzer control C0 at a time of a reception of the stop command signal SBstop, that is, at a time of a stop of the left lighting control C0. In this regard, when the buzzer ECU 70 has completed the buzzer control C0 at the time of the reception of the signal SBstop, the buzzer ECU 70 ignores the signal SBstop.

When receiving the stop command signal SLstop during an execution of the left lighting process, the meter ECU 60 completes the left lighting process which is being executed at a time of the reception of the signal SLstop. Then, at a time of a completion of the left lighting process, the meter ECU 60 stops the left lighting control C0. In this case, the buzzer ECU 70 completes the alerting process which is being executed at a time of the reception of the stop command signal SBstop. Then, at a time of a completion of the alerting process, that is, at a time of a stop of the left lighting control C0, the buzzer ECU 70 stops the buzzer control C0. In this regard, when the buzzer ECU 70 has completed the buzzer control C0 at the time of the reception of the signal SBstop, the buzzer ECU 70 ignores the signal SBstop.

The summary of the left lighting control C0 and the buzzer control C0 executed by the embodiment control apparatus has been described. Thereby, the driver of the own vehicle 10a can be informed of the fact that the left rear side vehicle 10c exists at the left rear side of the own vehicle 10a by the lighting of the left lighting display part 24 and the generation of the alerting sound.

<Case that Walking Person is Detected after Right Rear Side Vehicle is Detected>

Figure 11A:
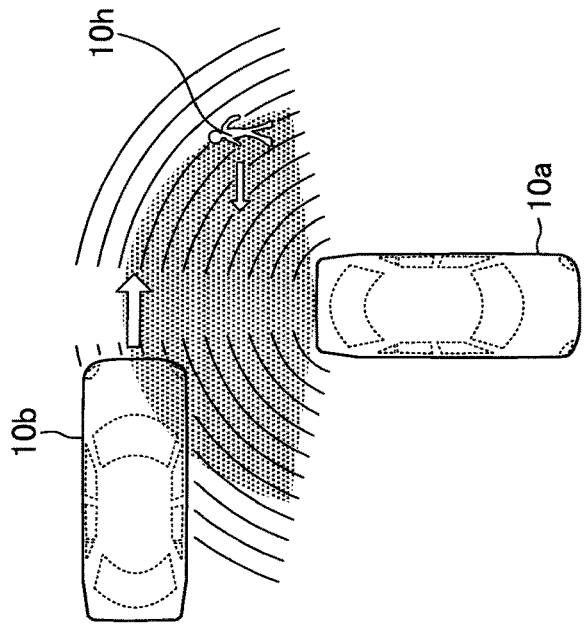
FIG. 11A is a view for showing a situation that the other vehicle travels at the right rear side of the own vehicle.
Figure 11B:
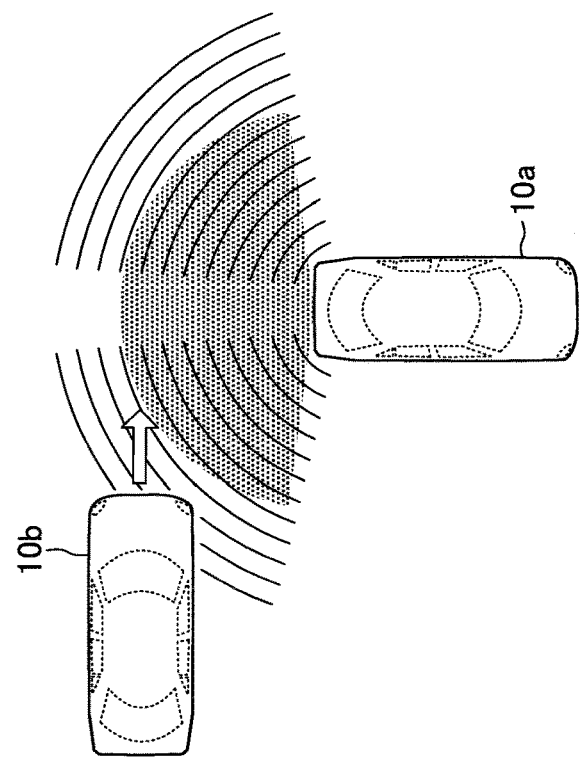
FIG. 11B is a view for showing a situation that a person walking at the left rear side of the own vehicle appears after the situation shown in FIG. 11A occurs.

As shown in FIG. 11A, the right rear side vehicle 10b is first detected and then, as shown in FIG. 11B, while the vehicle 10b is detected, that is, the right lighting control B0 is being executed, the walking person 10h may be detected.

In this case, the meter ECU 60 controls the lighting of the center lighting display part 22, depending on a time of a first detection of the walking person 10*h* as described below and the buzzer ECU 70 controls the activation of the buzzer 30, depending on the time of the first detection of the walking person 10*h* as described below.

(Center Lighting Control A1)

Figure 12:
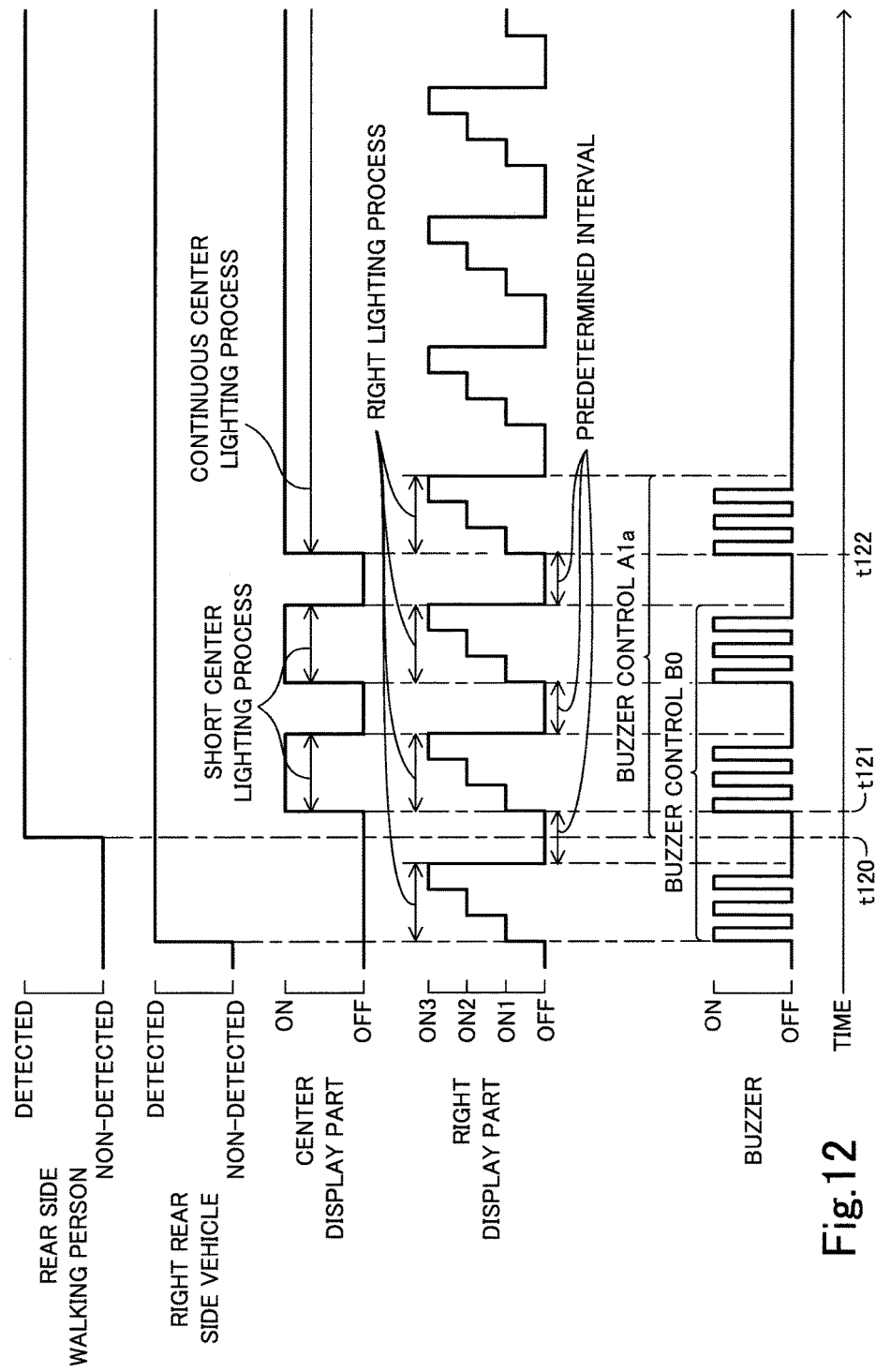
FIG. 12 is a view for showing a time chart illustrating an example of the lighting pattern of the center and right display parts when a walking person is detected after the other vehicle traveling at the right rear side of the own vehicle is detected.

As shown in FIG. 12, when the walking person 10*h* is first detected at a time t120 in the predetermined interval Titv during the execution of the right lighting control B0, the meter ECU 60 starts a center lighting control A1 at the time t120. According to the center lighting control A1, at a time t121 of a start of the right lighting process immediately after the walking person 10*h* is first detected, the meter ECU 60 starts a control for sequentially executing the short center lighting process twice and the continuous center lighting process at the predetermined interval Titv.

(Buzzer Control A1*a*)

As shown in FIG. 12, when the walking person 10*h* is first detected at the time t120 after the first alerting process of the buzzer control B0 is completed and before the second alerting process of the buzzer control B0 is started, the buzzer ECU 70 starts a buzzer control A1*a* at the time t120.

According to the buzzer control A1*a*, the buzzer ECU 70 executes the second and third alerting processes of the buzzer control B0. Then, at a time t122 of the elapse of the predetermined interval Titv after completing the third alerting process of the buzzer control B0, the buzzer ECU 70 starts a control for executing the alerting process once. With this buzzer control A1*a*, after the walking person 10*h* is first detected, the buzzer ECU 70 executes the alerting process a predetermined number of times Nb, that is, three times without including the alerting process which has been completed at the time t120 of the first detection of the walking person 10*h*.

(Buzzer Control A1*b*)

Although not shown, when the walking person 10*h* is first detected after completing the second alerting process of the buzzer control B0 and before starting the third alerting process of the buzzer control B0, the buzzer ECU 70 starts the buzzer control A1*b* at the time of the first detection of the walking person 10*h*.

According to the buzzer control A1*b*, the buzzer ECU 70 executes the third alerting process of the buzzer control B0. Then, at a time of the elapse of the predetermined interval Titv after completing the third alerting process of the buzzer control B0, the buzzer ECU 70 starts a control for executing the alerting process twice at the predetermined interval Titv. With this buzzer control A1*b*, after the walking person 10*h* is first detected, the buzzer ECU 70 executes the alerting process a predetermined number of times Nb (in this embodiment, three times) without including the alerting process which has been completed at the time of the first detection of the walking person 10*h*.

(Buzzer Control A1*c*)

When the walking person 10*h* is first detected after completing the buzzer control B0, the buzzer ECU 70 starts a buzzer control A1*c* at the time of the first detection of the walking person 10*h*.

According to the buzzer control A1*c*, at a time of a start of the short center lighting process immediately after the walking person 10*h* is first detected, the buzzer ECU 70 starts a control for executing the alerting process three times at the predetermined interval Titv. With this buzzer control A1*c*, the buzzer ECU 70 executes the alerting process a predetermined number of times Nb (in this embodiment, three times) without including the alerting process which has been completed at the time of the first detection of the walking person 10*h*.

(Center Lighting Control A2)

Figure 13:
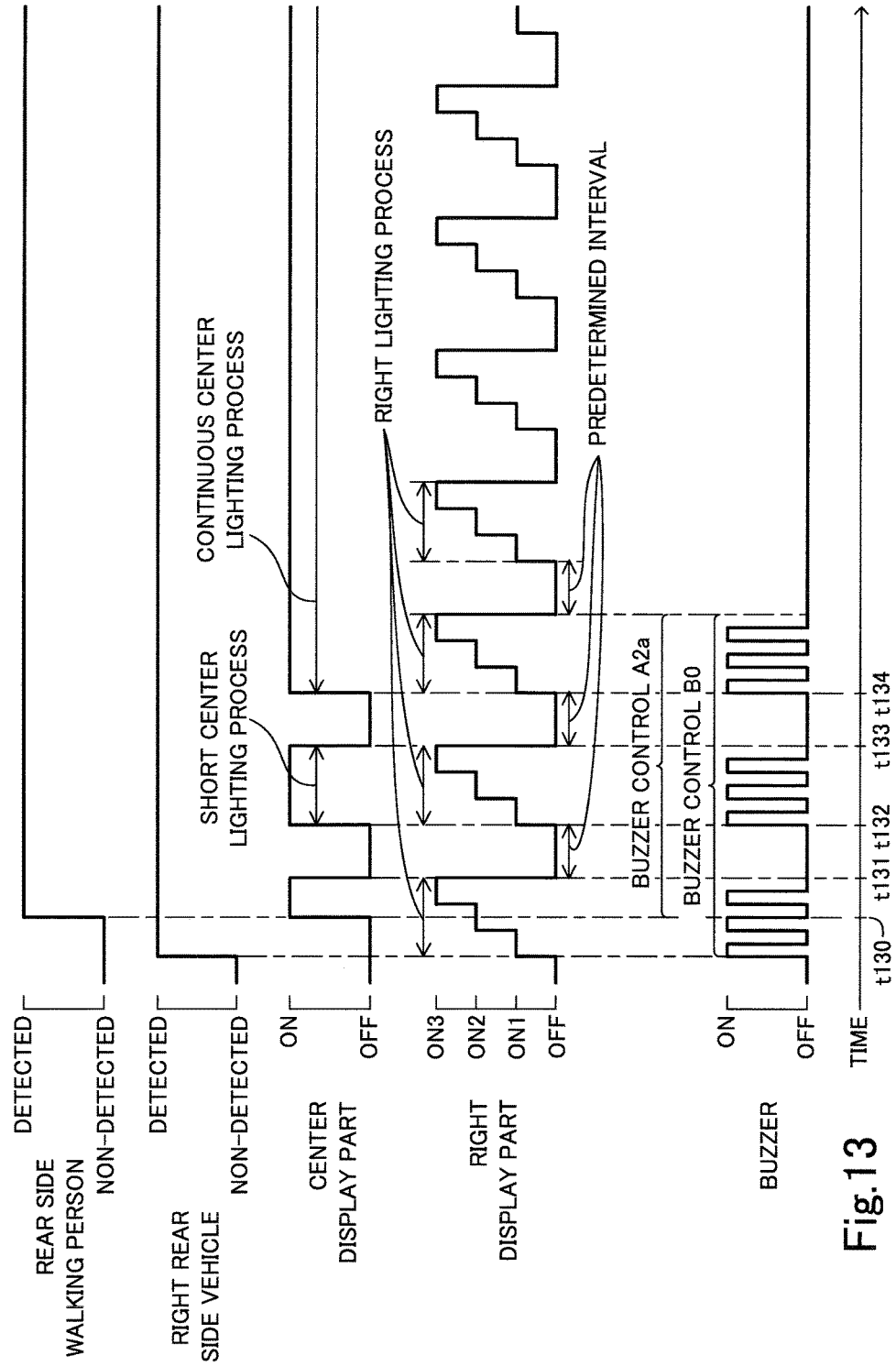
FIG. 13 is a view for showing a time chart illustrating an example of the lighting pattern of the center and right display parts when a walking person is detected after the other vehicle traveling at the right rear side of the own vehicle is detected.
Figure 14:
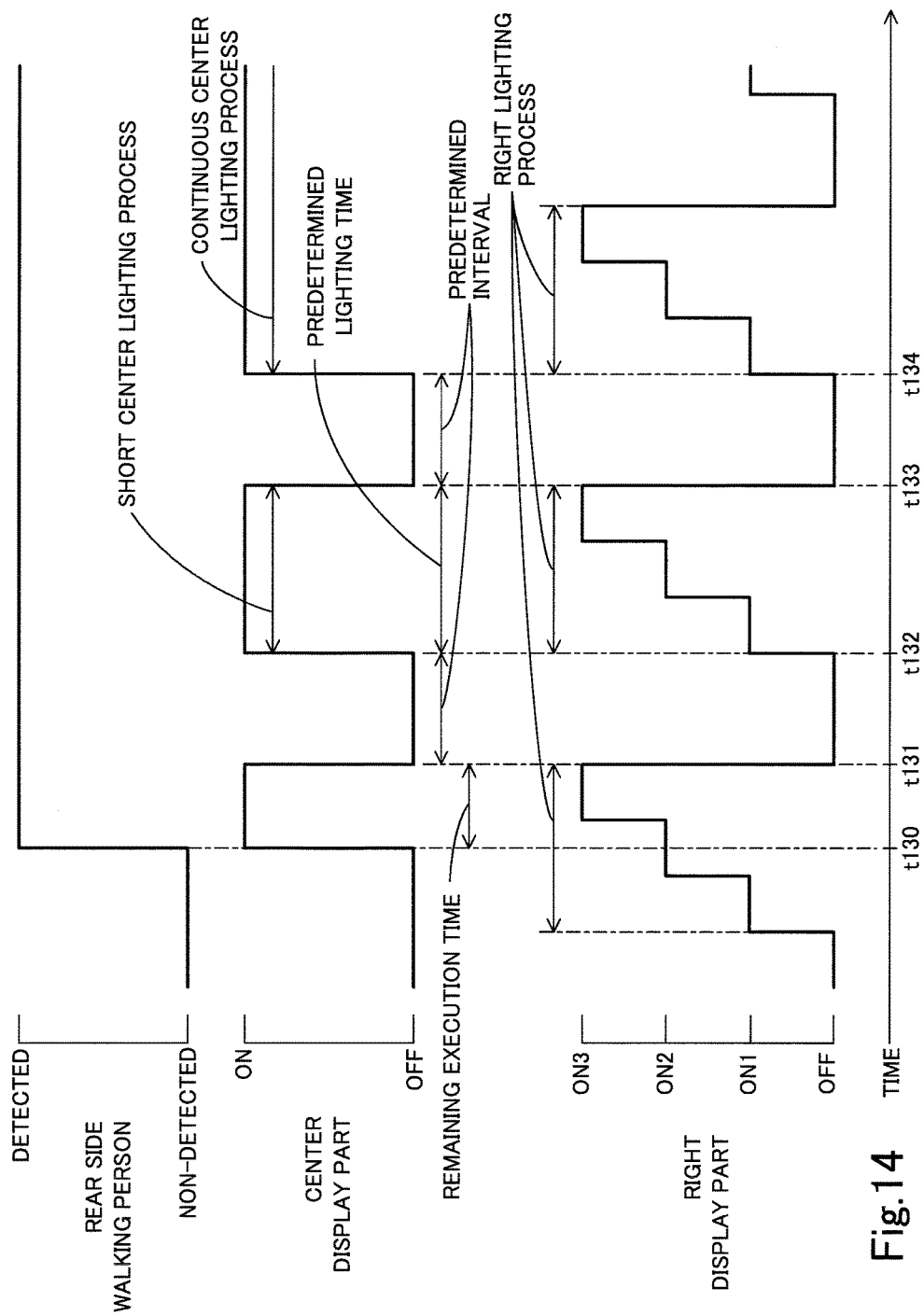
FIG. 14 is a view for showing a time chart illustrating an enlarged part of the lighting pattern shown in FIG. 13.

As shown in FIGS. 13 and 14, when the walking person 10*h* is first detected at a time t130 during the execution of the right lighting process of the right lighting control B0, the meter ECU 60 acquires an execution time Tzn of the right lighting process which remains at the time t130 (hereinafter, the execution time Tzn will be referred to as "the remaining execution time Tzn"). When the acquired remaining execution time Tzn is equal to or larger than a threshold time Tth, the meter ECU 60 starts a center lighting control A2 at the time t130.

According to the center lighting control A2, the meter ECU 60 turns on the center lighting display part 22 at the time t130 of the first detection of the rear side walking person 10*h*. Then, at a time t131 of an elapse of the remaining execution time Tzn after starting the lighting of the display part 22, the meter ECU 60 turns off the center lighting display part 22. Then, at a time t132 of the elapse of the predetermined interval Titv after turning off the display part 22, the meter ECU 60 starts a control for sequentially executing the short center lighting process the predetermined number of times Nh (in this embodiment, once) and the continuous center lighting process once at the predetermined interval Titv.

In this case, at the time t131 of the elapse of the remaining execution time Tzn after turning on the display part 22, the meter ECU 60 turns off the center lighting display part 22. Then, at the time t132 of the elapse of the predetermined interval Titv after turning off the display part 22, the meter ECU 60 starts the short center lighting process to light the display part 22. Then, at a time t133 of the elapse of the predetermined lighting time Ttt after turning on the display part 22, the meter ECU 60 turns off the display part 22. Then, at a time t134 of the elapse of the predetermined interval Titv after turning off the display part 22, the meter ECU 60 starts the continuous center lighting process to light the display part 22.

(Buzzer Control A2*a*)

As shown in FIG. 13, when the walking person 10*h* is first detected at the time t130 during the execution of the first alerting process of the buzzer control B0, the buzzer ECU 70 starts a buzzer control A2*a* at the time t130.

According to the buzzer control A2*a*, the buzzer ECU 70 completes the first alerting process of the buzzer control B0 which is being executed at the time t130 of the first detection of the walking person 10*h*. Then, the buzzer ECU 70 executes the second and third alerting processes of the buzzer control B0. With this buzzer control A2*a*, after the walking person 10*h* is first detected, the buzzer ECU 70 executes the alerting process the predetermined number of times Nb (in this embodiment, three times) including the alerting process which is being executed at the time t130 of the first detection of the walking person 10*h*.

(Buzzer Control A2*b*)

Although not shown, when the walking person 10*h* is first detected during the execution of the second alerting process of the buzzer control B0, the buzzer ECU 70 starts a buzzer control A2*b* at the time of the first detection of the walking person 10*h*.

According to the buzzer control A2*b*, the buzzer ECU 70 completes the second alerting process of the buzzer control B3 which is being executed at the time of the first detection of the walking person 10*h*. Then, the buzzer ECU 70 executes the third alerting process of the buzzer control B0.

Then, at a time of the elapse of the predetermined interval Titv after completing the third alerting process of the buzzer control B0, the buzzer ECU 70 starts a control for executing the alerting process once. With this buzzer control A2b, after the walking person 10h is first detected, the buzzer ECU 70 executes the alerting process the predetermined number of times Nb (in this example, three times) including the alerting process which is being executed at the time of the first detection of the walking person 10h.

(Buzzer Control A2c)

When the walking person 10h is first detected during the execution of the third alerting process of the buzzer control B0, the buzzer ECU 70 starts a buzzer control A2c at the time of the first detection of the walking person 10h.

According to the buzzer control A2c, the buzzer ECU 70 completes the third alerting process of the buzzer control B0 which is being executed at the time of the first detection of the walking person 10h. Then, at a time of the elapse of the predetermined interval Titv after completing the third alerting process of the buzzer control B0, the buzzer ECU 70 starts a control for executing the alerting process twice at the predetermined interval Titv. With this buzzer control A2c, after the walking person 10h is first detected, the buzzer ECU 70 executes the alerting process the predetermined number of times Nb (in this embodiment, three times) including the alerting process which is being executed at the time of the first detection of the walking person 10h.

(Buzzer Control A2d)

When the walking person 10h is first detected during the execution of the right lighting process after completing the buzzer control B0, the buzzer ECU 70 starts a buzzer control A2d at the time of the first detection of the walking person 10h. According to the buzzer control A2d, at a time of the elapse of the predetermined interval Titv from a time of a completion of the right lighting process which is being executed at the time of the first detection of the walking person 10h, the buzzer ECU 70 starts a control for executing the alerting processes twice at the predetermined interval Titv.

(Center Lighting Control A3)

Figure 15:
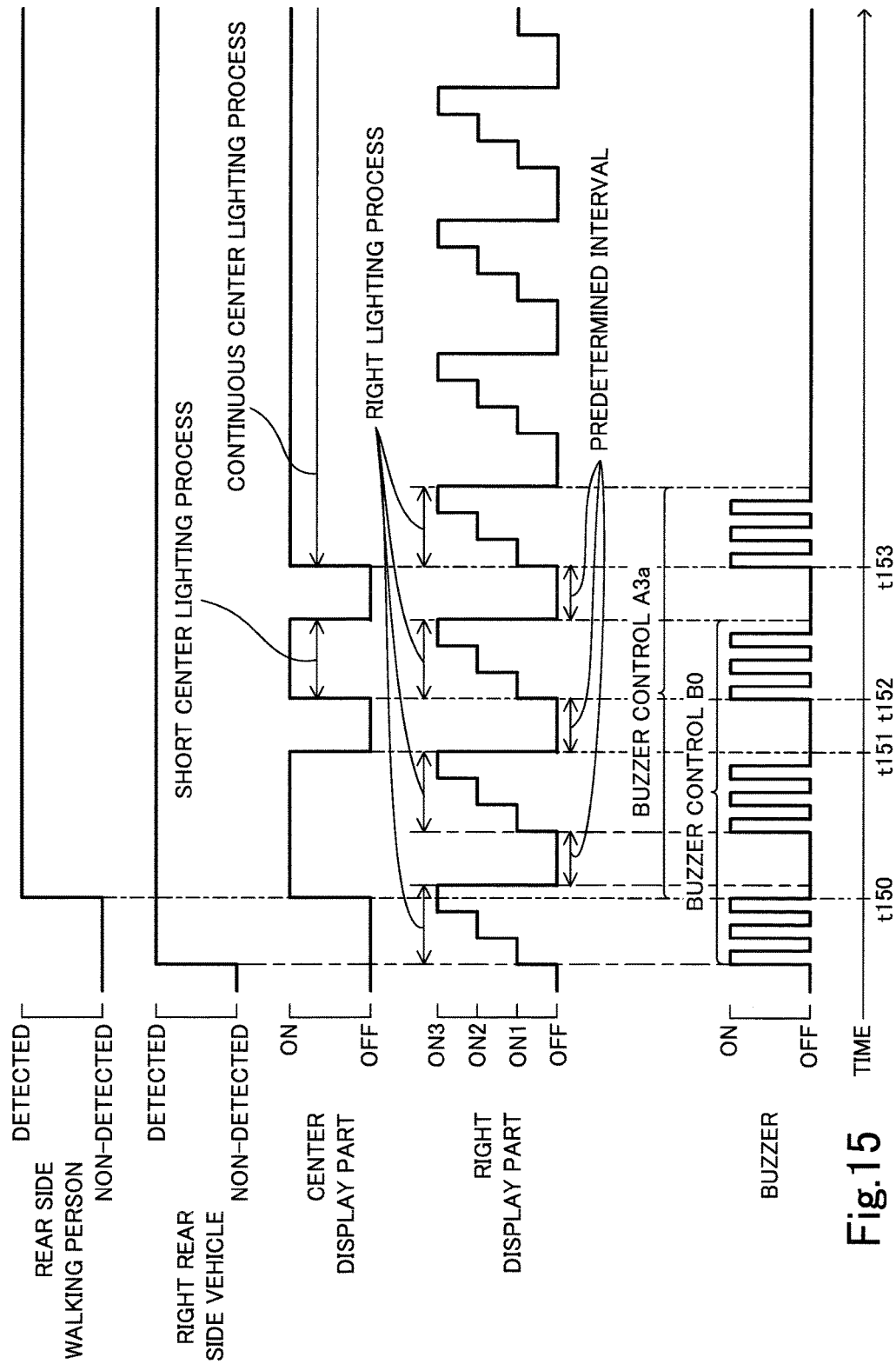
FIG. 15 is a view for showing a time chart illustrating an example of the lighting pattern of the center and right display parts when a walking person is detected after the other vehicle traveling at the right rear side of the own vehicle is detected.
Figure 16:
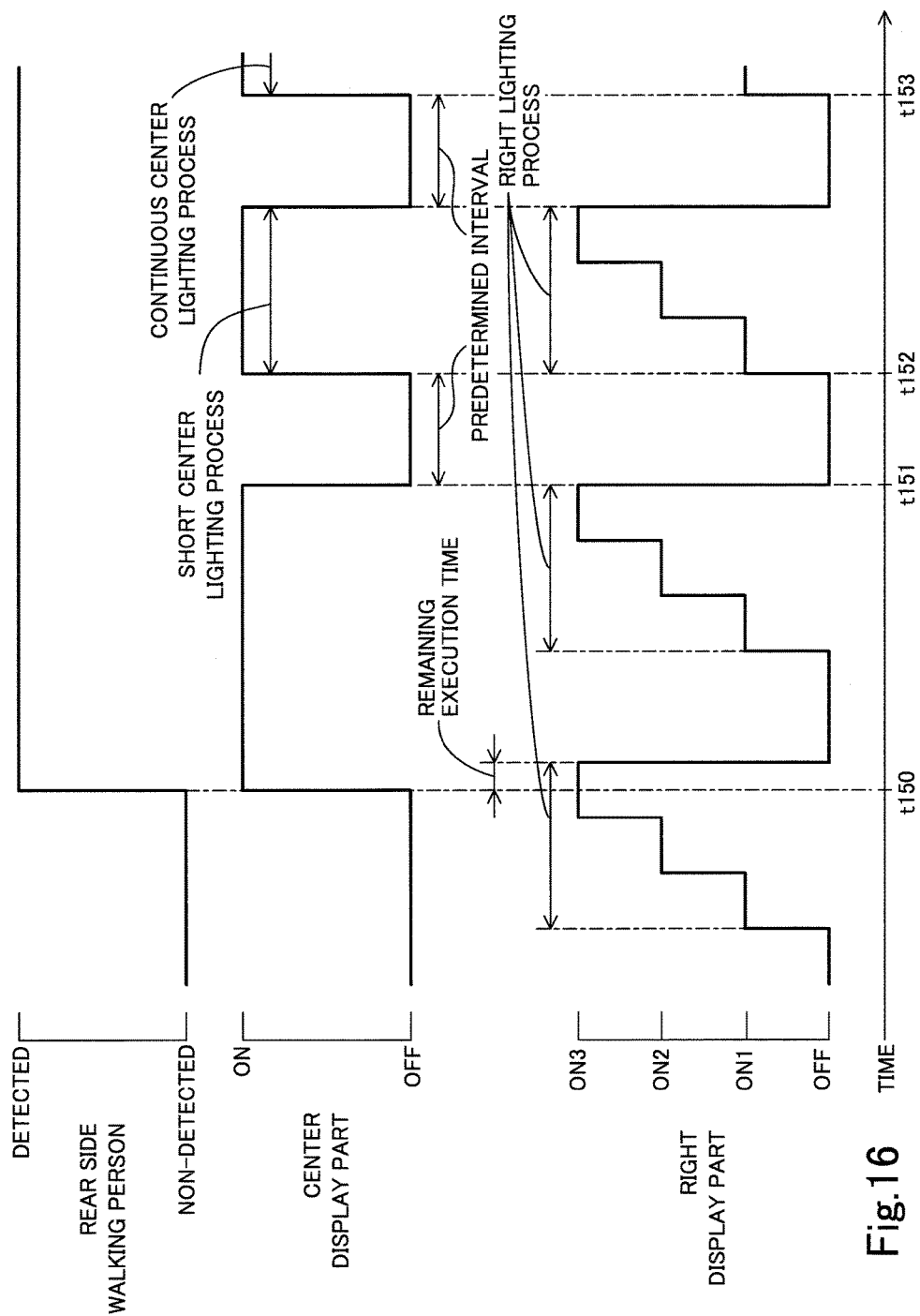
FIG. 16 is a view for showing a time chart illustrating an enlarged part of the lighting pattern shown in FIG. 15.

As shown in FIGS. 15 and 16, when the walking person 10h is first detected at a time t150 during the execution of the right lighting process of the right lighting process B0 and the remaining execution time Tzn at the time t150 is shorter than the threshold time Tth, the meter ECU 60 starts a center lighting control A3 at the time t150.

According to the center lighting control A3, the meter ECU 60 turns on the center lighting display part 22 at the time t150 of the first detection of the walking person 10h. Then, at a time t151 of the completion of the right lighting process executed next to the right lighting process which is being executed at the time of the first detection of the walking person 10h, the meter ECU 60 turns off the display part 22. Then, at a time t152 of the elapse of the predetermined interval Titv after turning off the display part 22, the meter ECU 60 starts a control for sequentially executing the short center lighting process a predetermined number of times (in this embodiment, once) and the continuous center lighting process once at the predetermined interval Titv.

According to the center lighting control A3, at the time t150 of the first detection of the walking person 10h, the meter ECU 60 turns on the center lighting display part 22. Then, at the time t151 of the completion of the right lighting process executed next to the right lighting process which is being executed at the time of the first detection of the walking person 10h, the meter ECU 60 turns off the display part 22. Then, at the time t152 of the elapse of the predetermined interval Titv after turning off the display part 22, the meter ECU 60 starts the short center lighting process to light the display part 22. Then, at a time of the elapse of the predetermined lighting time Ttt after turning on the display part 22, the meter ECU 60 turns off the display part 22. Then, at a time t153 of the elapse of the predetermined interval Titv after turning off the display part 22, the meter ECU 60 starts the continuous center lighting process to light the display part 22.

(Buzzer Control A3a)

In this regard, as shown in FIG. 15, when the walking person 10h is first detected at the time t150 during the execution of the first alerting process of the buzzer control B0, the buzzer ECU 70 starts a buzzer control A3a at the time t150.

According to the buzzer control A3a, the buzzer ECU 70 completes the first alerting process of the buzzer control B0 which is being executed at the time of the first detection of the walking person 10h. Then, the buzzer ECU 70 executes the second and third alerting processes of the buzzer control B0. Then, at the time t153 of the elapse of the predetermined interval Titv after completing the third alerting process of the buzzer control B0, the buzzer ECU 70 starts a control for executing the alerting process once. With this buzzer control A3a, after the walking person 10h is first detected, the buzzer ECU 70 executes the alerting process the predetermined number of times Nb (in this embodiment, three times) without including the alerting process which is being executed at the time of the first detection of the walking person 10h.

(Buzzer Control A3b)

Although not shown, when the walking person 10h is first detected during the execution of the second alerting process of the buzzer control B0, the buzzer ECU 70 starts a buzzer control A3b at the time of the first detection of the walking person 10h.

According to the buzzer control A3b, the buzzer ECU 70 completes the second alerting process of the buzzer control B0 which is being executed at the time of the first detection of the walking person 10h. Then, the buzzer ECU 70 executes the third alerting process of the buzzer control B0. Then, at a time of the elapse of the predetermined interval Titv after completing the third alerting process of the buzzer control B0, the buzzer ECU 70 starts a control for executing the alerting process twice at the predetermined interval Titv. With this buzzer control A3b, after the walking person 10h is first detected, the buzzer ECU 70 executes the alerting process the predetermined number of times Nb (in this embodiment, three times) without including the alerting process which is being executed at the time of the first detection of the walking person 10h.

(Buzzer Control A3c)

When the walking person 10h is first detected during the execution of the third alerting process of the buzzer control B0, the buzzer ECU 70 starts a buzzer control A3c at the time of the first detection of the walking person 10h.

According to the buzzer control A3c, the buzzer ECU 70 completes the third alerting process of the buzzer control B0 which is being executed at the time of the first detection of the walking person 10h. Then, at a time of the elapse of the predetermined interval Titv after completing the third alerting process of the buzzer control B0, the buzzer ECU 70 starts a control for executing the alerting process three times at the predetermined interval Titv. With this buzzer control A3c, after the walking person 10h is first detected, the buzzer ECU 70 executes the alerting process the predetermined number of times Nb (in this embodiment, three times)

without including the alerting process which is being executed at the time of the first detection of the walking person 10*h*.

(Buzzer Control A3*d*)

When the walking person 10*h* is first detected during the execution of the right lighting process after completing the buzzer control B0, the buzzer ECU 70 starts a buzzer control A3*d* at the time of the first detection of the walking person 10*h*. According to the buzzer control A3*d*, at a time of the elapse of the predetermined interval Titv from a time of a completion of the right lighting process which is being executed at the time of the first detection of the walking person 10*h*, the buzzer ECU 70 starts a control for executing the alerting process three times at the predetermined interval Titv.

The summary of the operation of the embodiment control apparatus executed when the walking person 10*h* is first detected while the right rear side vehicle 10*b* is detected has been described. According to the center lighting controls A1 to A3, even when the walking person 10*h* is first detected during the execution of the right lighting control, the timings of turning on and off the center lighting display part 22 correspond to the timings of turning on and off the right lighting display part 23, respectively. Thus, the driver can be prevented from feeling troublesome due to the lightings of the center and right display parts 22 and 23 and a possibility that the driver overlooks the detection of the walking person 10*h* can be decreased.

Further, if the alerting process is executed the predetermined number of times including the alerting process which is being executed at the time of the first detection of the walking person 10*h* when the remaining execution time Tzn is shorter than the threshold time Tth, the number of the generation of the alerting sound after the walking person 10*h* is first detected is small. As a result, the driver may not know that the walking person 10*h* is detected. In this regard, according to the embodiment control apparatus, when the remaining execution time Tzn is shorter than the threshold time Tth, after the walking person 10*h* is first detected, the alerting process is executed the predetermined number of times without including the alerting process which is being executed at the time of the first detection of the walking person 10*h*. In this case, compared with a case that the alerting process is executed the predetermined number of times Nb including the alerting process which is being executed at the time of the first detection of the walking person 10*h*, the number of the generation of the alerting sound after the walking person 10*h* is first detected is large. Thus, even when the remaining execution time Tzn is shorter than the threshold time Tth, the driver is likely to know that the walking person 10*h* is detected.

<Case that Walking Person is Detected after Left Rear Side Vehicle is Detected>

(Center Lighting Controls A4 to A6)

The walking person 10*h* may be first detected during the detection of the left rear side vehicle 10*c*, that is, during the execution of the left lighting control. In this case, the meter ECU 60 executes any of center lighting controls A4 to A6 similar to the center lighting controls A1 to A3, respectively executed when the walking person 10*h* is first detected during the execution of the right lighting control, depending on the time of the first detection of the walking person 10*h*.

(Buzzer Controls A4*a* to A4*c*, A5*a* to A5*d* and A6*a* to A6*d*)

In this regard, the buzzer ECU 70 executes any of buzzer controls A4*a* to A4*c*, A5*a* to A5*d* and A6*a* to A6*d* similar to the buzzer controls A1*a* to A1*c*, A2*a* to A2*d* and A3*a* to A3*d*, respectively executed when the walking person 10*h* is first detected during the execution of the right lighting control, depending on the time of the first detection of the walking person 10*h*.

According to the center lighting controls A4 to A6, even when the walking person 10*h* is first detected during the execution of the left lighting control, the timings of turning on and off the center lighting display part 22 correspond to the timings of turning on and off the left lighting display part 24, respectively. Thus, the driver can be prevented from feeling troublesome due to the lightings of the center and left display parts 22 and 24 and the possibility that the driver overlooks the detection of the walking person 10*h* can be decreased.

Further, according to the buzzer controls A6*a* to A6*d* executed when the remaining execution time Tzn is shorter than the threshold time Tth, compared with a case that the alerting process is executed the predetermined number of times Nb including the alerting process which is being executed at the time of the first detection of the walking person 10*h*, the number of the generation of the alerting sound after the walking person 10*h* is first detected is large. Thus, even when the remaining execution time Tzn is shorter than the threshold time Tth, the possibility that the driver knows that the walking person 10*h* is detected increases.

<Case that Right Rear Side Vehicle is Detected after Walking Person is Detected>

Figure 17B:
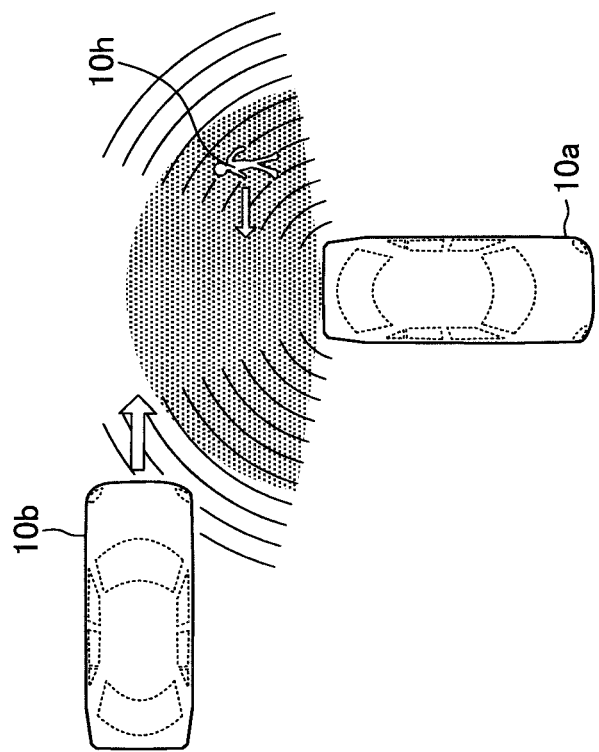
FIG. 17B is a view for showing a situation that a right rear side vehicle (i.e., the other vehicle traveling at the right rear side of the own vehicle) appears after the situation shown in FIG. 17A occurs.
Figure 17A:
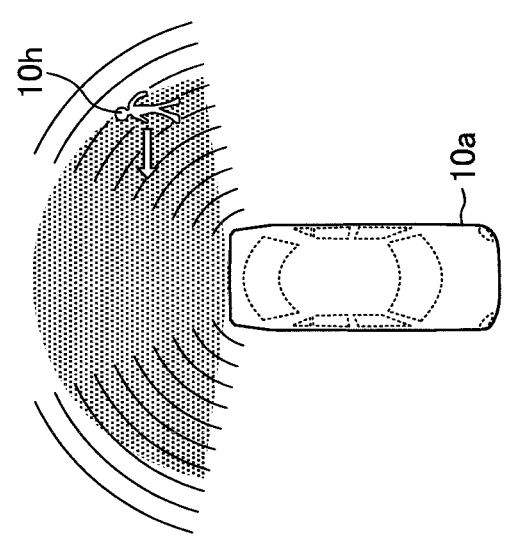
FIG. 17A is a view for showing a situation that a person walks at the left rear side of the own vehicle.

There may occur a situation that the walking person 10*h* is first detected as shown in FIG. 17A and then, the right rear side vehicle 10*b* is first detected during the detection of the walking person 10*h* as shown in FIG. 17B, that is, during the execution of the center lighting control A0. In this case, the meter ECU 60 controls the lighting of the right lighting display part 23, depending on the time of the first detection of the right rear side vehicle 10*b* as described below and the buzzer ECU 70 controls the activation of the buzzer 30, depending on the time of the first detection of the right rear side vehicle 10*b* as described below.

(Right Lighting Control B1)

Figure 18:
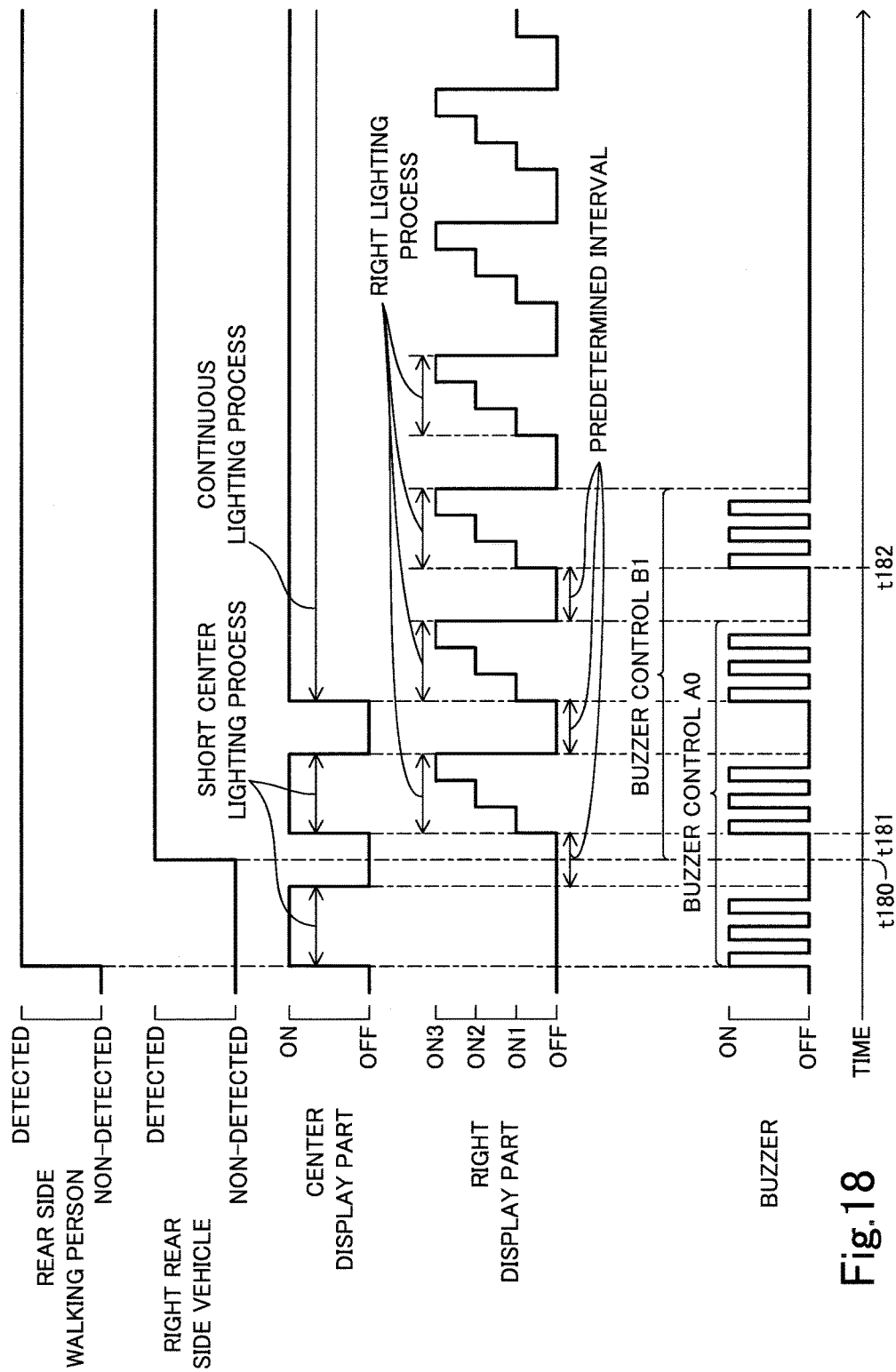
FIG. 18 is a view for showing a time chart illustrating an example of the lighting pattern of the center and right display parts when the right rear side vehicle is detected after the walking person is detected.

As shown in FIG. 18, when the right rear side vehicle 10*b* is first detected at a time t180 in the predetermined interval Titv between the first and second short center lighting processes of the center lighting control A0, the meter ECU 60 starts a right lighting control B1 at a time of a first detection of the right rear side vehicle 10*b*. According to the right lighting control B1, at a time t181 of a start of the second short center lighting process of the center lighting control A0, the meter ECU 60 starts a control for executing the right lighting process the predetermined number of times Nr at the predetermined interval Titv.

(Buzzer Control B1)

In this case, the buzzer ECU 70 starts a buzzer control B1 at the time t180 of the first detection of the right rear side vehicle 10*b*. According to the buzzer control B1, the buzzer ECU 70 executes the second and third alerting processes of the buzzer control A0. Then, at a time t182 of the elapse of the predetermined interval Titv after completing the third alerting process of the buzzer control A0, the buzzer ECU 70 starts a control for executing the alerting process once. With this buzzer control B1, after the right rear side vehicle 10*b* is first detected, the buzzer ECU 70 executes the alerting process the predetermined number of times Nb (in this embodiment, three times) without including the alerting process which has been completed at the time of the first detection of the right rear side vehicle 10*b*.

(Right Lighting Control B2)

Although not shown, when the right rear side vehicle 10b is first detected in the predetermined interval Titv between the second short center lighting process and the continuous center lighting process of the center lighting control A0, the meter ECU 60 starts a right lighting control B2 at the time of the first detection of the right rear side vehicle 10b. According to the right lighting control B2, at a time of the start of the continuous center lighting process of the center lighting control A0 immediately after the right rear side vehicle 10b is first detected, the meter ECU 60 starts a control for executing the right lighting control the predetermined number of times Nr at the predetermined interval Titv.

(Buzzer Control B2)

In this case, the buzzer ECU 70 starts a buzzer control B2 at the time of the first detection of the right rear side vehicle 10b. According to the buzzer control B2, the buzzer ECU 70 executes the third alerting process of the buzzer control B0. Then, at the time of the elapse of the predetermined interval Titv after completing the third alerting process of the buzzer control B0, the buzzer ECU 70 starts a control for executing the alerting process twice at the predetermined interval Titv. With this buzzer control B2, after the right rear side vehicle 10b is first detected, the buzzer ECU 70 executes the alerting process the predetermined number of times Nb (in this embodiment, three times) without including the alerting process which has been completed at the time of the first detection of the right rear side vehicle 10b.

(Right Lighting Control B3)

Figure 19:
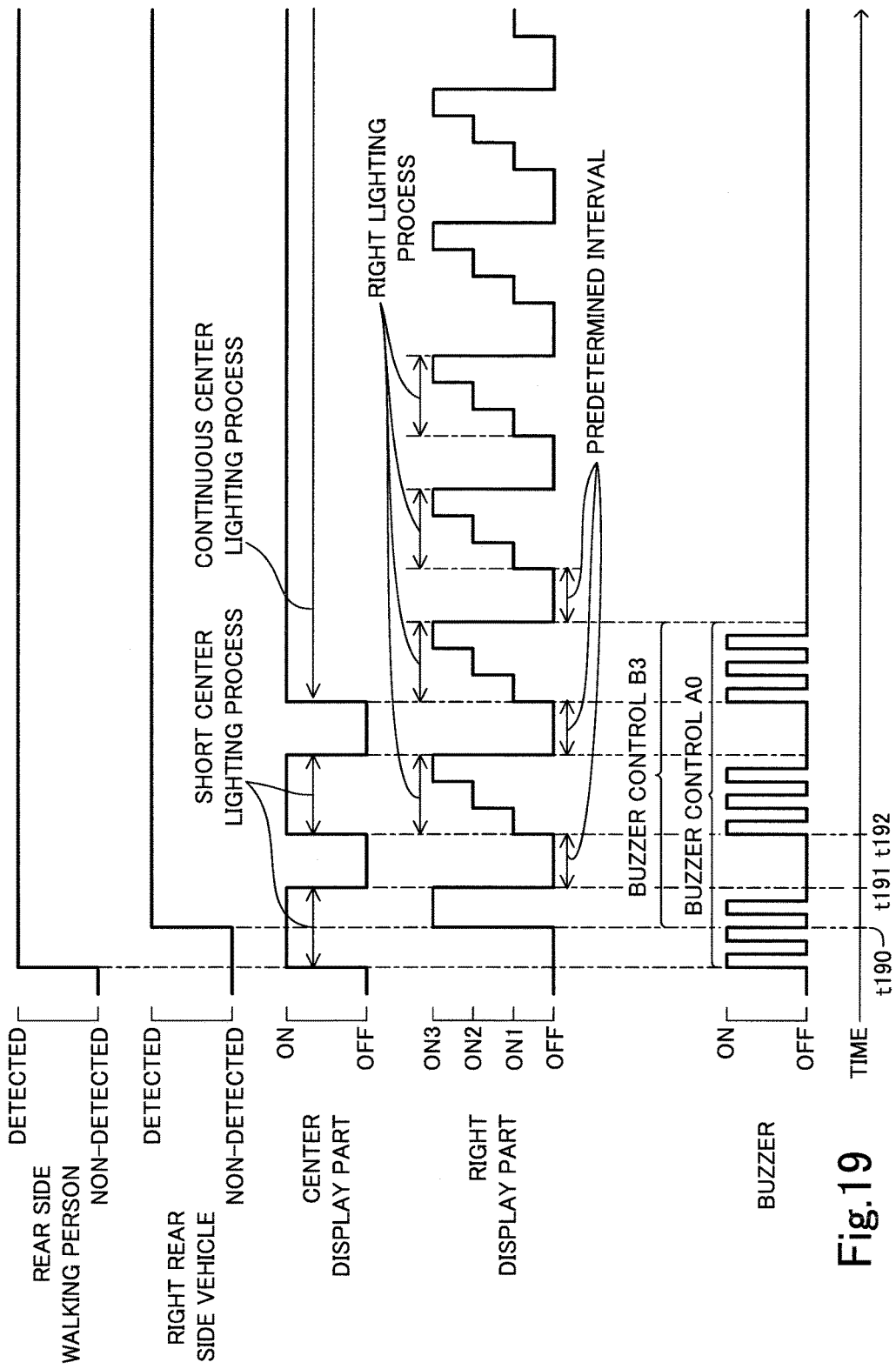
FIG. 19 is a view for showing a time chart illustrating an example of the lighting pattern of the center and right display parts when the right rear side vehicle is detected after the walking person is detected.
Figure 20:
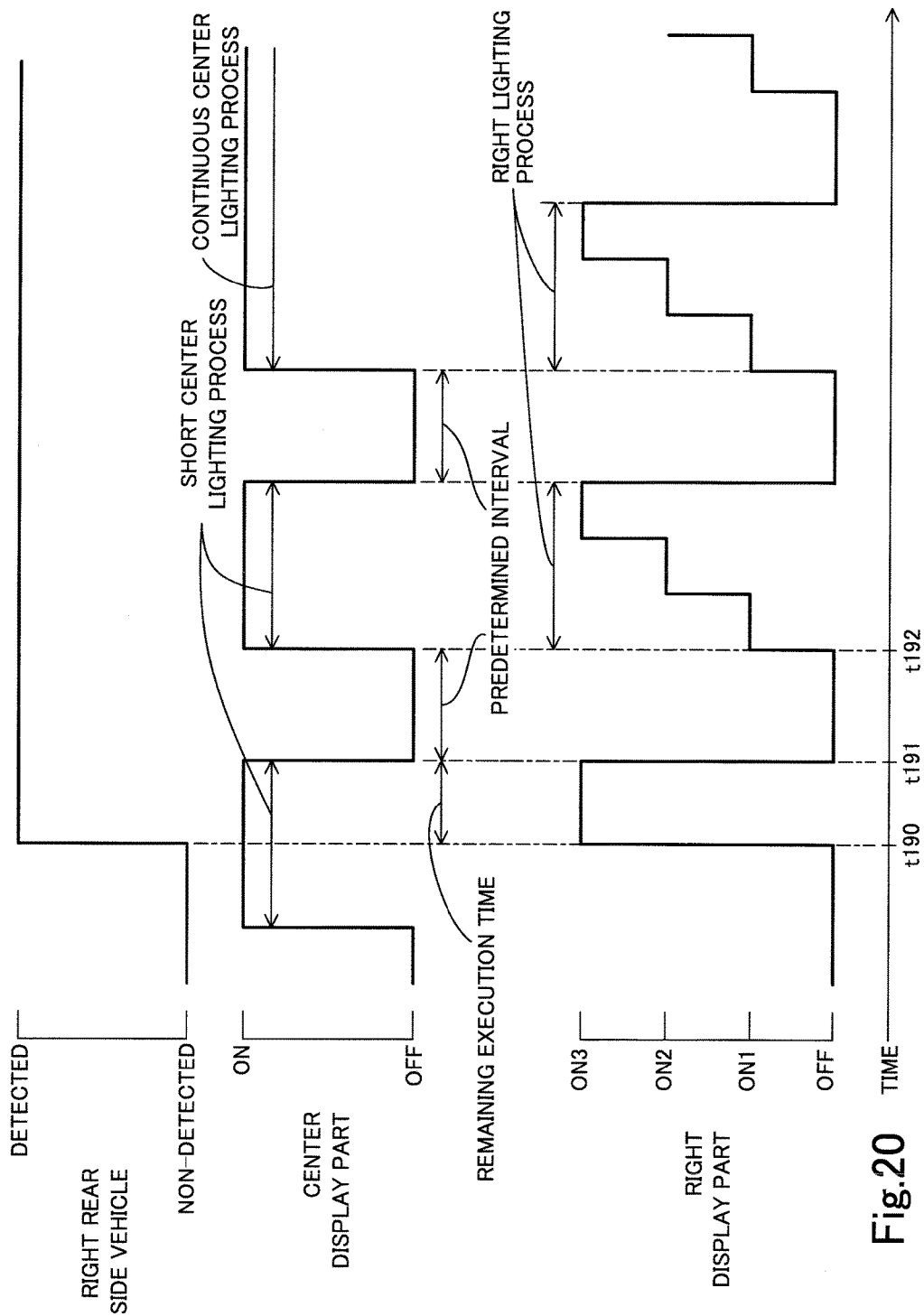
FIG. 20 is a view for showing a time chart illustrating an enlarged part of the lighting pattern shown in FIG. 19.

As shown in FIGS. 19 and 20, when the right rear side vehicle 10b is first detected at a time t190 during the execution of the first short center lighting process of the center lighting control A0, the meter ECU 60 acquires an execution time Tzn of the first short center lighting process remaining at the time t190 (hereinafter, the execution time Tzn will be referred to as "the remaining execution time Tzn"). When the acquired remaining execution time Tzn is equal to or longer than the threshold time Tth, the meter ECU 60 starts a right lighting control B3 at the time t190.

According to the right lighting control B3, at the time t190 of the first detection of the right rear side vehicle 10b, the meter ECU 60 turns on the lighting display portions 23a to 23c. Then, at a time t191 of an elapse of the remaining execution time Tzn after the right rear side vehicle 10b is first detected, the meter ECU 60 turns off the lighting display portions 23a to 23c. Then, at a time t192 of the elapse of the predetermined interval Titv after turning off the display portions 23a to 23c, the meter ECU 60 starts a control for executing the right lighting process the predetermined number of times Nr at the predetermined interval Titv.

(Buzzer Control B3)

In this case, as shown in FIG. 19, the buzzer ECU 70 starts a buzzer control B3 at the time t190 of the first detection of the right rear side vehicle 10b. According to the buzzer control B3, the buzzer ECU 70 completes the first alerting process of the buzzer control A0 which is being executed at the time t190. Then, the buzzer ECU 70 executes the second and third alerting processes of the buzzer control A0. With this buzzer control B3, after the right rear side vehicle 10b is first detected, the buzzer ECU 70 executes the alerting process the predetermined number of times Nb (in this embodiment, three times) including the alerting process which is being executed at the time t190 of the first detection of the right rear side vehicle 10b.

(Right Lighting Control B4)

Although not shown, when the right rear side vehicle 10b is first detected during the execution of the second short center lighting process, the meter ECU 60 acquires an execution time Tzn of the second short center lighting process remaining at the time of the first detection of the right rear side vehicle 10b (hereinafter, the execution time Tzn will be referred to as "the remaining execution time Tzn"). When the acquired remaining execution time Tzn is equal to or longer than the threshold time Tth, the meter ECU 60 starts a right lighting control B4 at the time of the first detection of the right rear side vehicle 10b.

According to the right lighting control B4, the meter ECU 60 turns on the lighting display portions 23a to 23c at the time of the first detection of the right rear side vehicle 10b. Then, at a time of the elapse of the remaining execution time Tzn after turning on the display portions 23a to 23c, the meter ECU 60 turns off the lighting display portions 23a to 23c. Then, at a time of the elapse of the predetermined interval Titv after turning off the display portions 23a to 23c, the meter ECU 60 starts a control for executing the right lighting process the predetermined number of times Nr at the predetermined interval Titv.

(Buzzer Control B4)

In this case, the buzzer ECU 70 starts a buzzer control B4 at the time of the first detection of the right rear side vehicle 10b. According to the buzzer control B4, the buzzer ECU 70 completes the second alerting process of the buzzer control A0 which is being executed at the time of the first detection of the right rear side vehicle 10b. Then, the buzzer ECU 70 executes the third alerting process of the buzzer control A0. Then, at a time of the elapse of the predetermined interval Titv after completing the third alerting process of the buzzer control A0, the buzzer ECU 70 starts a control for executing the alerting process once. With this buzzer control B4, after the right rear side vehicle 10b is first detected, the buzzer ECU 70 executes the alerting process the predetermined number of times Nb (in this embodiment, three times) including the alerting process which is being executed at the time of the first detection of the right rear side vehicle 10b.

(Right Lighting Control B5)

Figure 21:
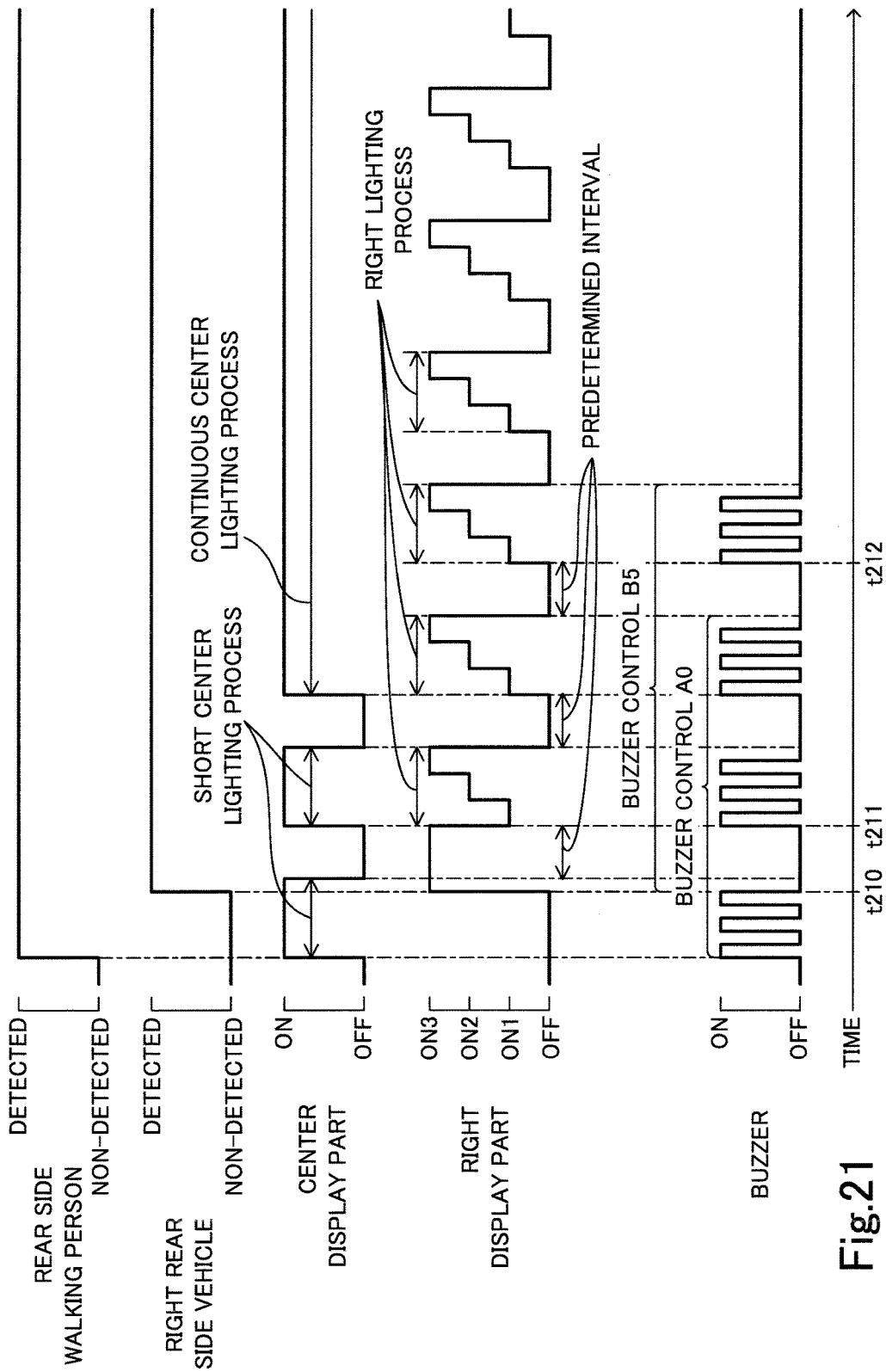
FIG. 21 is a view for showing a time chart illustrating an example of the lighting pattern of the center and right display parts when the right rear side vehicle is detected after the walking person is detected.
Figure 22:
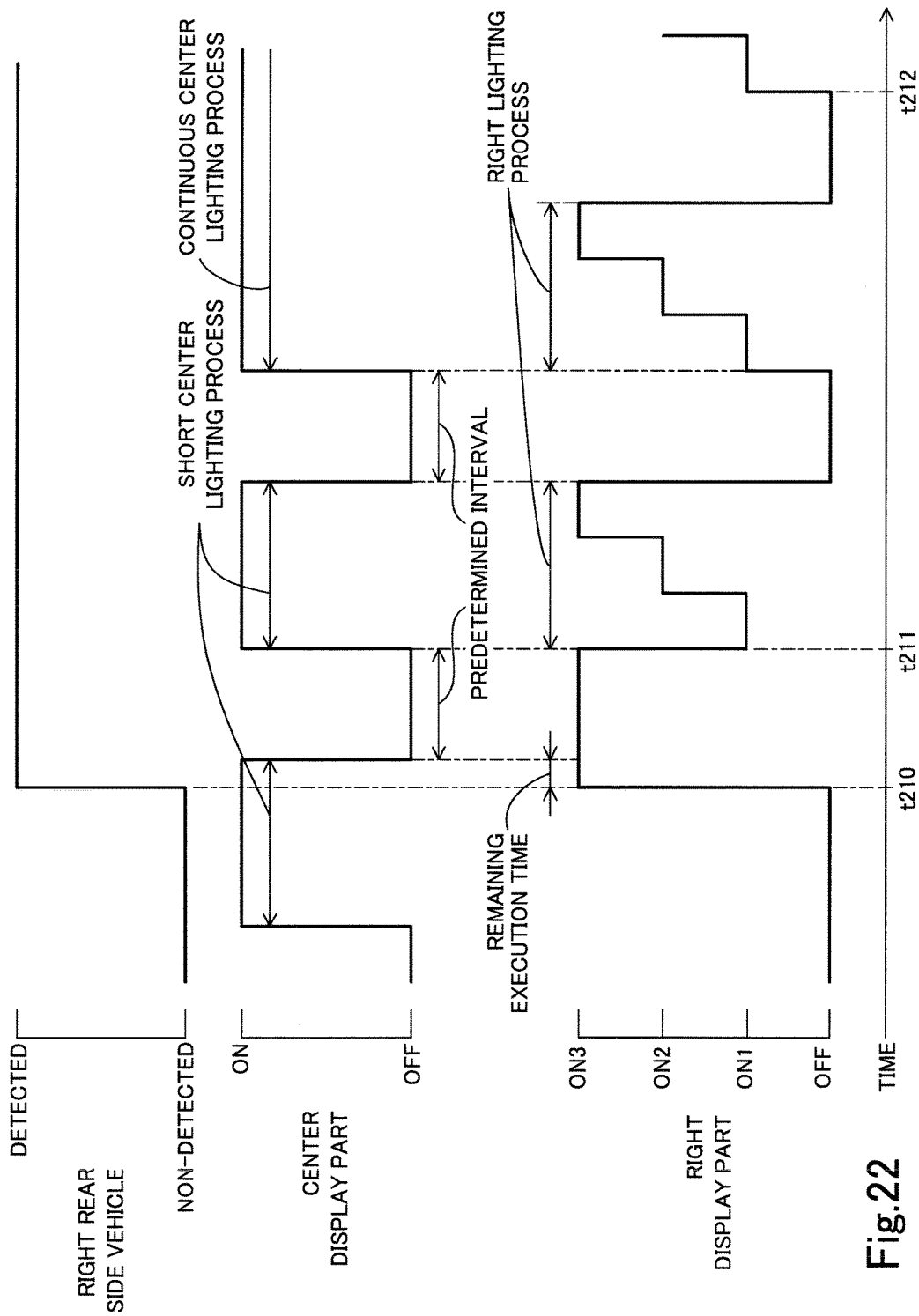
FIG. 22 is a view for showing a time chart illustrating an enlarged part of the lighting pattern shown in FIG. 21.

As shown in FIGS. 21 and 22, when the right rear side vehicle 10b is first detected at a time t210 during the execution of the first short center lighting process of the center lighting control A0 and the remaining execution time Tzn of the first short center lighting process at the time t210 is shorter than the threshold time Tth, the meter ECU 60 starts a right lighting control B5 at the time t210.

According to the right lighting control B5, the meter ECU 60 turns on the lighting display portions 23a to 23c at the time t210 and continues the lighting of the display portions 23a to 23c until a time t211 of the start of the second short center lighting process of the center lighting control A0. Then, at the time t211, the meter ECU 60 starts a control for executing the right lighting process the predetermined number of times Nr at the predetermined interval Titv.

(Buzzer Control B5)

In this case, the buzzer ECU 70 starts a buzzer control B5 at the time t210 of the first detection of the right rear side vehicle 10b. According to the buzzer control B5, the buzzer ECU 70 completes the first alerting process of the buzzer control A0 which is being executed at the time t210. Then, the buzzer ECU 70 executes the second and third alerting processes of the buzzer control A0. Then, at a time t212 of the elapse of the predetermined interval Titv after completing the third alerting process of the buzzer control A0, the buzzer ECU 70 starts a control for executing the alerting process once. With this buzzer control B5, after the right rear side vehicle 10b is first detected, the buzzer ECU 70 executes the alerting process the predetermined number of times Nb (in this embodiment, three times) without including the alerting process which is being executed at the time t210 of the first detection of the right rear side vehicle 10b.

(Right Lighting Control B6)

Although not shown, when the right rear side vehicle 10b is first detected during the execution of the second short center lighting process of the center lighting control A0 and the remaining execution time Tzn at the time of the first detection of the right rear side vehicle 10b is shorter than the threshold time Tth, the meter ECU 60 starts a right lighting control B6 at the time of the first detection of the right rear side vehicle 10b.

According to the right lighting control B6, the meter ECU 60 turns on the lighting display portions 23a to 23c at the time of the first detection of the right rear side vehicle 10b and continues the lighting of the display portions 23a to 23c until the meter ECU 60 starts the continuous center lighting process of the center lighting control A0. Then, at a time of a start of the continuous center lighting process of the center lighting control A0, the meter ECU 60 starts a control for executing the right lighting process the predetermined number of times Nr at the predetermined interval Titv.

(Buzzer Control B6)

In this case, the buzzer ECU 70 starts a buzzer control B6 at the time of the first detection of the right rear side vehicle 10b. According to the buzzer control B6, the buzzer ECU 70 completes the second alerting processes of the buzzer control A0 which is being executed at the time of the first detection of the right rear side vehicle 10b. Then, the buzzer ECU 70 executes the third alerting processes of the buzzer control A0. Then, at a time of the elapse of the predetermined interval Titv after completing the third alerting process of the buzzer control A0, the buzzer ECU 70 starts a control for executing the alerting process twice at the predetermined interval Titv. With this buzzer control B6, after the right rear side vehicle 10b is first detected, the buzzer ECU 70 executes the alerting process the predetermined number of times Nb (in this embodiment, three times) without including the alerting process which is being executed at the time of the first detection of the right rear side vehicle 10b.

(Right Lighting Control B7)

Figure 23:
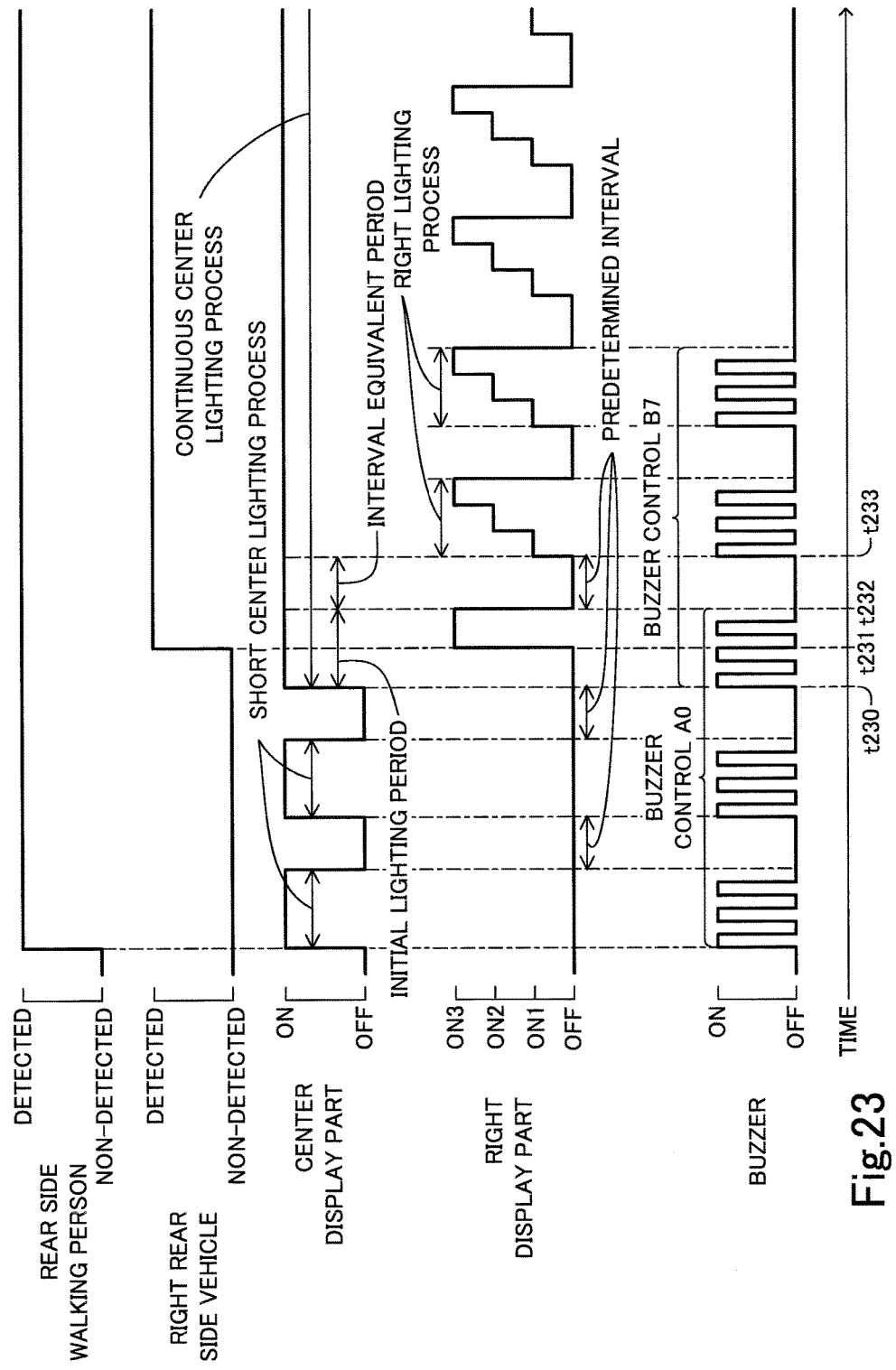
FIG. 23 is a view for showing a time chart illustrating an example of the lighting pattern of the center and right display parts when the right rear side vehicle is detected after the walking person is detected.
Figure 24:
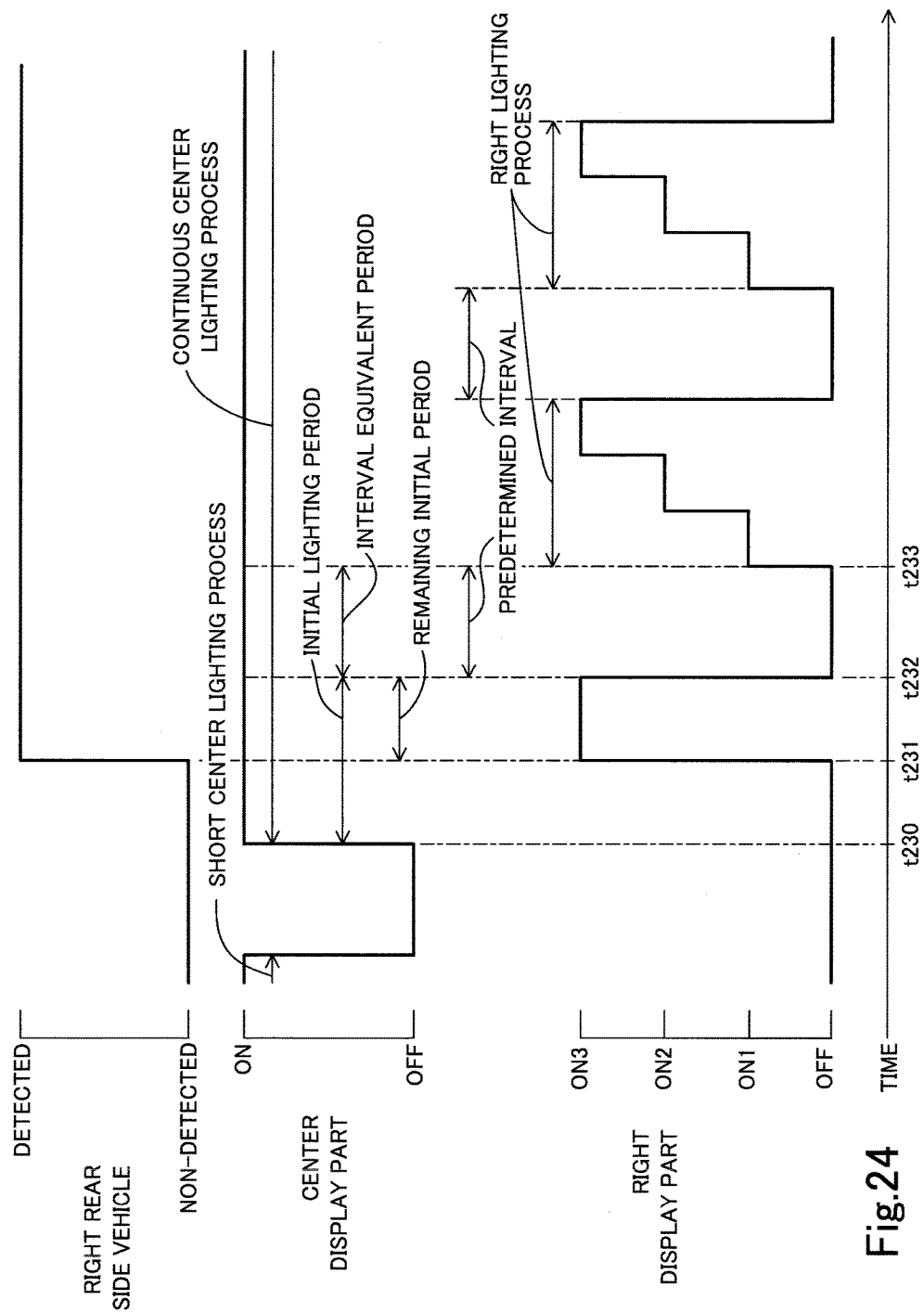
FIG. 24 is a view for showing a time chart illustrating an enlarged part of the lighting pattern shown in FIG. 23.

As shown in FIGS. 23 and 24, when the right rear side vehicle 10b is first detected at a time t231 in the initial lighting period Tinitial during the execution of the continuous center lighting process of the center lighting control A0, the meter ECU 60 acquires a remaining period Tszn of the initial lighting period Tinitial at the time t231 (hereinafter, the remaining period Tszn will be referred to as "the remaining initial period Tszn"). When the acquired remaining initial period Tszn is equal to or longer than the threshold time Tth, the meter ECU 60 starts a right lighting control B7 at the time of the first detection of the right rear side vehicle 10b.

According to the right lighting control B7, the meter ECU 60 turns on the lighting display portions 23a to 23c at the time t231 of the first detection of the right rear side vehicle 10b. Then, at a time t232 of the elapse of the initial lighting period Tinitial, the meter ECU 60 turns off the display portions 23a to 23c. Then, at a time t233 of an elapse of a period Titvs equal to the predetermined interval Titv (hereinafter, the period Titvs will be referred to as "the interval equivalent period Titvs"), the meter ECU 60 starts a control for executing the right lighting process the predetermined number of times Nr at the predetermined interval Titv.

(Buzzer Control B7)

In this case, the buzzer ECU 70 starts a buzzer control B7 at the time t231 of the first detection of the right rear side vehicle 10b. According to the buzzer control B7, the buzzer ECU 70 completes the third alerting process of the buzzer control A0 which is being executed at the time t231. Then, at a time t233 of the elapse of the predetermined interval Titv after completing the third alerting process of the buzzer control A0, the buzzer ECU 70 starts a control for executing the alerting process twice at the predetermined interval Titv. With this buzzer control B7, after the right rear side vehicle 10b is first detected, the buzzer ECU 70 executes the alerting process the predetermined number of times Nb (in this embodiment, three times) including the alerting process which is being executed at the time t231 of the first detection of the right rear side vehicle 10b.

(Right Lighting Control B8)

Figure 25:
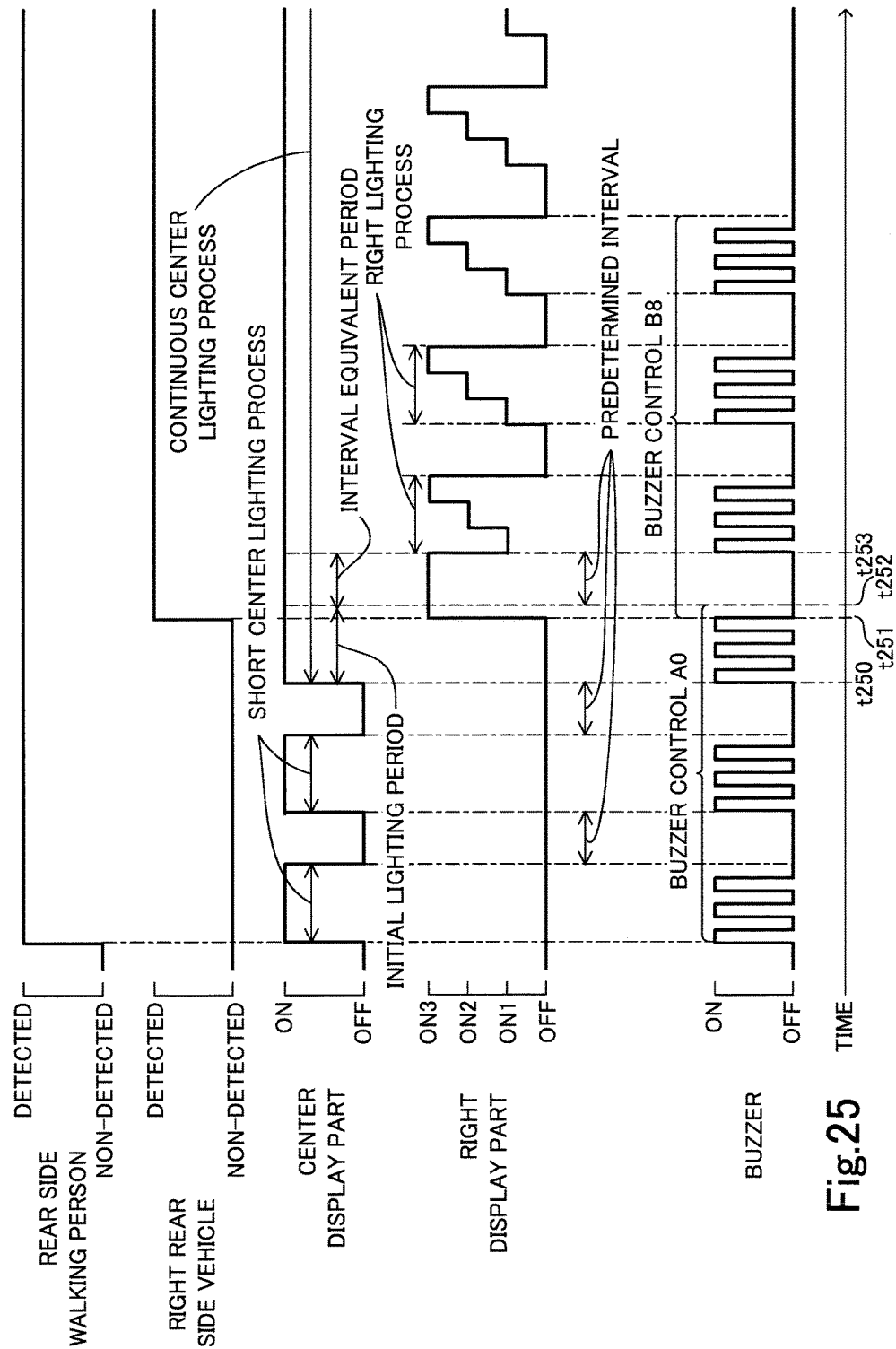
FIG. 25 is a view for showing a time chart illustrating an example of the lighting pattern of the center and right display parts when the right rear side vehicle is detected after the walking person is detected.
Figure 26:
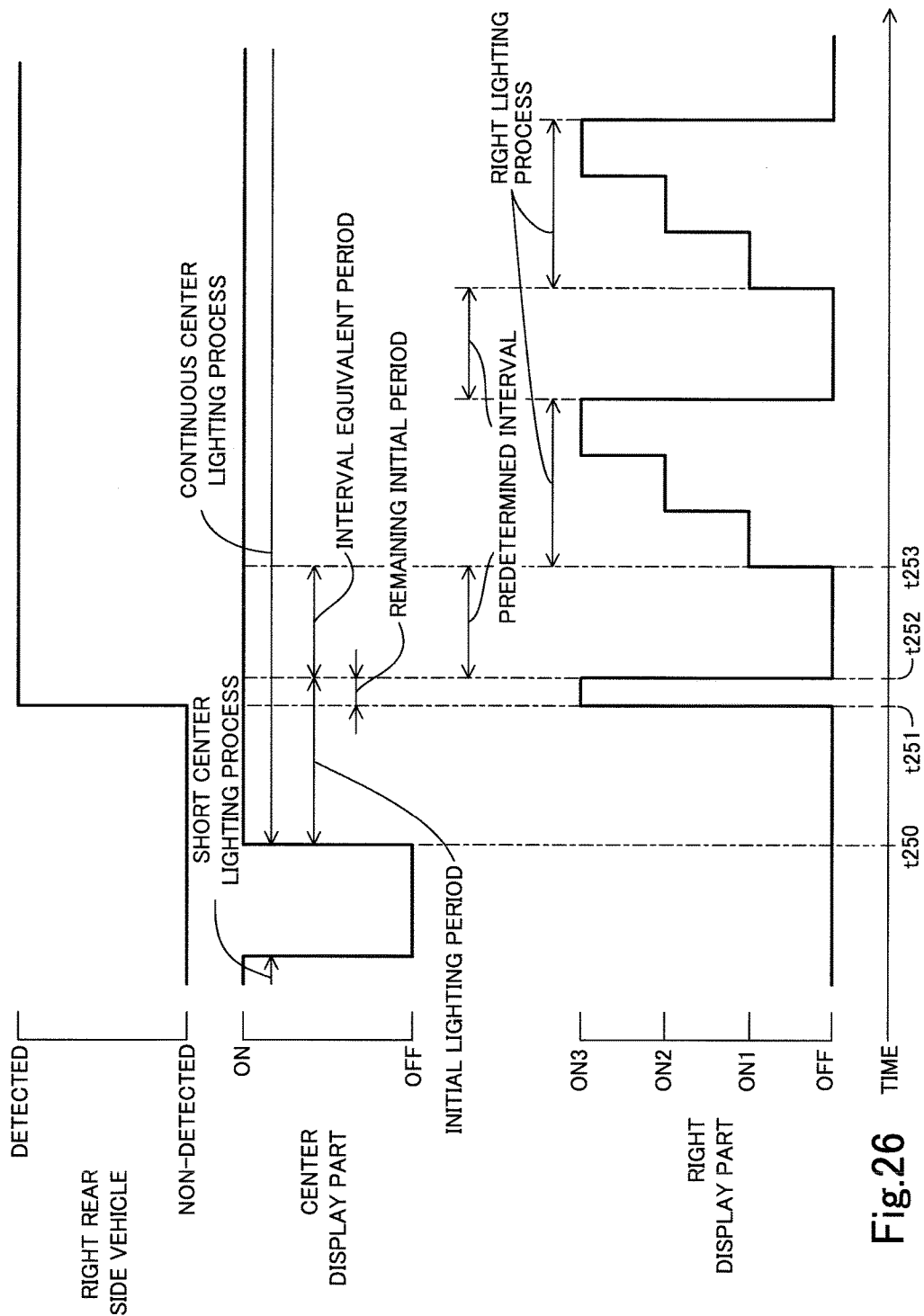
FIG. 26 is a view for showing a time chart illustrating an enlarged part of the lighting pattern shown in FIG. 25.

As shown in FIGS. 25 and 26, when the right rear side vehicle 10b is first detected at a time t251 during the initial lighting period Tinitial and the remaining initial period Tszn at the time t251 is shorter than the predetermined lighting time Ttt, the meter ECU 60 starts a right lighting control B8 at the time t251.

According to the right lighting control B8, the meter ECU 60 turns on the lighting display portions 23a to 23c at the time t251 and continues the lighting of the display portions 23a to 23c until the predetermined interval Titv elapses from a time t252 of the elapse of the initial lighting period Tinitial. Then, at a time t253 of the elapse of the interval equivalent period Titvs from the time t252, the meter ECU 60 starts a control for executing the right lighting process the predetermined number of times Nr at the predetermined interval Titv.

(Buzzer Control B8)

In this case, the buzzer ECU 70 starts a buzzer control B8 at the time t251 of the first detection of the right rear side vehicle 10b. According to the buzzer control B8, the buzzer ECU 70 completes the third alerting process of the buzzer control A0 which is being executed at the time t251. Then, at the time t253 of the elapse of the predetermined interval Titv after completing the third alerting process of the buzzer control A0, the buzzer ECU 70 starts a control for executing the alerting process three times at the predetermined interval Titv. With this buzzer control B8, after the right rear side vehicle 10b is first detected, the buzzer ECU 70 executes the alerting process the predetermined number of times Nb (in this embodiment, three times) without including the alerting process which is being executed at the time t251 of the first detection of the right rear side vehicle 10b.

(Right Lighting Control B9)

Although not shown, when the right rear side vehicle 10b is first detected in the interval equivalent period Titvs during the execution of the continuous center lighting process, the meter ECU 60 starts a right lighting control B9 at the time of the first detection of the right rear side vehicle 10b. According to the right lighting control B9, at a time of the elapse of the interval equivalent period Titvs, the meter ECU 60 starts a control for executing the right lighting process the predetermined number of times Nr at the predetermined interval Titv.

(Buzzer Control B9)

In this case, the buzzer ECU 70 starts a buzzer control B9 at the time of the first detection of the right rear side vehicle 10b. According to the buzzer control B9, at the time of the elapse of the interval equivalent period Titvs, the buzzer ECU 70 starts a control for executing the alerting process three times at the predetermined interval Titv.

(Right Lighting Control B10)

When the right rear side vehicle 10b is first detected during the execution of the continuous center lighting process after the interval equivalent period Titvs elapses, the meter ECU 60 starts a right lighting control B10 at the time of the first detection of the right rear side vehicle 10b. According to the right lighting control B10, at the time of the first detection of the right rear side vehicle 10b, the meter ECU 60 starts a control for executing the right lighting process the predetermined number of times Nr at the predetermined interval Titv.

(Buzzer Control B10)

In this case, the buzzer ECU 70 starts a buzzer control B10 at the time of the first detection of the right rear side vehicle 10b. According to the buzzer control B10, at the time of the first detection of the right rear side vehicle 10b, the buzzer ECU 70 starts a control for executing the alerting process three times at the predetermined interval Titv.

The summary of the operation of the embodiment control apparatus when the right rear side vehicle 10b is first detected while the walking person 10h is detected has been described. With the right lighting controls B1 to B10, even when the right rear side vehicle 10b is first detected during the execution of the center lighting control, the timings of turning on and off the right lighting display part 23 correspond to the timings of turning the center lighting display part 22, respectively. Thus, the driver can be prevented from feeling troublesome due to the lightings of the center and right display parts 22 and 23 and a possibility that the driver overlooks the detection of the right rear side vehicle 10b can be decreased.

Further, with the buzzer controls B5 and B6 executed when the remaining execution time Tzn is shorter than the predetermined lighting time Ttt and the buzzer control B8 executed when the remaining initial period Tszn is shorter than the threshold time Ttt, the number of the generation of the alerting sound after the right rear side vehicle 10b is first detected is large, compared with a case that the alerting process is executed the predetermined number of times Nb including the alerting process which is being executed at the time of the first detection of the right rear side vehicle 10b. Thus, even when the remaining execution time Tzn or the remaining initial period Tszn is shorter than the threshold time Ttt, the driver is likely to know that the right rear side vehicle 10b is detected.

<Case that Left Rear Side Vehicle is Detected after Walking Person is Detected>

(Left Lighting Controls C1 to C10)

The left rear side vehicle 10c may be first detected during the detection of the walking person 10h, that is, during the execution of the center lighting control A0. In this case, the meter ECU 60 controls the lighting of the left lighting display part 24 by executing any of left lighting controls C1 to C10 similar to the right lighting controls B1 to B10, respectively executed when the right rear side vehicle 10b is first detected during the execution of the center lighting control A0, depending on the time of the first detection of the left rear side vehicle 10c.

(Buzzer Control C1 to C10)

In this case, the buzzer ECU 70 controls the activation of the buzzer 30 by executing any of buzzer controls C1 to C10 similar to the buzzer controls B1 to B10, respectively executed when the right rear side vehicle 10b is first detected during the execution of the center lighting control A0, depending on the time of the first detection of the left rear side vehicle 10c.

With the left lighting controls C1 to C10, even when the left rear side vehicle 10c is first detected during the execution of the center lighting control, the timings of turning on and off the left lighting display part 24 correspond to the timings of turning on and off the center lighting display part 22, respectively. Thus, the driver can be prevented from feeling troublesome due to the lightings of the center and left display parts 22 and 24 and a possibility that the driver overlooks the detection of the left rear side vehicle 10c can be decreased.

When the buzzer controls C5 and C6 executed when the remaining execution time Tzn is shorter than the threshold time Tth and the buzzer control C8 executed when the remaining initial period Tszn is shorter than the threshold time Tth, the number of the generation of the alerting sound after the left rear side vehicle 10c is first detected is large, compared with a case that the alerting process is executed the predetermined number of times Nb including the alerting process which is being executed at the time of the first detection of the left rear side vehicle 10c. Thus, even when the remaining execution time Tzn or the remaining initial period Tszn is shorter than the threshold time Tth, the driver is likely to know that the left rear side vehicle 10c is detected.

<Case that Right Rear Side Vehicle is Detected after Left Rear Side Vehicle is Detected>

The right rear side vehicle 10b may be first detected during the detection of the left rear side vehicle 10c, that is, during the execution of the left lighting control C0. In this case, the meter ECU 60 controls the lighting of the right lighting display part 23, depending on the time of the first detection of the right rear side vehicle 10b as described below and the buzzer ECU 70 controls the activation of the buzzer 30, depending on the time of the first detection of the right rear side vehicle 10b as described below.

(Right Lighting Control B11)

Figure 27:
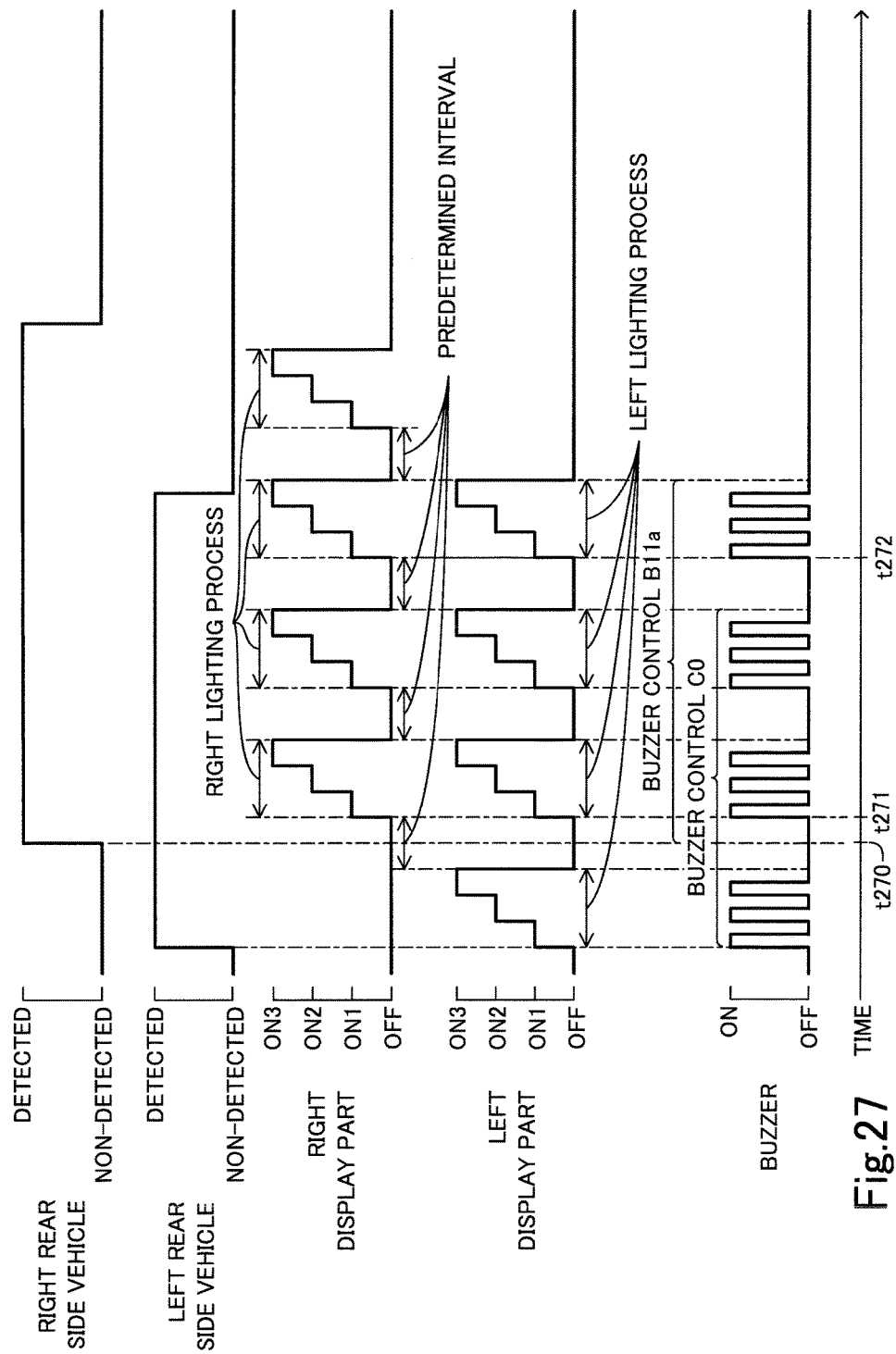
FIG. 27 is a view for showing a time chart illustrating an example of the lighting pattern of the right and left display parts when a left rear side vehicle (i.e., the other vehicle traveling at the left rear side of the own vehicle) is detected after the right rear side vehicle is detected.

As shown in FIG. 27, when the right rear side vehicle 10b is first detected at a time t270 in the predetermined interval Titv during the execution of the left lighting control, the meter ECU 60 starts a right lighting control B11 at the time t270. According to the right lighting control B11, at a time t271 of a start of the left lighting process of the left lighting control C0 immediately after the right rear side vehicle 10b is first detected, the meter ECU 60 starts a control for executing the right lighting process the predetermined number of times Nr at the predetermined interval Titv.

(Buzzer Control B11a)

In this case, as shown in FIG. 27, when the right rear side vehicle 10b is first detected at the time t270 after completing the first alerting process of the buzzer control C0 and before starting the second alerting process of the buzzer control C0, the buzzer ECU 70 starts a buzzer control B11a at the time t270. According to the buzzer control B11a, the buzzer ECU 70 executes the second and third alerting processes of the buzzer control C0. Then, at a time t272 of the elapse of the predetermined interval Titv after completing the third alerting process of the buzzer control C0, the buzzer ECU 70 starts a control for executing the alerting process once.

(Buzzer Control B11b)

Although not shown, when the right rear side vehicle 10b is first detected after completing the second alerting process of the buzzer control C0 and before starting the third alerting process of the buzzer control C0, the buzzer ECU 70 starts a buzzer control B11b at the time of the first detection of the right rear side vehicle 10b. According to the buzzer control B11b, the buzzer ECU 70 executes the third alerting process of the buzzer control C0. Then, at a time of the elapse of the predetermined interval Titv after completing the third alerting process of the buzzer control C0, the buzzer ECU 70 starts a control for executing the alerting process twice at the predetermined interval Titv.

(Buzzer Control B11c)

When the right rear side vehicle 10b is first detected after completing the third alerting process of the buzzer control C0, the buzzer ECU 70 starts a buzzer control B11c at the time of the first detection of the right rear side vehicle 10b. According to the buzzer control B11c, at a time of a start of the right lighting process of the right lighting control B11 immediately after the right rear side vehicle 10b is first detected, the buzzer ECU 70 starts a control for executing the alerting process three times at the predetermined interval Titv.

(Right Lighting Control B12)

Figure 28:
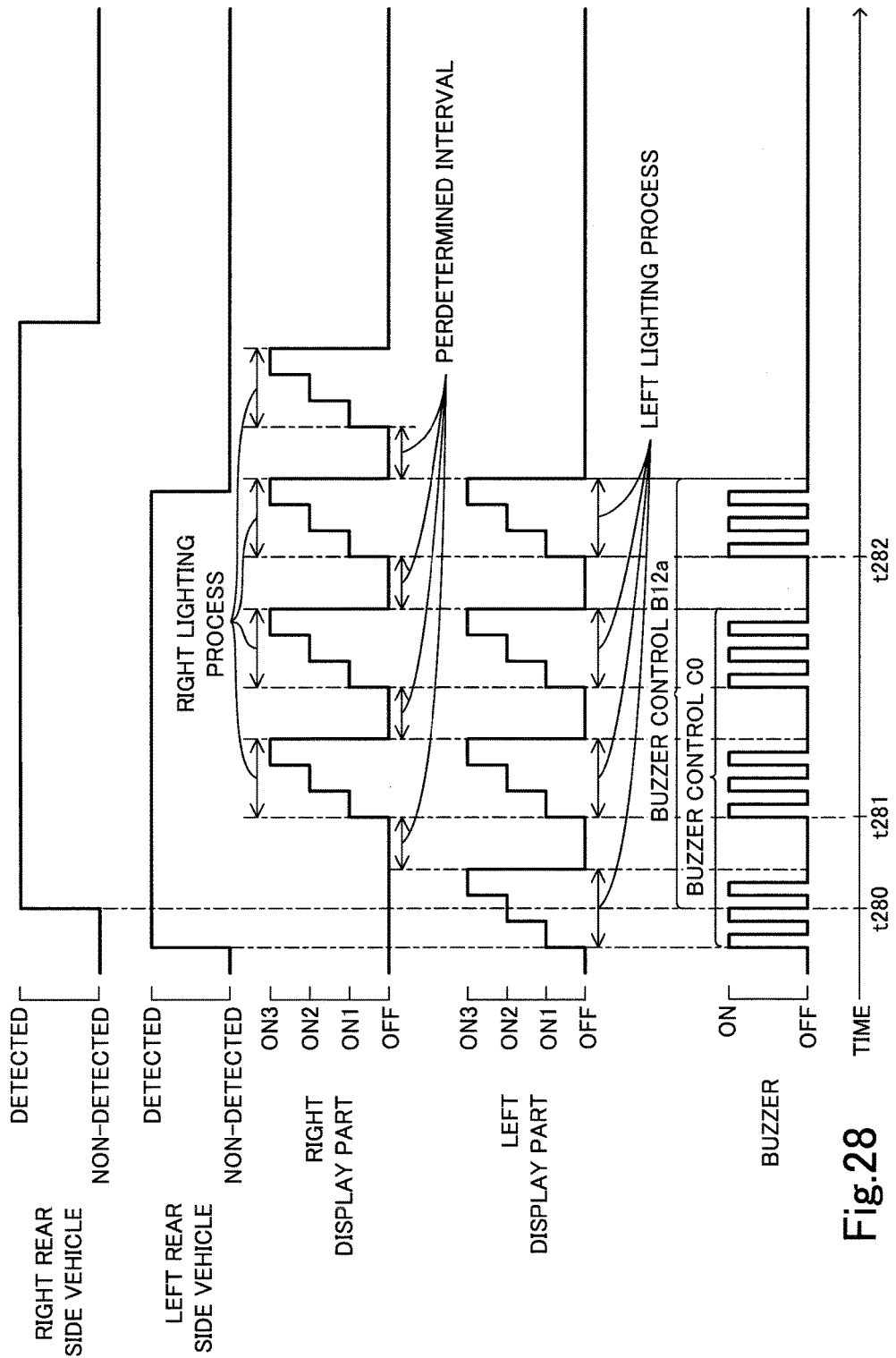
FIG. 28 is a view for showing a time chart illustrating an example of the lighting pattern of the right and left display parts when the left rear side vehicle is detected after the right rear side vehicle is detected.

As shown in FIG. 28, when the right rear side vehicle 10b is first detected at a time t280 during the execution of the left lighting process of the left lighting control C0, the meter ECU 60 starts a right lighting control B12 at the time t280. According to the right lighting control B12, at a time t281 of the elapse of the predetermined interval Titv after completing the left lighting process of the left lighting control C0 which is being executed at the time t280, the meter ECU 60 starts a control for executing the right lighting process the predetermined number of times Nr at the predetermined interval Titv.

(Buzzer Control B12a)

In this case, as shown in FIG. 28, when the right rear side vehicle 10b is first detected at the time t280 during the execution of the first alerting process of the buzzer control C0, the buzzer ECU 70 starts a buzzer control B12a at the time t280. According to the buzzer control B12a, the buzzer ECU 70 completes the first alerting process of the buzzer control C0 which is being executed at the time t280. Then, the buzzer ECU 70 executes the second and third alerting processes of the buzzer control C0. Then, at a time t282 of the elapse of the predetermined interval Titv after completing the third alerting process of the buzzer control C0, the buzzer ECU 70 starts a control for executing the alerting process once.

(Buzzer Control B12b)

Although now shown, when the right rear side vehicle 10b is first detected during the execution of the second alerting process of the buzzer control C0, the buzzer ECU 70 starts a buzzer control B12b at the time of the first detection of the right rear side vehicle 10b. According to the buzzer control B12b, the buzzer ECU 70 completes the second alerting process of the buzzer control C0 which is being executed at the time of the first detection of the right rear side vehicle 10b. Then, the buzzer ECU 70 executes the third alerting process of the buzzer control C0. Then, at a time of the elapse of the predetermined interval Titv after completing the third alerting process of the buzzer control C0, the buzzer ECU 70 starts a control for executing the alerting process twice at the predetermined interval Titv.

(Buzzer Control B12c)

When the right rear side vehicle 10b is first detected during the execution of the third alerting process of the buzzer control C0, the buzzer ECU 70 starts a buzzer control B12c at the time of the first detection of the right rear side vehicle 10b. According to the buzzer control B12c, the buzzer ECU 70 completes the third alerting process of the buzzer control C0 which is being executed at the time of the first detection of the right rear side vehicle 10b. Then, at a time of the elapse of the predetermined interval Titv after completing the third alerting process of the buzzer control C0, the buzzer ECU 70 starts a control for executing the alerting process three times at the predetermined interval Titv.

(Buzzer Control B12d)

When the right rear side vehicle 10b is first detected during the execution of the left lighting process of the left lighting control C0 executed after completing the third alerting process of the buzzer control C0, the buzzer ECU 70 starts a buzzer control B12d at the time of the first detection of the right rear side vehicle 10b. According to the buzzer control B12d, at a time of a start of the right lighting process of the right lighting process B12 immediately after the right rear side vehicle 10b is first detected, the buzzer ECU 70 starts a control for executing the alerting process three times at the predetermined interval Titv.

The summary of the operation of the embodiment control apparatus when the right rear side vehicle 10b is detected during the detection of the left rear side vehicle 10c has been described. With the right lighting controls B11 and B12, even when the right rear side vehicle 10b is first detected during the execution of the left lighting control, the timings of turning on and off the right lighting display part 23 correspond to the timings of turning on and off the left lighting display part 24, respectively. Thus, the driver can be prevented from feeling troublesome due to the lighting of the right and left display parts 23 and 24 and the possibility that the driver overlooks the detection of the right rear side vehicle 10b can be decreased.

<Case that Left Rear Side Vehicle is Detected after Right Rear Side Vehicle is Detected>

(Left Lighting Controls C11 and C12)

The left rear side vehicle 10c may be detected during the detection of the right rear side vehicle 10b, that is, during the execution of the right lighting control B0. In this case, the meter ECU 60 controls the lighting of the left lighting display part 24 by executing any of left lighting controls C11 and C12 similar to the right lighting controls B11 and B12, respectively, depending on the time of the first detection of the left rear side vehicle 10c.

(Buzzer Controls C11a to C11c and C12a to C12d)

In this case, the buzzer ECU 70 controls the activation of the buzzer 30 by executing any of buzzer controls C11a to C11c and C12a to C12d similar to the buzzer controls B11a to B11c and B12a to B12d, respectively, depending on the time of the first detection of the left rear side vehicle 10c.

With the left lighting controls C11 and C12, even when the left rear side vehicle 10c is first detected during the execution of the right lighting control, the timings of turning on and off the left lighting display part 24 correspond to the timings of turning on and off the right lighting display part 23, respectively. Thus, the driver can be prevented from feeling troublesome due to the lighting of the right and left display parts 23 and 24 and the possibility that the driver overlooks the detection of the left rear side vehicle 10c can be decreased.

<Concrete Operation of Embodiment Control Apparatus>

Next, a concrete operation of the embodiment control apparatus will be described. The CPU of the driving assist ECU 50 of the embodiment control apparatus (hereinafter, the CPU of the driving assist ECU 50 will be simply referred to as "the CPU") is configured or programmed to execute a routine shown by a flowchart in FIG. 29 each time a predetermined time elapses. Therefore, at a predetermined timing, the CPU starts a process from a step 200 in FIG. 29 and then, proceeds with the process to a step 205 to determine whether or not the walking person 10h is detected.

When the walking person 10h is detected, the CPU determines "Yes" at the step 205 and then, proceeds with the process to a step 210 to determine whether or not a value of a center lighting flag Xh is "0".

The value of the center lighting flag Xh is set to "1" by a process of a step 225 executed after the start command signal SHstart for causing the meter ECU 60 to start the center lighting control is sent to the meter ECU 60 by any of processes of a step 220 in FIG. 29 and steps 330 to 350 in FIG. 30 described later. When the value of the center lighting flag Xh is "1", the center lighting flag Xh indicates that the center lighting control is being executed.

On the other hand, the value of the center lighting flag Xh is set to "0" by a process of a step 245 executed after the stop command signal SHstop for causing the meter ECU 60 to stop the center lighting control is sent to the meter ECU 60 by a process of a step 240 described later. When the value of the center lighting flag Xh is "0", the center lighting flag Xh indicates that the center lighting control is not executed.

When the value of the center lighting flag Xh is "0" upon the execution of the process of the step 210, the CPU determines "Yes" at the step 210 and then, proceeds with the process to a step 215 to determine whether or not the values of right and left lighting flags Xr and Xl are "0", respectively.

Figure 31:
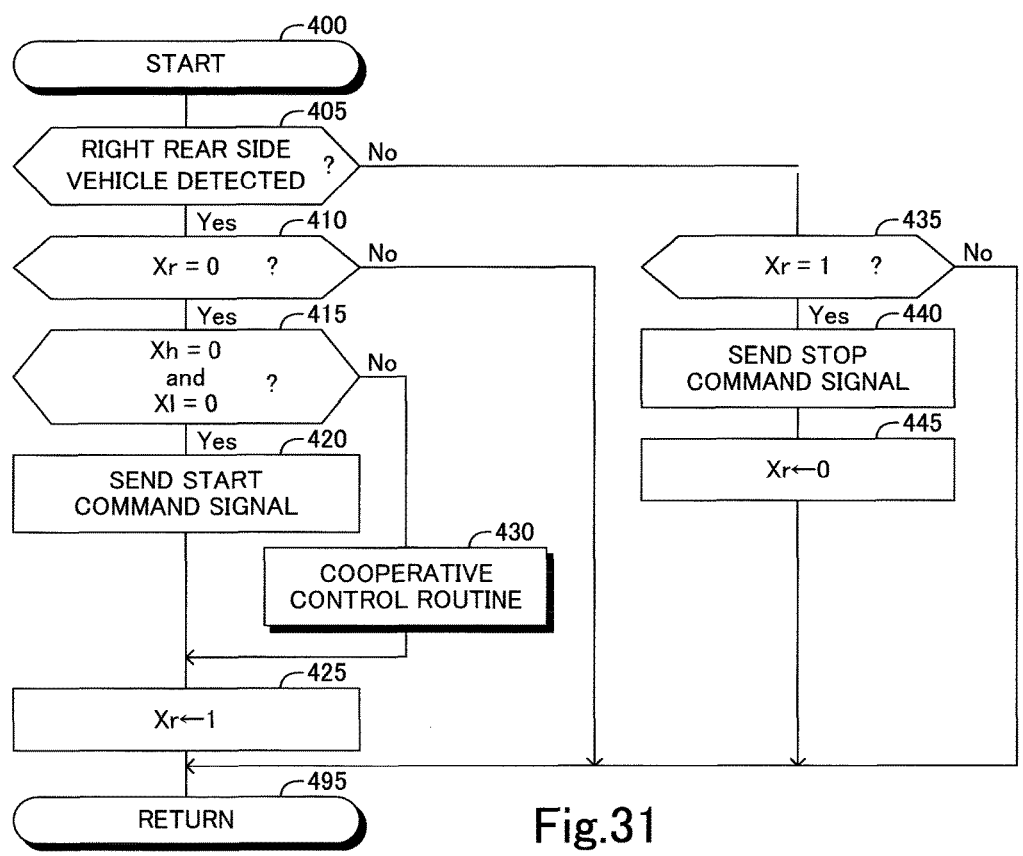
FIG. 31 is a view for showing a flowchart illustrating a routine executed by the CPU.
Figure 32:
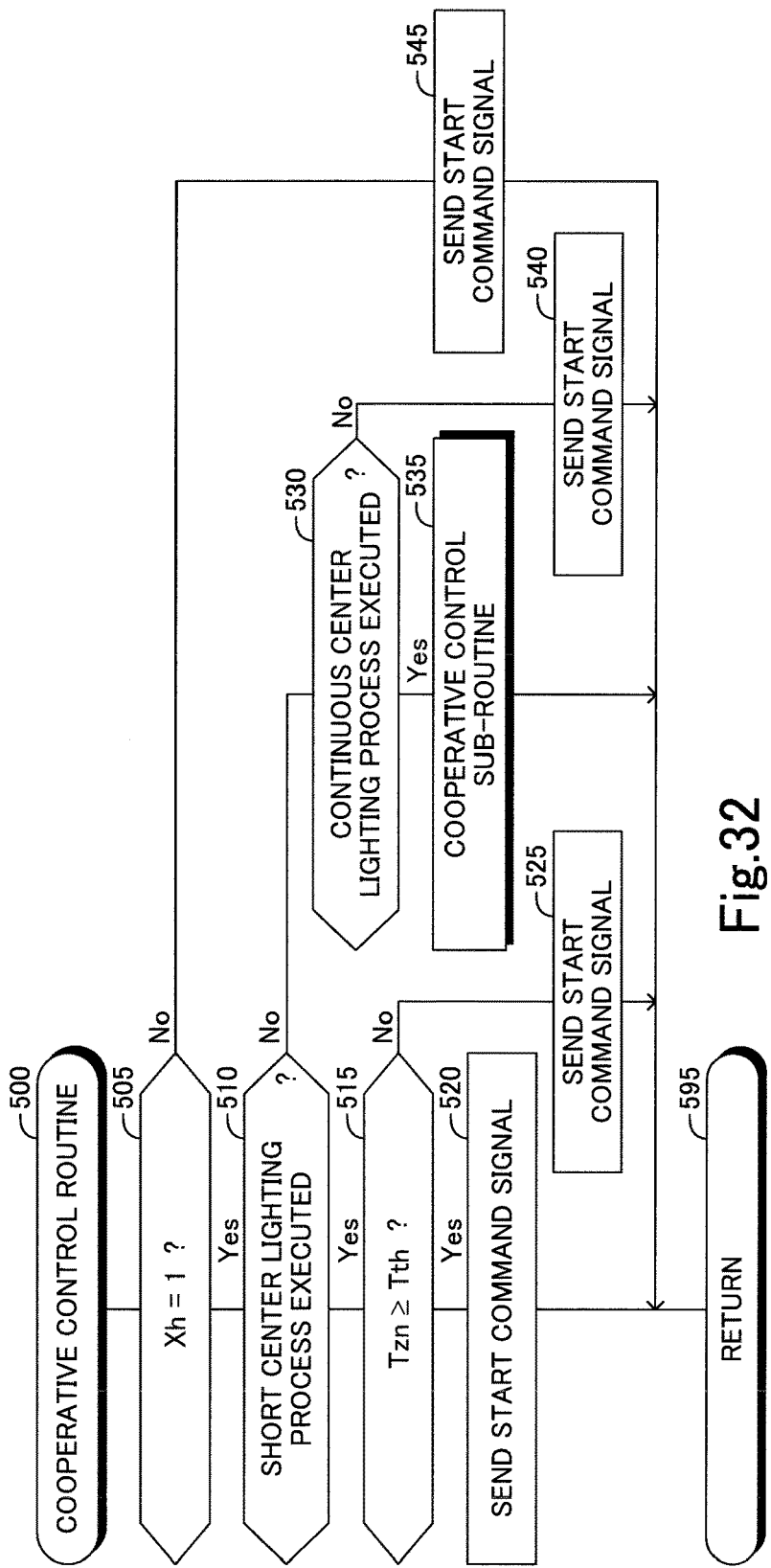
FIG. 32 is a view for showing a flowchart illustrating a routine executed by the CPU.
Figure 33:
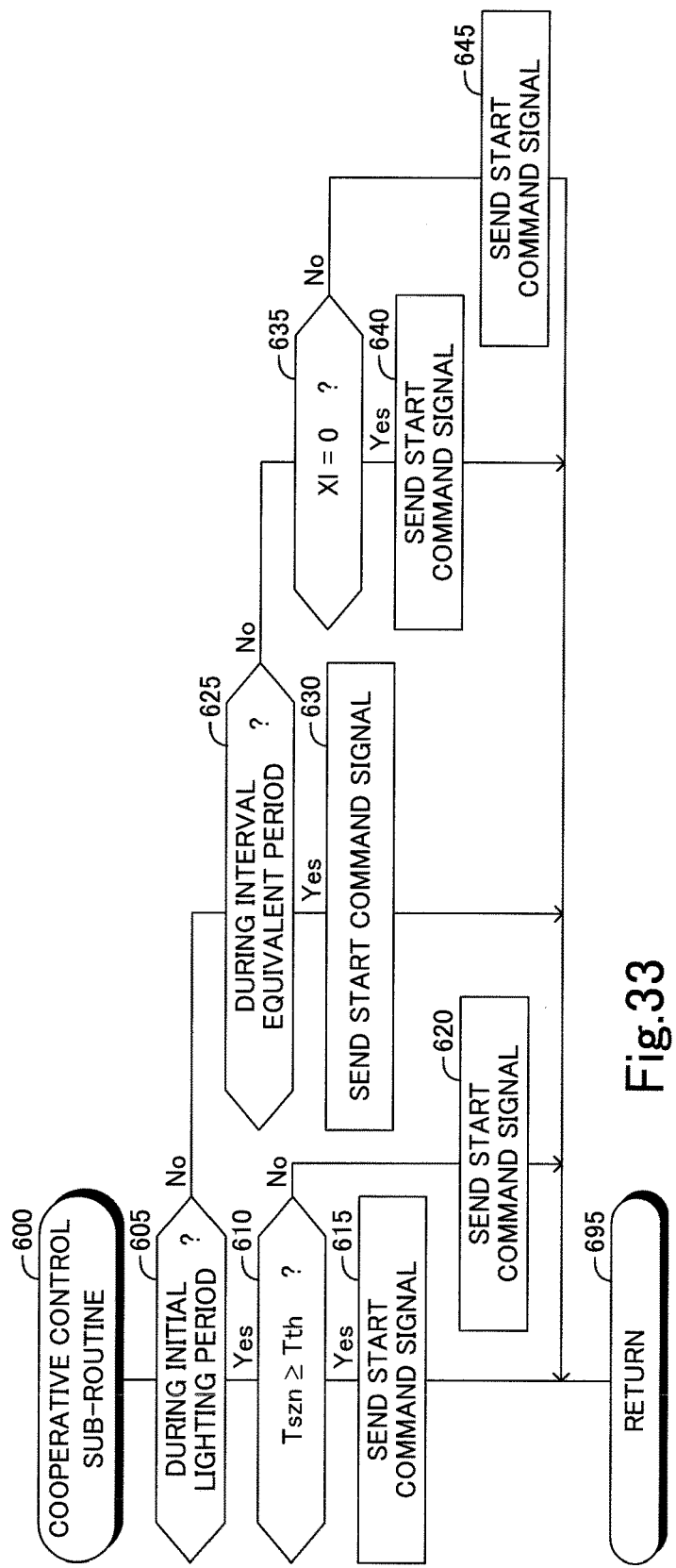
FIG. 33 is a view for showing a flowchart illustrating a routine executed by the CPU.

The value of the right lighting flag Xr is set to "1" by a process of a step 425 in FIG. 31 executed after the start command signal SRstart for causing the meter ECU 60 to start the right lighting control is sent to the meter ECU 60 by any of processes of a step 420 in FIG. 31, steps 520, 525, 540 and 545 in FIG. 32 and steps 615, 620, 630, 640 and 645 in FIG. 33. When the value of the right lighting flag Xr is "1", the flag Xr indicates that the right lighting control is being executed.

On the other hand, the value of the right lighting flag Xr is set to "0" by a process of a step 445 executed after the stop command signal SRstop for causing the meter ECU 60 to stop the right lighting control is set to the meter ECU 60 by a process of a step 440 in FIG. 31. When the value of the right lighting flag Xr is "0", the right lighting flag Xr indicates that the right lighting control is not executed.

Similarly, the value of the left lighting flag Xl is set to "1" after the start command signal SLstart for causing the meter ECU 60 to start the left lighting control is sent to the meter ECU 60. When the value of the left lighting flag Xl is "1", the flag Xl indicates that the left lighting control is being executed.

On the other hand, the value of the left lighting flag Xl is set to "0" after the stop command signal SLstop for causing the meter ECU 60 to stop the left lighting control is sent to the meter ECU 60. When the value of the left lighting flag Xl is "0", the flag Xl indicates that the left lighting control is not executed.

When the values of the right and left lighting flags Xr and Xl are "0", respectively upon the execution of the process of the step 215, the CPU determines "Yes" at the step 215 and then, sequentially executes processes of steps 220 and 225 described below. Then, the CPU proceeds with the process to a step 295 to terminate this routine once.

Step 220: The CPU sends to the meter ECU 60 the start command signal SHstart for causing the meter ECU 60 to start the center lighting control A0 and sends to the buzzer ECU 70 the start command signal SBstart for the buzzer ECU 70 to start the buzzer control A0. Thereby, the meter ECU 60 starts the center lighting control A0 and the buzzer ECU 70 starts the buzzer control A0.

Step 225: The CPU sets the value of the center lighting flag Xh to "1".

Figure 30:
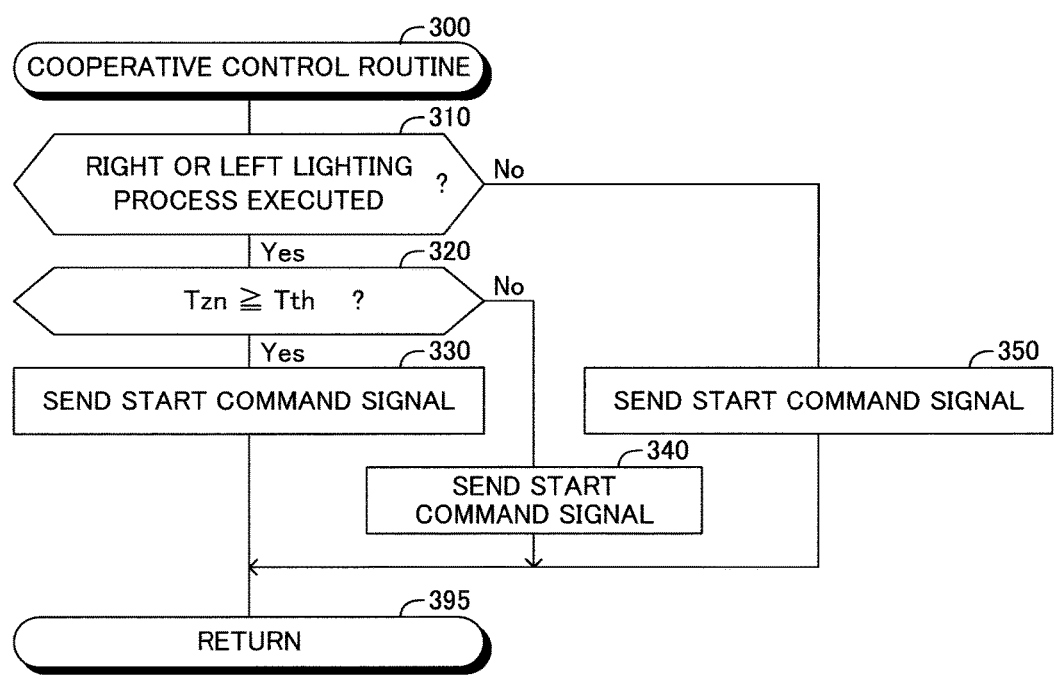
FIG. 30 is a view for showing a flowchart illustrating a routine executed by the CPU.

On the other hand, when at least one of the values of the right and left lighting flags Xr and Xl is "1" upon the execution of the process of the step 215, the CPU determines "No" at the step 215 and then, proceeds with the process to a step 230 to execute a cooperative control routine shown by a flowchart in FIG. 30.

Therefore, when the CPU proceeds with the process to the step 230, the CPU starts a process from a step 300 in FIG. 30 and then, proceeds with the process to a step 310 to determine whether or not any of the right and left lighting processes is being executed. When any of the right and left lighting processes is being executed, the CPU determines "Yes" at the step 310 and then, proceeds with the process to a step 320 to determine whether or not the remaining execution time Tzn in the right or left lighting process which is being executed is equal to or larger than the threshold time Tth.

It should be noted that in this embodiment, when the right and left lighting processes are both executed upon the execution of the process of the step 320, the CPU determines whether or not the remaining execution time Tzn in the left lighting process which is being executed is equal to or larger than the threshold time Tth. However, in this case, the CPU may determine whether or not the remaining execution time Tzn in the right lighting process which is being executed is equal to or larger than the threshold time Tth.

When the remaining execution time Tzn is equal to or larger than the threshold time Tth upon the execution of the process of the step 320, the CPU determines "Yes" at the step 320 and then, proceeds with the process to a step 330 to send to the meter ECU 60 the start command signal SHstart for causing the meter ECU 60 to start the center lighting control A2 and send to the buzzer ECU 70 the start command signal SBstart for causing the buzzer ECU 70 to start any of the buzzer controls A2a to A2d. Thereby, the meter ECU 60 starts the center lighting control A2 and the buzzer ECU 70 starts any of the buzzer controls A2a to A2d, depending on the time of the first detection of the walking person 10h.

Figure 29:
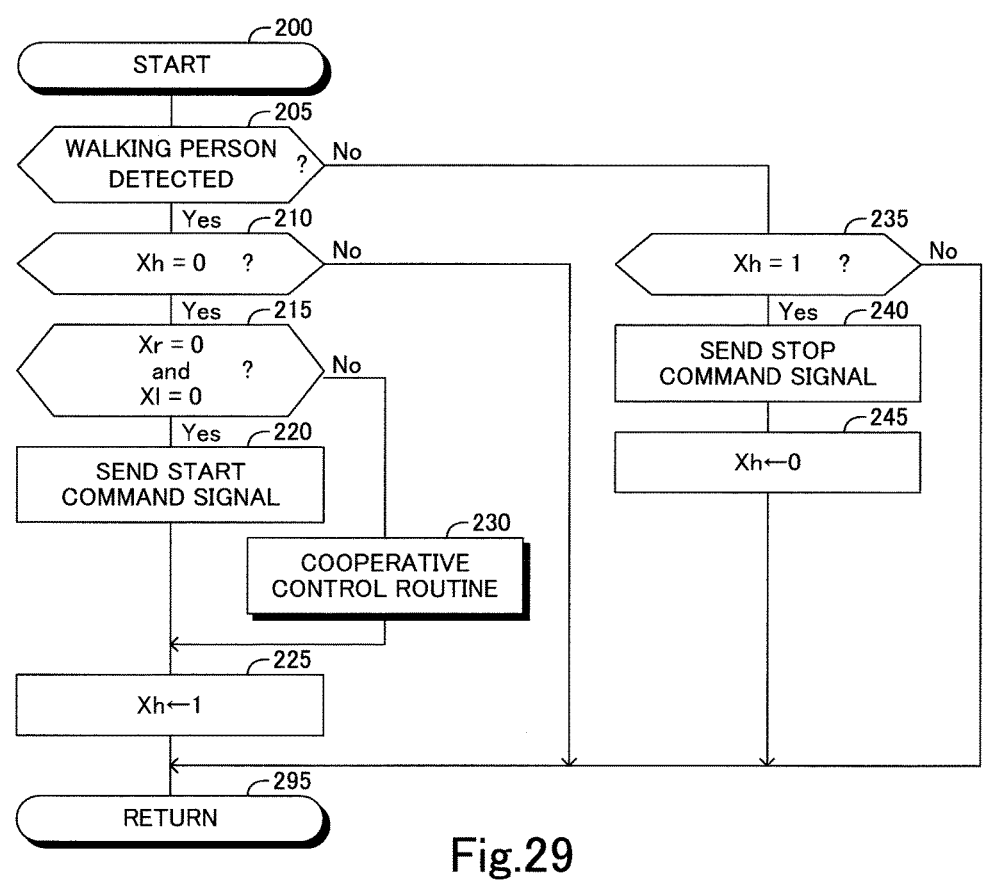
FIG. 29 is a view for showing a flowchart illustrating a routine executed by a CPU of a driving assist ECU shown in FIG. 2.

Then, the CPU proceeds with the process to a step 225 in FIG. 29 via a step 395 to set the value of the center lighting flag Xh to "1" and then, proceeds with the process to the step 295 to terminate this routine once.

On the other hand, when the remaining execution time Tzn is smaller than the threshold time Tth upon the execution of the process of the step 320 in FIG. 30, the CPU determines "No" at the step 320 and then, proceeds with the process to a step 340 to send to the meter ECU 60 the start command signal SHstart for causing the meter ECU 60 to start the center lighting control A3 and send to the buzzer ECU 70 the start command signal SBstart for causing the buzzer ECU 70 to start any of the buzzer controls A3a to A3d. Thereby, the meter ECU 60 starts the center lighting control A3 and the buzzer ECU 70 starts any of the buzzer controls A3a to A3d, depending on the time of the first detection of the walking person 10h.

Then, the CPU proceeds with the process to the step 225 in FIG. 29 via the step 395 to set the value of the center lighting flag Xh to "1" and then, proceeds with the process to the step 295 to terminate this routine once.

Further, when neither the left nor right lighting process is being executed upon the execution of the process of the step 310 in FIG. 30, the CPU determines "No" at the step 310 and then, proceeds with the process to a step 350 to send to the meter ECU 60 the start command signal SHstart for causing the meter ECU 60 to start the center lighting control A1 and send to the buzzer ECU 70 the start command signal SBstart for causing the buzzer ECU 70 to start any of the buzzer controls A1a to A1c. Thereby, the meter ECU 60 starts the center lighting control A1 and the buzzer ECU 70 starts any of the buzzer controls A1a to A1c, depending on the time of the first detection of the walking person 10h.

Then, the CPU proceeds with the process to the step 225 in FIG. 225 via the step 395 to set the value of the center lighting flag Xh to "1" and then, proceeds with the process to the step 295 to terminate this routine once.

After the CPU send the start command signals SHstart and SBstart to the meter and buzzer ECUs 60 and 70, respectively, the value of the center lighting flag Xh has been set to "1". Therefore, while the walking person 10h is detected, the CPU determines "Yes" at the step 205 in FIG. 29 and then, determines "No" at the step 210. Thus, the CPU proceeds with the process directly to the step 295 to terminate this routine once.

Further, when the walking person 10h is not detected upon the execution of the process of the step 205, the CPU determines "No" at the step 205 and then, proceeds with the process to the step 235 to determine whether or not the value of the center lighting flag Xh is "1". That is, the CPU determines whether or not the center lighting control is being executed. When the value of the center lighting flag Xh is "1", the CPU determines "Yes" at the step 235 and then, sequentially executes processes of steps 240 and 245 described below. Then, CPU proceeds with the process to the step 295 to terminate this routine once.

Step 240: The CPU sends to the meter ECU 60 the stop command signal SHstop for causing the meter ECU 60 to stop the center lighting control and send to the buzzer ECU 70 the stop command signal SBstop for causing the buzzer ECU 70 to stop the buzzer control. Thereby, the center lighting control and the buzzer control are stopped. It should be noted that if the buzzer control has been terminated when the CPU send the stop command signal SBstop to the buzzer ECU 70, the buzzer ECU 70 ignores the signal SBstop.

Step 245: The CPU sets the value of the center lighting flag Xh to "0".

On the other hand, when the value of the center lighting flag Xh is "0" upon the execution of the process of the step 235, the CPU determines "No" at the step 235 and then, proceeds with the process directly to the step 295 to terminate this routine once.

The concrete operation of the embodiment control apparatus for controlling the lighting of the center lighting display part 22 has been described. With the operation of the embodiment control apparatus, even when the walking person 10h is first detected during the execution of the right lighting control (see the determinations "Yes" at the steps 205 and 210 in FIG. 29 and the determination "No" at the step 215 in FIG. 29), the timings of turning on and off the center lighting display part 22 correspond to the timings of turning on and off the right lighting display part 23, respectively (see the processes of the steps 330 to 350 in FIG. 30). Thus, the driver can be prevented from feeling troublesome due to the lightings of the center and right display parts 22 and 23 and the possibility that the driver overlooks the detection of the walking person 10h can be decreased.

Further, when the remaining execution time Tzn is shorter than the threshold time Tth (see the determination "No" at the step 320 in FIG. 30), after the walking person 10h is first detected, the alerting process is executed the predetermined number of times Nb without including the alerting process which is being executed at the time of the first detection of the walking person 10h (see the process of the step 340). Therefore, compared with a case that the alerting process is executed the predetermined number of times Nb including the alerting process which is being executed at the time of the first detection of the walking person 10h, the number of the generation of the alerting sound after the walking person 10h is first detected is large. Thus, even when the remaining execution time Tzn is shorter than the threshold time Tth, the driver is likely to know that the walking person 10h is detected.

<Concrete Operation of Embodiment Control Apparatus for Right Display Part>

Further, the CPU is configured or programmed to execute a routine shown by a flowchart in FIG. 31 each time a predetermined time elapses. Therefore, at a predetermined timing, the CPU starts a process from a step 400 in FIG. 31 and then, proceeds with the process to a step 405 to determine whether or not the right rear side vehicle 10b is detected.

When the right rear side vehicle 10b is detected, the CPU determines "Yes" at the step 405 and then, proceeds with the process to a step 410 to determine whether or not the value of the right lighting flag Xr is "0". When the value of the right lighting flag Xr is "0", the CPU determines "Yes" at the step 410 and then, proceeds with the process to a step 415 to determine whether or not the values of the center and left lighting flags Xh and Xl are "0", respectively.

When the values of the center and left lighting flags Xh and Xl are "0", respectively, the CPU determines "Yes" at the step 415 and then, sequentially executes processes of steps 420 and 425. Then, the CPU proceeds with the process to a step 495 to terminate this routine once.

Step 420: The CPU sends to the meter ECU 60 the start command signal SRstart for causing the meter ECU 60 to start the right lighting control B0 and sends to the buzzer ECU 70 the start command signal SBstart for causing the buzzer ECU 70 to start the buzzer control B0. Thereby, the meter ECU 60 starts the right lighting control B0 and the buzzer ECU 70 starts the buzzer control B0.

Step 425: The CPU sets the value of the right lighting flag Xr to "1".

On the other hand, when at least one of the values of the center and left lighting flags Xh and Xl is "1" upon the execution of the process of the step 415, the CPU determines "No" at the step 415 and then, proceeds with the process to a step 430 to execute a cooperative control routine shown by a flowchart in FIG. 32.

Therefore, when the CPU proceeds with the process to the step 430, the CPU starts a process from a step 500 in FIG. 32 and then, proceeds with the process to a step 505 to determine whether or not the value of the center lighting flag Xh is "1". When the value of the center lighting flag Xh is "1", the CPU determines "Yes" at the step 505 and then, proceeds with the process to a step 510 to determine whether or not the short center lighting process is being executed. When the short center lighting process is being executed, the CPU determines "Yes" at the step 510 and then, proceeds with the process to a step 515 to determine whether or not the remaining execution time Tzn in the short center lighting process is equal to or larger than the threshold time Tth.

When the remaining execution time Tzn is equal to or larger than the threshold time Tth, the CPU determines "Yes" at the step 515 and then, proceeds with the process to a step 520 to send to the meter ECU 60 the start command signal SRstart for causing the meter ECU 60 to start any of the right lighting controls B3 and B4 and send to the buzzer ECU 70 the start command signal SBstart for causing the buzzer ECU 70 to start any of the buzzer controls B3 and B4. Thereby, the meter ECU 60 starts any of the right lighting controls B3 and B4, depending on the time of the first detection of the right rear side vehicle 10*b* and the buzzer ECU 70 starts any of the buzzer controls B3 and B4, depending on the time of the first detection of the right rear side vehicle 10*b*.

Then, the CPU proceeds with the process to the step 425 in FIG. 31 via a step 595 to set the value of the right lighting flag Xr to "1" and then, proceeds with the process to the step 495 to terminate this routine once.

On the other hand, when the remaining execution time Tzn is smaller than the threshold time Tth upon the execution of the process of the step 515 in FIG. 32, the CPU determines "No" at the step 515 and then, proceeds with the process to a step 525 to send to the meter ECU 60 the start command signal SRstart for causing the meter ECU 60 to start any of the right lighting controls B5 and B6 and send to the buzzer ECU 70 the start command signal SBstart for causing the buzzer ECU 70 to start any of the buzzer controls B5 and B6. Thereby, the meter ECU 60 starts any of the right lighting controls B5 and B6, depending on the time of the first detection of the right rear side vehicle 10*b* and the buzzer ECU 70 starts any of the buzzer controls B5 and B6, depending on the time of the first detection of the right rear side vehicle 10*b*.

Then, the CPU proceeds with the process to the step 425 in FIG. 31 via the step 595 to set the value of the right lighting flag Xr to "1" and then, proceeds with the process to the step 495 to terminate this routine once.

Further, when the short center lighting process is not executed upon the execution of the process of the step 510 in FIG. 32, the CPU determines "No" at the step 510 and then, proceeds with the process to a step 530 to determine whether or not the continuous center lighting process is being executed. When the continuous center lighting process is being executed, the CPU determines "Yes" at the step 530 and then, proceeds with the process to a step 535 to execute a cooperative subroutine shown by a flowchart in FIG. 33.

Therefore, when the CPU proceeds with the process to the step 535, the CPU starts process from a step 600 in FIG. 33 and then, proceeds with the process to a step 605 to determine whether or not the present time is in the initial lighting period Tinitial. When the present time is in the initial lighting periodTinitial, the CPU determines "Yes" at the step 605 and then, proceeds with the process to a step 610 to determine whether or not the remaining period Tszn of the initial lighting period Tinitial at the present time (hereinafter, the remaining period Tszn will be referred to as "the initial remaining period Tszn") is equal to or larger than the threshold time Tth.

When the remaining initial period Tszn is equal to or larger than the threshold time Tth, the CPU determines "Yes" at the step 610 and then, proceeds with the process to a step 615 to send to the meter ECU 60 the start command signal SRstart for causing the meter ECU 60 to start the right lighting control B7 and send to the buzzer ECU 70 the start command signal SBstart for causing the buzzer ECU 70 to start the buzzer control B7. Therefore, the meter ECU 60 starts the right lighting control B7 and the buzzer ECU 70 starts the buzzer control B7.

Then, the CPU proceeds with the process to the step 425 in FIG. 31 via the step 695 in FIG. 33 and the step 595 in FIG. 32 to set the value of the right lighting flag Xr to "1" and then, proceeds with the process to the step 495 to terminate this routine once.

On the other hand, when the remaining initial period Tszn is smaller than the threshold time Tth upon the execution of the process of the step 610 in FIG. 33, the CPU determines "No" at the step 610 and then, proceeds with the process to a step 620 to send to the meter ECU 60 the start command signal SRstart for causing the meter ECU 60 to start the right lighting control B8 and send to the buzzer ECU 70 the start command signal SBstart for causing the buzzer ECU 70 to start the buzzer control B8. Thereby, the meter ECU 60 starts the right lighting control B8 and the buzzer ECU 70 starts the buzzer control B8.

Then, the CPU proceeds with the process to the step 425 in FIG. 31 via the step 695 in FIG. 33 and the step 595 in FIG. 32 to set the value of the right lighting flag Xr to "1" and then, proceeds with the process to the step 495 in FIG. 31 to terminate this routine once.

On the other hand, when the present time is not during the initial lighting period Tinitial upon the execution of the process of the step 605 in FIG. 33, the CPU determines "No" at the step 605 and then, proceeds with the process to a step 625 to determine whether or not the present time is in the interval equivalent period Titvs.

When the present time is in the interval equivalent period Titvs, the CPU determines "Yes" at the step 625 and then, proceeds with the process to a step 630 to send to the meter ECU 60 the start command signal SRstart for causing the meter ECU 60 to start the right lighting control B9 and send to the buzzer ECU 70 the start command signal SRstart for causing the buzzer ECU 70 to start the buzzer control B9. Thereby, the meter ECU 60 starts the right lighting control B9 and the buzzer ECU 70 starts the buzzer control B9.

Then, the CPU proceeds with the process to the step 425 in FIG. 31 via the 695 in FIG. 33 and the step 595 in FIG. 32 to set the value of the right lighting flag Xr to "1" and then, proceeds with the process to the step 495 in FIG. 31 to terminate this routine once.

On the other hand, when the present time is not in the interval equivalent period Titvs upon the execution of the process of the step 625 in FIG. 33, the CPU determines "No" at the step 625 and then, proceeds with the process to a step 635 to determine whether or not the value of the left lighting flag Xl is "0".

When the value of the left lighting flag Xl is "0", the CPU determines "Yes" at the step 635 and then, proceeds with the process to a step 640 to send to the meter ECU 60 the start command signal SRstart for causing the meter ECU 60 to start the right lighting control B10 and send to the buzzer ECU 70 the start command signal SBstart for causing the buzzer ECU 70 to start the buzzer control B10. Thereby, the meter ECU 60 starts the right lighting control B10 and the buzzer ECU 70 starts the buzzer control B10.

Then, the CPU proceeds with the process to the step 425 in FIG. 31 via the step 695 in FIG. 33 and the step 595 in FIG. 32 to set the value of the right lighting flag Xr to "1" and then, proceeds with the process to the step 495 in FIG. 31 to terminate this routine once.

On the other hand, when the value of the left lighting flag Xl is "1" upon the execution of the process of the 635 in FIG. 33, the CPU determines "No" at the step 635 and then, proceeds with the process to a step 645 to send to the meter ECU 60 the start command signal SRstart for causing the meter ECU 60 to start any of the right lighting controls B11 and B12 and send to the buzzer ECU 70 the start command signal SRstart for causing the buzzer ECU 70 to start of any of the buzzer controls B11*a* to B11*c* and B12*a* to B12*d*. Thereby, the meter ECU 60 starts any of the right lighting controls B11 and B12, depending on the time of the first detection of the right rear side vehicle 10b and the buzzer ECU 70 starts any of the buzzer controls B11a to B11c and B12a to B12d, depending on the time of the first detection of the right rear side vehicle 10b.

Then, the CPU proceeds with the process to the step 425 in FIG. 31 via the step 695 in FIG. 33 and the step 595 in FIG. 32 to set the value of the right lighting flag Xr to "1" and then, proceeds with the process to the step 495 in FIG. 31 to terminate this routine once.

On the other hand, when the continuous center lighting process is not executed upon the execution of the process of the step 530 in FIG. 32, the CPU determines "No" at the step 530 and then, proceeds with the process to a step 540 to send to the meter ECU 60 the start command signal SRstart for causing the meter ECU 60 to start any of the right lighting controls B1 and B2 and send to the buzzer ECU 70 the start command signal SBstart for causing the buzzer ECU 70 to start any of the buzzer controls B1 and B2. Thereby, the meter ECU 60 starts any of the right lighting controls B1 and B2, depending on the time of the first detection of the right rear side vehicle 10b and the buzzer ECU 70 starts any of the buzzer controls B1 and B2, depending on the time of the first detection of the right rear side vehicle 10b.

Then, the CPU proceeds with the process to the step 425 in FIG. 31 via the 595 in FIG. 32 to set the value of the right lighting flag Xr to "1" and then, proceeds with the process to the step 495 in FIG. 31 to terminate this routine once.

When the value of the center lighting flag Xh is "0" upon the execution of the process of the step 505, the CPU determines "No" at the step 505 and then, proceeds with the process to a step 545 to send to the meter ECU 60 the start command signal SRstart for causing the meter ECU 60 to start any of the right lighting controls B11 and B12 and send to the buzzer ECU 70 the start command signal SBstart for causing the buzzer ECU 70 to start any of the buzzer controls B11a to B11c and B12a to B12d. Thereby, the meter ECU 60 starts any of the right lighting controls B11 and B12, depending on the time of the first detection of the right rear side vehicle 10b and the buzzer ECU 70 starts any of the buzzer controls B11a to B11c and B12a to B12d, depending on the time of the first detection of the right rear side vehicle 10b.

Then, the CPU proceeds with the process to the step 425 in FIG. 31 via the 595 in FIG. 32 to set the value of the right lighting flag Xr to "1" and then, proceeds with the process to the step 495 in FIG. 31 to terminate this routine once.

After the CPU sends the start command signals SRstart and SBstart to the meter and buzzer ECUs 60 and 70, the value of the right lighting flag Xr is "1". Therefore, while the right rear side vehicle 10b is detected, the CPU determines "Yes" at the step 405 in FIG. 31 and then, determines "No" at the step 410. Thus, the CPU proceeds with the process directly to the step 495 to terminate this routine once.

When the right rear side vehicle 10b is not detected upon the execution of the process of the step 405, the CPU determines "No" at the step 405 and then, proceeds with the process to the step 435 to determine whether or not the value of the right lighting flag Xr is "1". That is, the CPU determines whether or not the right lighting control is being executed. When the value of the right lighting flag Xr is "1", the CPU determines "Yes" at the step 435 and then, sequentially executes processes of steps 440 and 445 described below. Then, CPU proceeds with the process to the step 495 to terminate this routine once.

Step 440: The CPU sends to the meter ECU 60 the stop command signal SRstop for causing the meter ECU 60 to stop the right lighting control and send to the buzzer ECU 70 the stop command signal SBstop for causing the buzzer ECU 70 to stop the buzzer control. Thereby, the right lighting control and the buzzer control are stopped. It should be noted that if the buzzer control has been terminated when the CPU send the stop command signal SBstop to the buzzer ECU 70, the buzzer ECU 70 ignores the signal SBstop.

Step 445: The CPU sets the value of the right lighting flag Xr to "0".

On the other hand, when the value of the right lighting flag Xr is "0" upon the execution of the process of the step 435, the CPU determines "No" at the step 435 and then, proceeds with the process directly to the step 495 to terminate this routine once.

The concrete operation of the embodiment control apparatus for controlling the lighting of the right lighting display part 23 has been described. Thereby, even when the right rear side vehicle 10b is first detected during the execution of the center lighting control (see the determinations "Yes" at the steps 405 and 410 in FIG. 31 the determination "No" at the step 415 in FIG. 31 and the determination "Yes" at the step 505 in FIG. 32), the timings of turning on and off the right lighting display part 23 correspond to the timings of turning on and off the center lighting display part 22, respectively (see the processes of the steps 520, 525, 540 and 545 in FIG. 32 and the processes of the steps 615, 620, 630, 640 and 645 in FIG. 33). Thus, the driver can be prevented from feeling troublesome due to the lightings of the center and right display parts 22 and 23 and the possibility that the driver overlooks the detection of the right rear side vehicle 10b can be decreased.

Further, when the remaining execution time Tzn is shorter than the threshold time Tth (see the determination "No" at the step 515 in FIG. 32) and when the remaining initial period Tszn is shorter than the threshold time Tth (see the determination "No" at the step 610 in FIG. 33), after the right rear side vehicle 10b is first detected, the alerting process is executed the predetermined number of times Nb without including the alerting process which is being executed at the time of the first detection of the right rear side vehicle 10b (see the processes of the steps 525 and 620). Therefore, compared with a case that the alerting process is executed the predetermined number of times Nb including the alerting process which is being executed at the time of the first detection of the right rear side vehicle 10b, the number of the generation of the alerting sound after the right rear side vehicle 10b is first detected is large. Thus, even when the remaining execution time Tzn or the remaining initial period Tszn is shorter than the threshold time Tth, the driver is likely to know that the right rear side vehicle 10b is detected.

Although not shown, the CPU controls the lighting of the left lighting display part 24 and the activation of the buzzer 30 by executing routines similar to the routines shown in FIGS. 31 to 33, respectively when the left rear side vehicle 10c is detected.

It should be noted that the present invention is not limited to the aforementioned embodiment and various modifications can be employed within the scope of the present invention.

For example, the embodiment control apparatus may be configured to light the center lighting display part 22 for the remaining execution time Tzn when the remaining execution time Tzn of the right lighting process is shorter than the threshold time Tth and then, at the time of the start of the next right lighting process, start a control for sequentially executing the short center lighting process the predetermined number of time (for example, twice) and the continuous center lighting process once at the predetermined interval Titv.

Similarly, the embodiment control apparatus may be configured to light the center lighting display part 22 for the remaining execution time Tzn when the remaining execution time Tzn of the left lighting process is shorter than the threshold time Tth and then, at the time of the start of the next left lighting process, start a control for sequentially executing the short center lighting process the predetermined number of time (for example, twice) and the continuous center lighting process once at the predetermined interval Titv.

Similarly, the embodiment control apparatus may be configured to light the right lighting display part 23 and/or the left lighting display part 24 for the remaining execution time Tzn when the remaining execution time Tzn of the center lighting process is shorter than the threshold time Tth and then, at the time of the start of the next center lighting process, start a control for sequentially executing the right lighting process and/or the left lighting process the predetermined number of time Nr at the predetermined interval Titv.

What is claimed is:

1. A vehicle display control apparatus applied to a vehicle comprising:
    a first detection device for detecting a first target object which exists within a range of a first distance from the vehicle;
    a second detection device for detecting a second target object which is different from the first target object and exists within a range of a second distance from the vehicle;
    a first display device for performing a first display for informing a driver of the vehicle of a fact that the first target object is detected; and
    a second display device for performing a second display for informing the driver of a fact that the second target object is detected,
    wherein the vehicle display control apparatus comprises control means configured to:
        execute a first control for executing a first display process a predetermined first number of times at a predetermined interval when the first target object is detected by the first detection device, the first display process being a process for causing the first display device to perform the first display for a predetermined display time; and
        execute a second control for executing a second display process a predetermined second number of times at the predetermined interval when the second target object is detected by the second detection device, the second display process being a process for causing the second display device to perform the second display for the predetermined display time; and
    the control means is further configured to, when the first target object is first detected during an execution of the second display process:
        start a performance of the first display at a time of a first detection of the first target object;
        stop the performance of the first display at a time of the termination of the second display process after the first target object is first detected; and
        start the first control at a time of a start of the second display process next to a stop of the performance of the first display.

2. The vehicle display control apparatus according to claim 1, wherein the control means is configured to acquire a remaining execution time at the time of the first detection of the first target object during the execution of the second display process, the remaining execution time being a time of the execution of the second display process remaining at the time of the first detection of the first target object,
    the control means is configured to, when the remaining execution time is equal to or larger than a threshold time:
        start the performance of the first display at the time of the first detection of the first target object;
        stop the performance of the first display at the time of the termination of the second display process; and
        start the first control at the time of the start of the second display process next to the stop of the performance of the first display, and
    the control means is configured to, when the remaining execution time is smaller than the threshold time:
        start the performance of the first display at the time of the first detection of the first target object,
        stop the performance of the first display at the time of the termination of the second display process, which is started next to the second display process which is being executed at the time of the first detection of the first target object; and
        start the first control at the time of the start of the second display process next to the stop of the performance of the first display.

3. The vehicle display control apparatus according to claim 2, wherein the vehicle comprises a buzzer for generating an alerting sound,
    the control means is configured to, when the first target object is detected:
        start an alerting process for causing the buzzer to generate the alerting sound at the time of the start of the first control during the execution of the first display process; and
        execute the alerting process a predetermined third number of times at the predetermined interval,
    the control means is configured to, when the second target object is detected:
        start the alerting process at the time of the start of the second control during the execution of the second display process; and
        execute the alerting process a predetermined fourth number of times at the predetermined interval,
    the control means is configured to execute the alerting process the predetermined third number of times including the alerting process which is being executed at the time of the first detection of the first target object when the first target object is first detected during the execution of the second display process, the remaining execution time is equal to or larger than the threshold time and the alerting process is executed, and
    the control means is configured to execute the alerting process the predetermined third number of times without including the alerting process which is being executed at the time of the first detection of the first target object when the first target object is first detected during the execution of the second display process, the remaining execution time is smaller than the threshold time and the alerting process is executed.

* * * * *